United States Patent
Murakami et al.

(10) Patent No.: US 9,515,547 B2
(45) Date of Patent: Dec. 6, 2016

(54) DC POWER SUPPLY CIRCUIT

(71) Applicant: Panasonic Corporation, Osaka (JP)

(72) Inventors: Masanobu Murakami, Osaka (JP); Kazushige Sugita, Hyogo (JP); Kazuhiko Itoh, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 254 days.

(21) Appl. No.: 14/377,425

(22) PCT Filed: Sep. 21, 2012

(86) PCT No.: PCT/JP2012/006023
§ 371 (c)(1),
(2) Date: Aug. 7, 2014

(87) PCT Pub. No.: WO2013/128506
PCT Pub. Date: Sep. 6, 2013

(65) Prior Publication Data
US 2015/0357910 A1  Dec. 10, 2015

(30) Foreign Application Priority Data

Mar. 1, 2012 (JP) .................................. 2012-045578
Mar. 7, 2012 (JP) .................................. 2012-050316

(51) Int. Cl.
*H02M 1/42* (2007.01)
*H02M 7/217* (2006.01)
(Continued)

(52) U.S. Cl.
CPC ................ *H02M 1/42* (2013.01); *H02M 7/217* (2013.01); *H05B 33/0815* (2013.01);
(Continued)

(58) Field of Classification Search
CPC ...... H02M 7/06; H02M 7/217; H02M 7/2176; H02M 7/04; H02M 1/42; H02M 1/4208; H02M 1/4225; H02M 1/4258; H02M 3/156; H02M 2001/4291; H02M 2001/0006; Y02B 70/126; H05B 70/126; H05B 33/0815; H05B 33/0803; H05B 41/282
See application file for complete search history.

(56) References Cited

U.S. PATENT DOCUMENTS 6,108,218 A * 8/2000 Igarashi .............. H02M 1/4258
363/21.16
6,115,273 A * 9/2000 Geissler ............... B23K 9/1056
363/89
(Continued)

FOREIGN PATENT DOCUMENTS

JP 10-214689 A 8/1998
JP 2009-200257 A 9/2009
(Continued)

OTHER PUBLICATIONS

International Search Report for corresponding International Application No. PCT/JP2012/006023 mailed Dec. 25, 2012.
(Continued)

*Primary Examiner* — Timothy J Dole
*Assistant Examiner* — Shahzeb K Ahmad
(74) *Attorney, Agent, or Firm* — Renner, Otto, Boisselle & Sklar, LLP

(57) ABSTRACT

In a DC power supply circuit (1), when an instantaneous value (Vin) of a voltage from a rectifier circuit (2) is higher than or equal to a voltage (VC2) across terminals of a capacitor (C2), in an ON period of a switching element (Q1), current flows along a first current path, from a high-potential output terminal of the rectifier, through a load (11), an inductor (L2), and the switching element in the stated order, and into a low-potential output terminal of the rectifier, and in an OFF period of the switching element, current flows along a second current path, from the high-potential output terminal of the rectifier, through the load, the inductor, a diode (D1), and the capacitor in the stated order, and into the low-potential output terminal of the rectifier.

11 Claims, 38 Drawing Sheets

(51) Int. Cl.
*H05B 33/08* (2006.01)
*H02M 1/00* (2006.01)

(52) U.S. Cl.
CPC ........ *H02M 1/4225* (2013.01); *H02M 1/4258* (2013.01); *H02M 2001/0006* (2013.01); *Y02B 70/126* (2013.01)

(56) References Cited

U.S. PATENT DOCUMENTS

| | | | | |
|---|---|---|---|---|
| 6,198,232 | B1 * | 3/2001 | Marinus | H05B 41/2821 315/209 R |
| 8,183,787 | B2 * | 5/2012 | Ren | H05B 33/0815 315/200 R |
| 8,378,647 | B2 * | 2/2013 | Yonezawa | H02M 1/4225 323/222 |
| 9,060,396 | B2 * | 6/2015 | Huang | H05B 33/0815 |
| 2009/0212721 | A1 | 8/2009 | Maruyama | |

FOREIGN PATENT DOCUMENTS

| | | |
|---|---|---|
| JP | 2011-090901 A | 5/2011 |
| JP | 2011-108529 A | 6/2011 |

OTHER PUBLICATIONS

Form PCT/ISA/237 for corresponding International Application No. PCT/JP2012/006023 mailed Dec. 25, 2012.

* cited by examiner (a)

(b)

(a)

(b)

(c)

(d)

(a)

(b-1)

(b-2)

(c-1)

(c-2)

(d)

(a)

(b)

(c)

(a)

(b)

DC POWER SUPPLY CIRCUIT

TECHNICAL FIELD

The present disclosure relates to a direct current (DC) power supply circuit. In particular, the present disclosure relates to a technology of improving a power factor of a DC power supply circuit, relative to an alternating current (AC) power supply.

BACKGROUND ART

In recent years, light emission efficiency of light-emitting diodes (LEDs) has improved to such an extent that LEDs are attracting attention as a light source for general illumination use. In order to drive LEDs, a DC power supply is required.

A conventional DC power supply circuit is proposed that converts AC supplied from a residential AC power supply into DC, and thus outputs DC (refer to Patent Literature 1). Patent Literature 1 discloses a DC power supply circuit that includes a rectifier circuit, a smoothing capacitor that is connected across output terminals of the rectifier circuit, and a voltage conversion circuit that is connected across terminals of the capacitor, converts voltage across the terminals of the capacitor, and outputs a converted voltage.

CITATION LIST

Patent Literature

[Patent Literature 1]
Japanese Patent Application Publication No. 2011-90901

SUMMARY OF INVENTION

Technical Problem

Typically, in a DC power supply circuit, current from an AC power supply flows into a capacitor via a rectifier circuit, only while voltage output from the rectifier circuit is greater than voltage across terminals of the capacitor.

In connection with this, in the DC power supply circuit disclosed in Patent Literature 1, when the voltage output from the rectifier circuit reaches a maximum value, the voltage across the terminals of the capacitor equals this maximum value. Accordingly, in each half-cycle of AC supplied from the AC power supply, the voltage output from the rectifier circuit, after reaching the maximum value, becomes lower than the voltage across the terminals of the capacitor. Thus, in the DC power supply circuit disclosed in Patent Literature 1, after the voltage output from the rectifier circuit reaches the maximum value, current does not flow from the AC power supply to the capacitor via the rectifier circuit. Hence, the DC power supply circuit disclosed in Patent Literature 1 has lower power factor compared to a DC power supply circuit in which current flows from an AC power supply to a rectifier circuit during the entirety of each half-cycle of AC supplied from the AC power supply.

In view of the above, the present disclosure provides a DC power supply circuit with improved power factor.

Solution to Problem

One aspect of the present invention is a direct current (DC) power supply circuit including: a rectifier circuit rectifying alternating current (AC) supplied thereto from an AC power supply; and a voltage conversion circuit connected across output terminals of the rectifier circuit, converting a voltage from the rectifier circuit, and outputting a converted voltage to a load. The voltage conversion circuit includes: an inductor having terminals, a first one of which is connected, via the load, to a high-potential one of the output terminals of the rectifier circuit; a switching element connected between a second one of the terminals of the inductor and a low-potential one of the output terminals of the rectifier circuit; a capacitor having terminals, a first one of which is connected to the low-potential one of the output terminals of the rectifier circuit; and a first unidirectional element connected between a second one of the terminals of the capacitor and the second one of the terminals of the inductor. In the DC power supply circuit, when an instantaneous value of the voltage from the rectifier circuit is higher than or equal to a voltage across the terminals of the capacitor, in an ON period of the switching element, current flows along a first current path from the high-potential one of the output terminals of the rectifier circuit, through the load, the inductor, and the switching element in the stated order, and into the low-potential one of the output terminals of the rectifier circuit, and in an OFF period of the switching element, current flows along a second current path from the high-potential one of the output terminals of the rectifier circuit, through the load, the inductor, the first unidirectional element, and the capacitor in the stated order, and into the low-potential one of the output terminals of the rectifier circuit.

Advantageous Effects of Invention

In the DC power supply circuit pertaining to one aspect of the present invention, while the instantaneous value of the voltage output from the rectifier is higher than or equal to the voltage across the terminals of the capacitor, current flows along the first current path or the second current path, from the high-potential one of the output terminals of the rectifier circuit and into the low-potential one of the output terminals of the rectifier circuit. Thus, while the instantaneous value of the voltage output from the rectifier is higher than or equal to the voltage across the terminals of the capacitor, current continues to flow from the AC power supply into the voltage conversion circuit via the rectifier circuit. Further, in the ON period of the switching element, current mainly flows along the first current path, which does not pass through the capacitor, and there is a period during which current does not flow into the capacitor. Thus, in the ON period, the capacitor is not charged. Meanwhile, in the OFF period of the switching element, current flows along the second current path, which passes through the capacitor, and the capacitor is charged. As such, a period during which the capacitor is not charged and a period during which the capacitor is charged are alternately repeated, in synchronization with ON/OFF switching of the switching element.

This results in the voltage across the terminals of the capacitor increasing at a slower rate compared to when current continues to flow from the high-potential one of the output terminals of the rectifier circuit to the capacitor regardless of the ON/OFF switching of the switching element. Due to this, in the DC power supply circuit pertaining to one aspect of the present invention, at the point when the instantaneous value of the voltage output from the rectifier circuit reaches a maximum value, the voltage across the terminals of the capacitor increases remains lower than the maximum value. Accordingly, in the DC power supply circuit pertaining to one aspect of the present invention, the instantaneous value of the voltage output from the rectifier circuit remains higher than the voltage across the terminals of the capacitor for a certain period of time after the instantaneous value of the voltage output from the rectifier circuit reaches the maximum value, and during this period, current continues to flow from the high-potential one of the output terminals of the rectifier circuit to the capacitor along the second current path. While current continues to flow from the high-potential one of the output terminals of the rectifier circuit to the capacitor along the second current path, current continues to flow from the AC power supply to the voltage conversion circuit via the rectifier circuit.

Due to this, the DC power supply circuit pertaining to one aspect of the present invention has improved power factor compared to a structure in which current does not flow from an AC power supply to a capacitor via a rectifier circuit after an instantaneous value of voltage output from the rectifier circuit has reached a maximum value. This is because in the DC power supply circuit pertaining to one aspect of the present invention, current continues to flow from the AC power supply to the voltage conversion circuit via the rectifier circuit even after the instantaneous value of the voltage output from the rectifier circuit reaches the maximum value, and due to this, current flows through the rectifier circuit for a longer period of time than in the above-described structure.

Figure 2A:
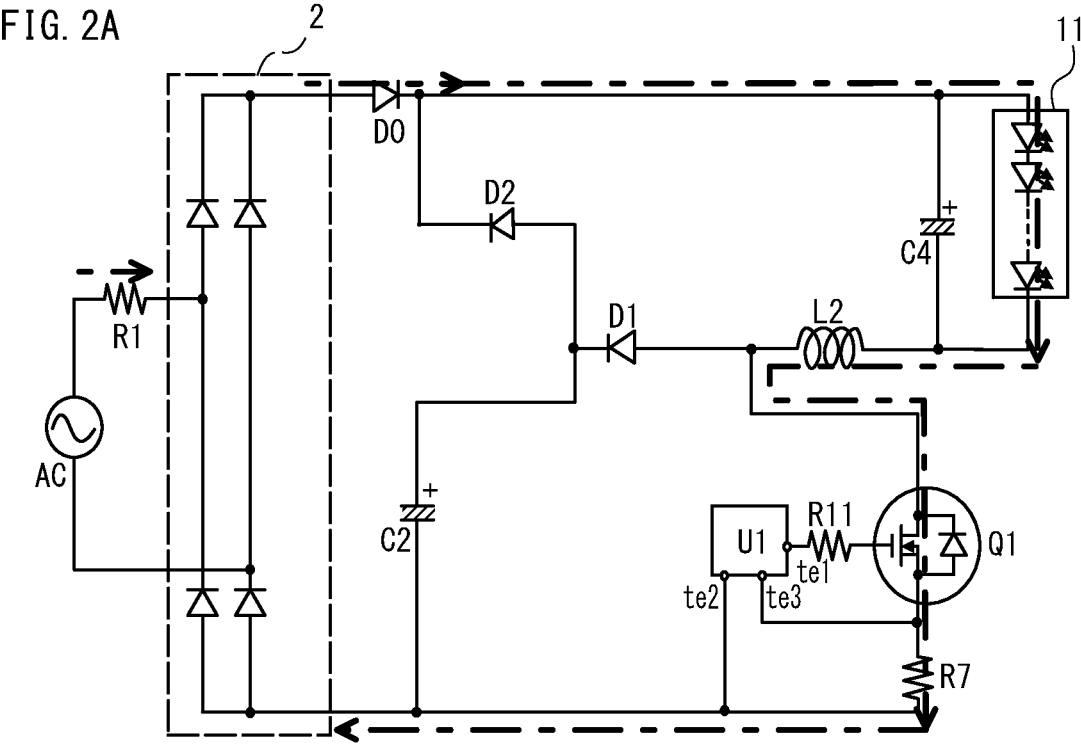
Figure 2B:
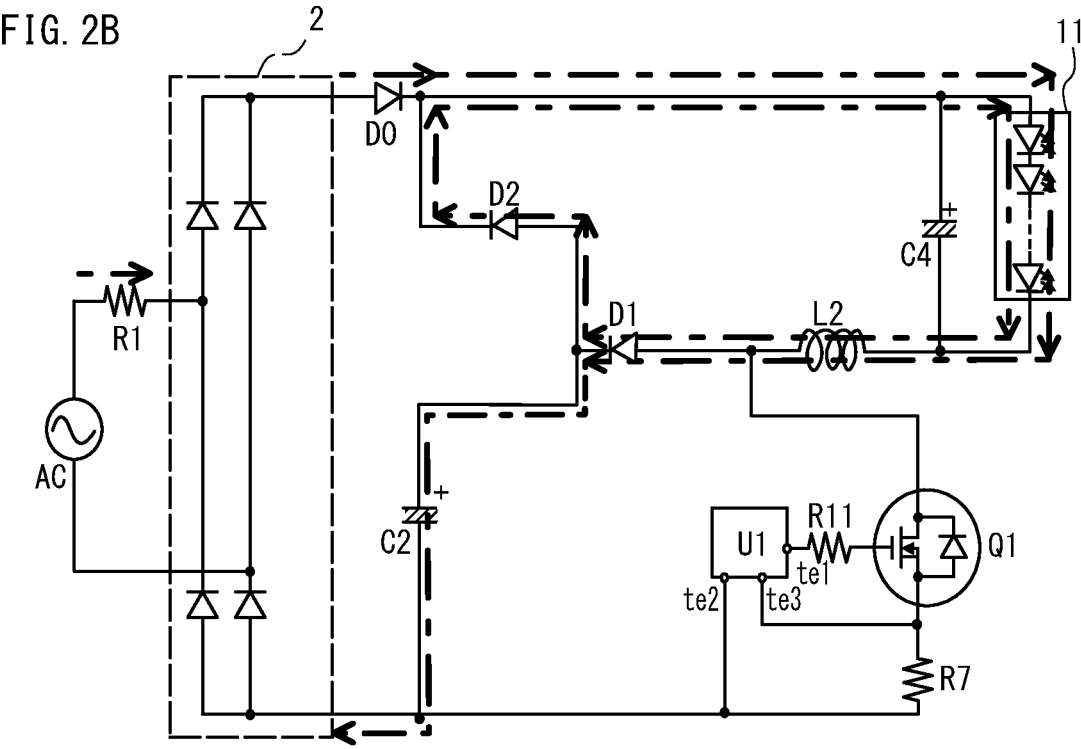

Each of FIGS. 2A and 2B is a circuit diagram of the DC power supply circuit pertaining to embodiment 1, including illustration of current flow in the DC power supply circuit.

Figure 3A:
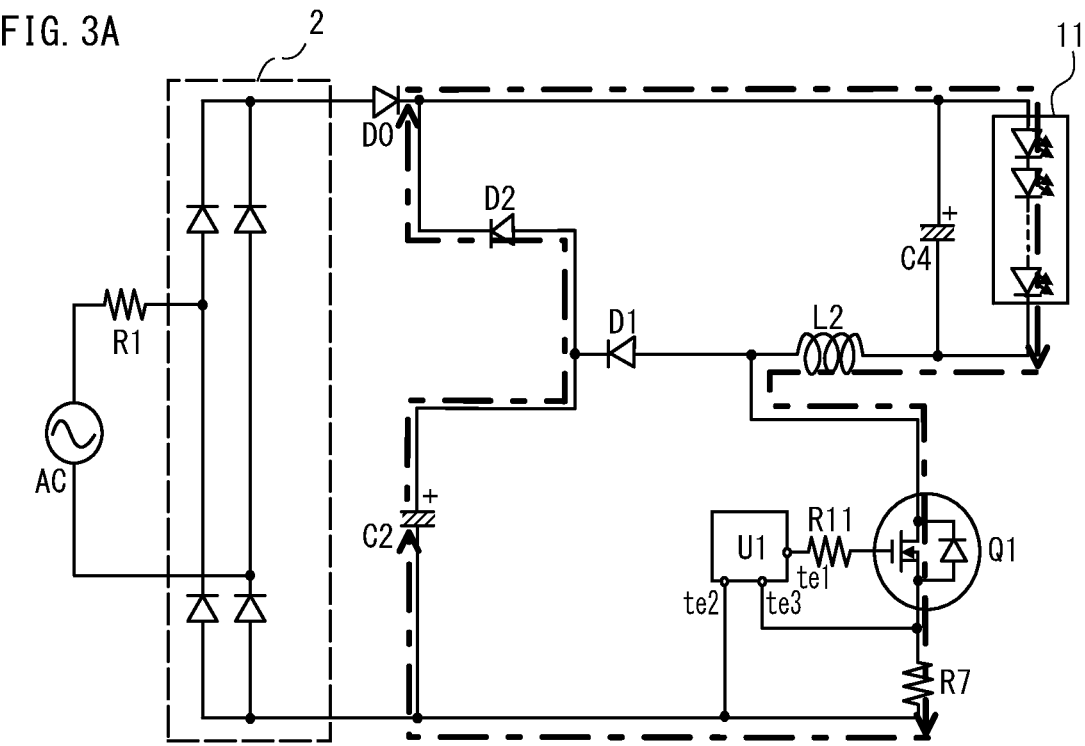
Figure 3B:
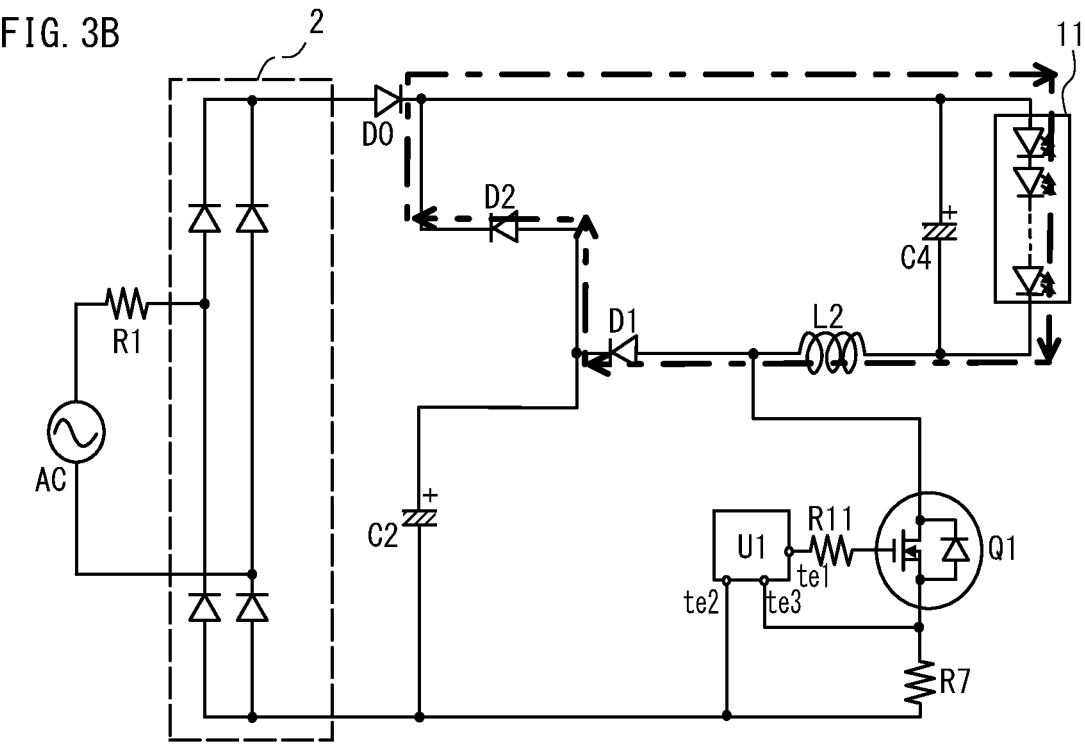

Each of FIGS. 3A and 3B is a circuit diagram of the DC power supply circuit pertaining to embodiment 1, including illustration of current flow in the DC power supply circuit.

Figure 4:
Figure 4:
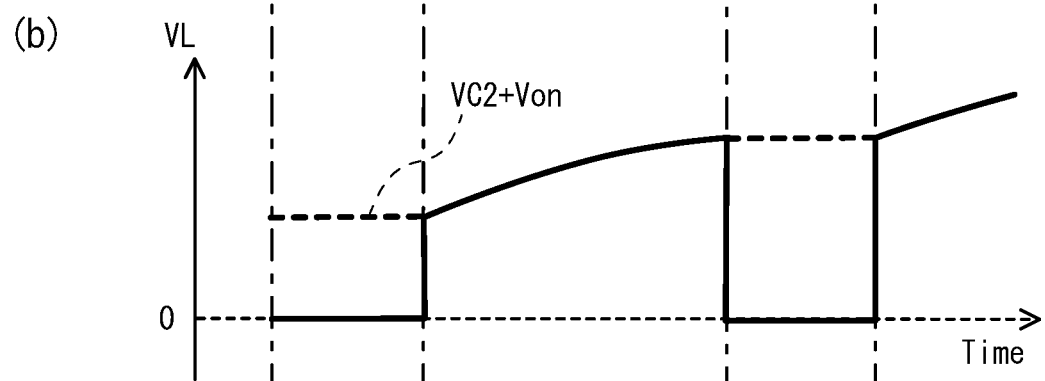
Figure 4:
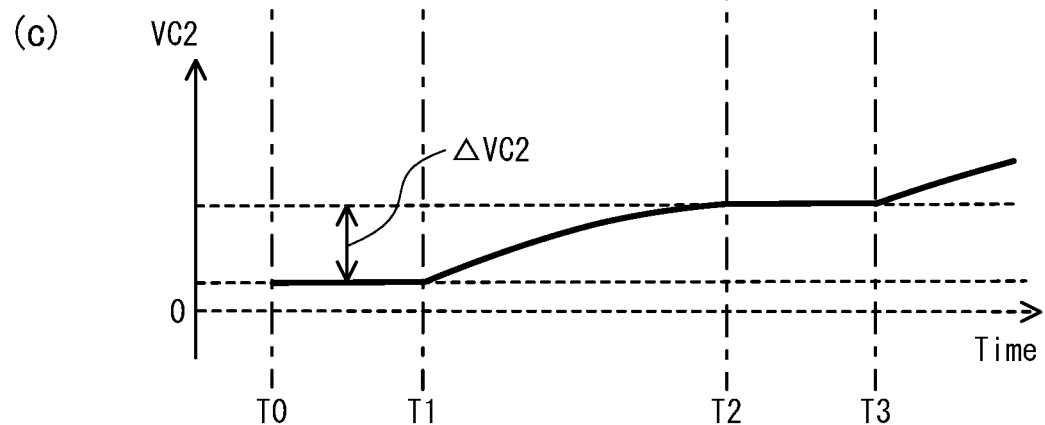

FIG. 4 includes portion (a) illustrating ON/OFF switching of switching element in the DC power supply circuit pertaining to embodiment 1, portion (b) illustrating a time domain waveform of voltage at node between inductor and anode of diode in the DC power supply circuit pertaining to embodiment 1, and portion (c) illustrating a time domain waveform of voltage across terminals of capacitor in the DC power supply circuit pertaining to embodiment 1.

Figure 5:
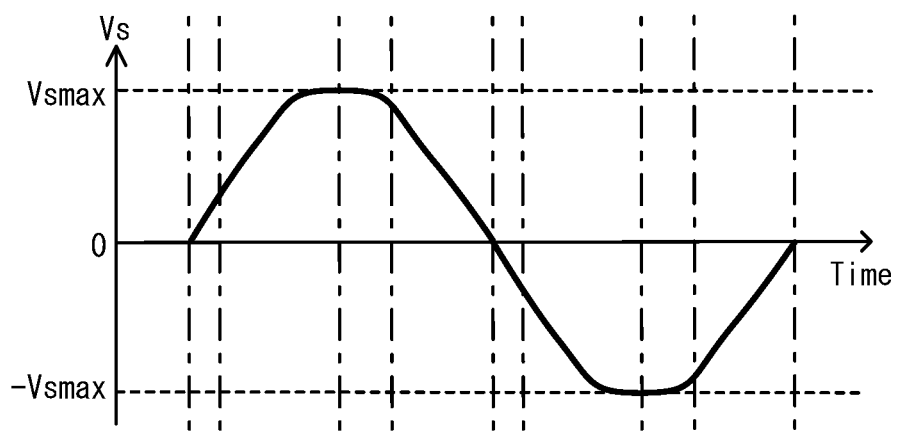
Figure 5:
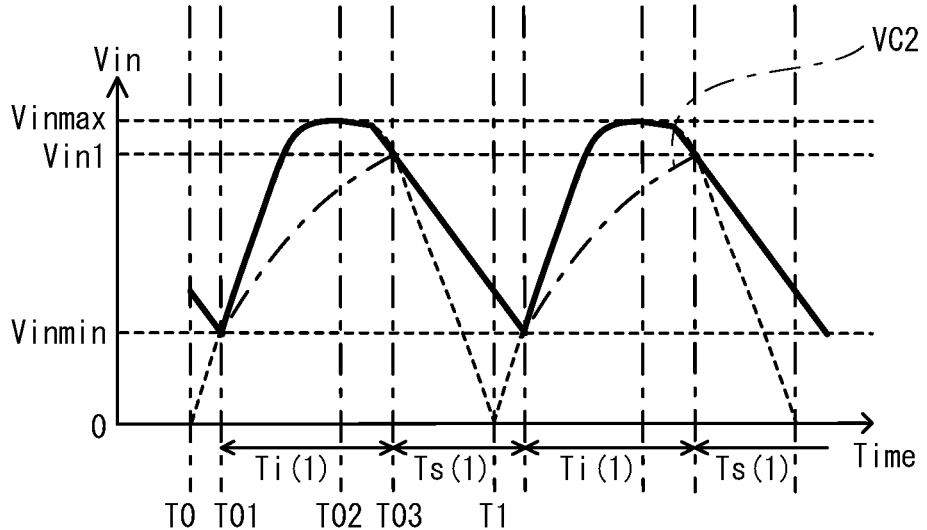

FIG. 5 includes portion (a) illustrating a time domain waveform of voltage input from AC power supply to rectifier circuit in the DC power supply circuit pertaining to embodiment 1, and portion (b) illustrating a time domain waveform of voltage output from rectifier circuit in the DC power supply circuit pertaining to embodiment 1.

Figure 6:
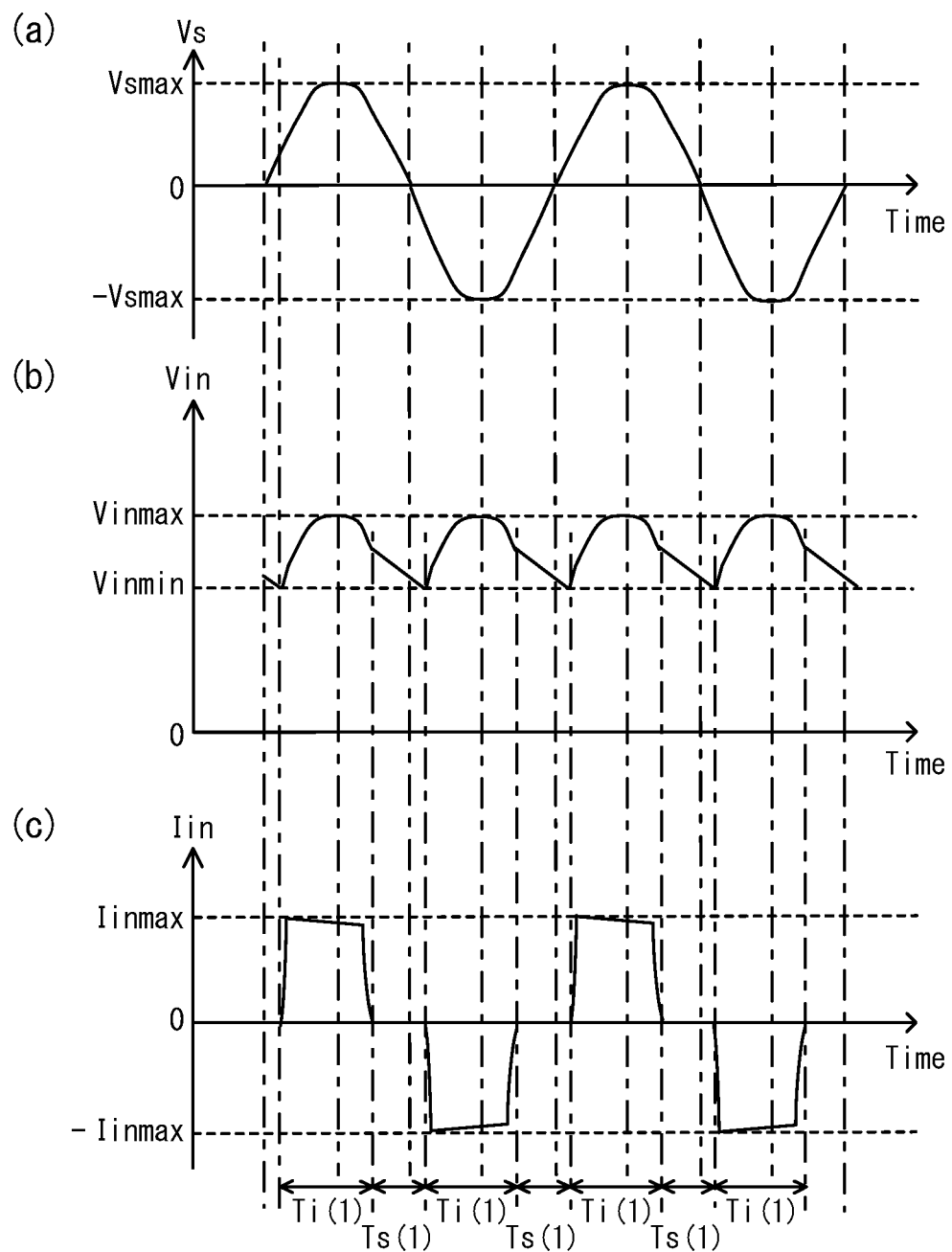

FIG. 6 includes portion (a) illustrating a time domain waveform of voltage input from AC power supply to rectifier circuit in the DC power supply circuit pertaining to embodiment 1, portion (b) illustrating a time domain waveform of voltage output from rectifier circuit in the DC power supply circuit pertaining to embodiment 1, and portion (c) illustrating a time domain waveform of current flowing from AC power supply to rectifier circuit in the DC power supply circuit pertaining to embodiment 1.

Figure 7:
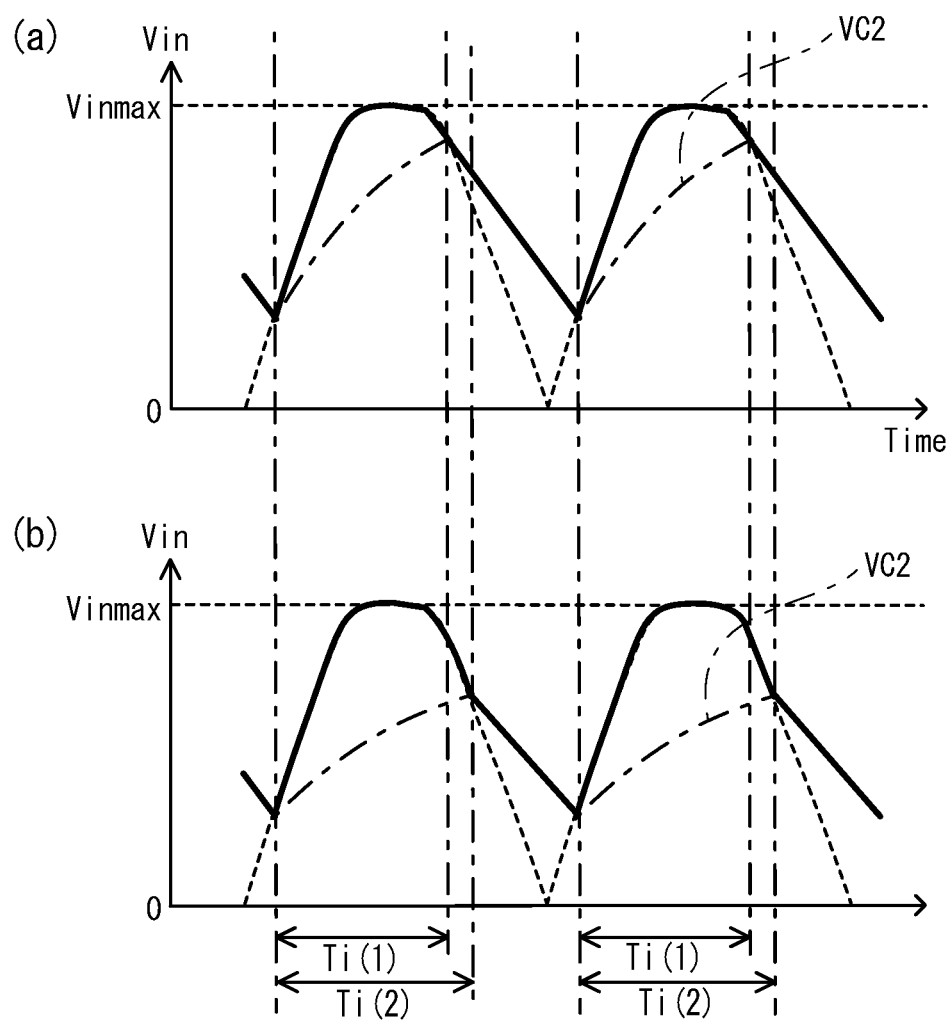

FIG. 7 illustrates a time domain waveform of voltage input from AC power supply to rectifier circuit in the DC power supply circuit pertaining to embodiment 1.

Figure 8:
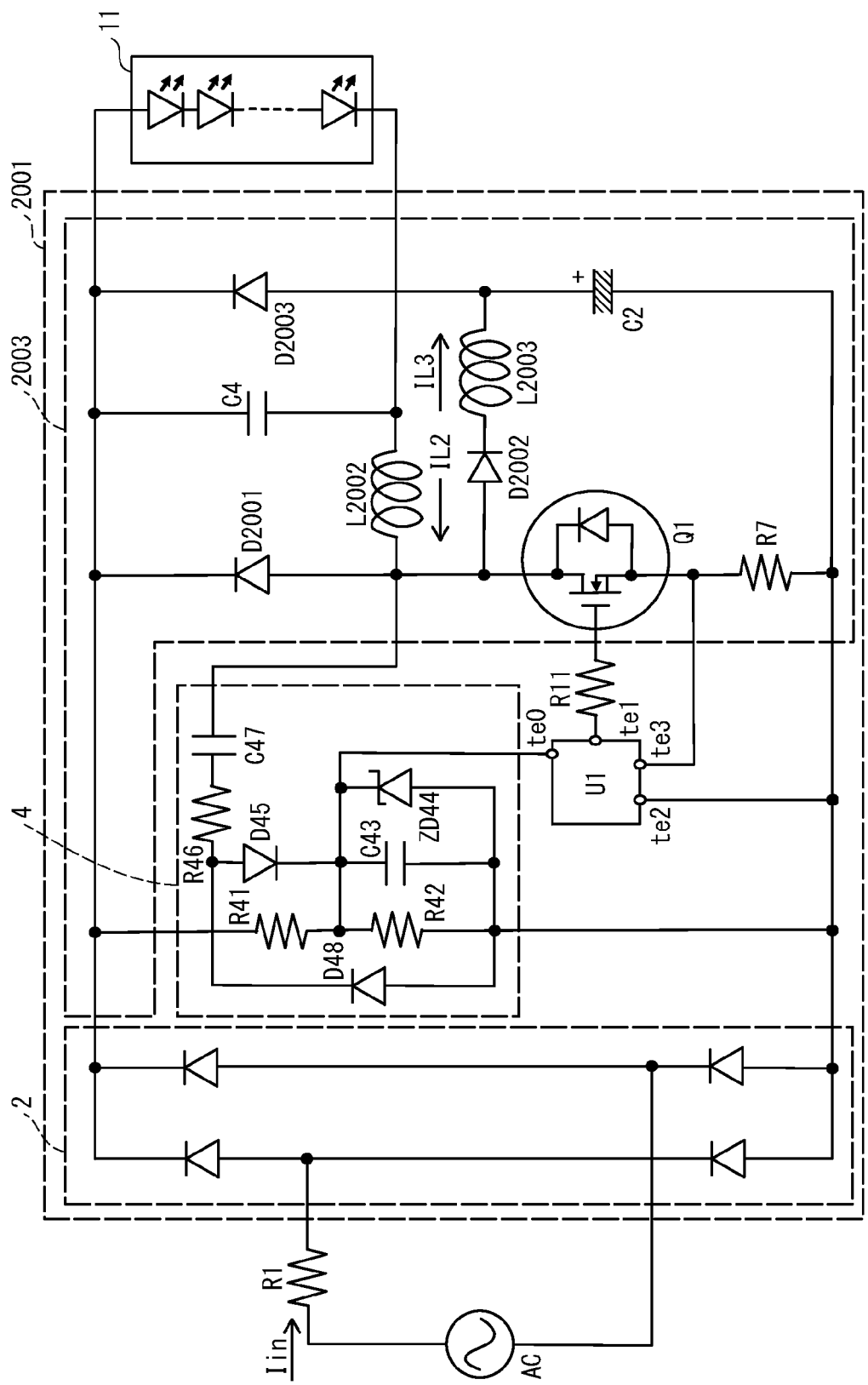

FIG. 8 is a circuit diagram illustrating a DC power supply circuit pertaining to embodiment 2.

Figure 9A:
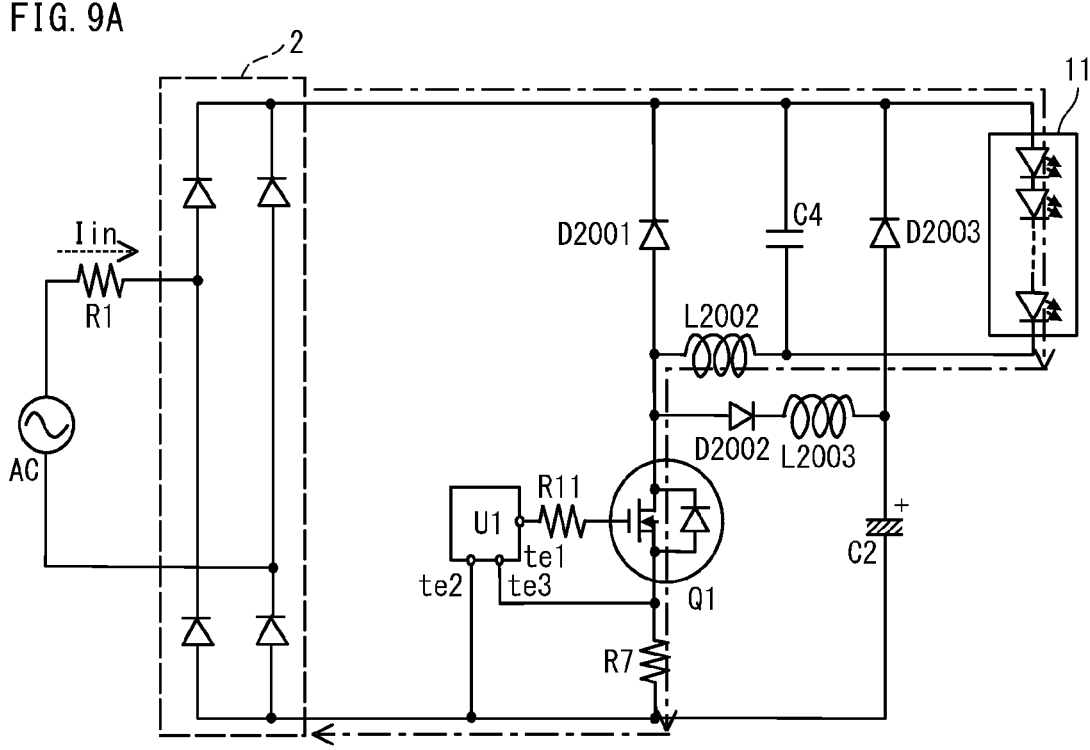
Figure 9B:
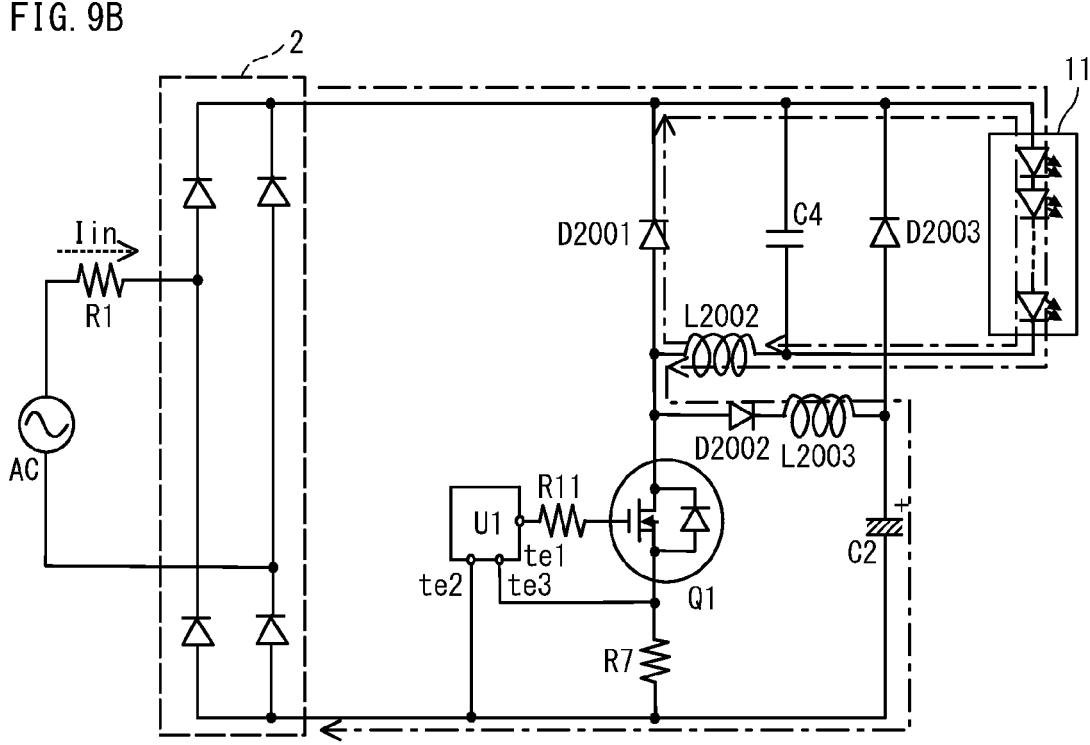

Each of FIGS. 9A and 9B is a circuit diagram of the DC power supply circuit pertaining to embodiment 2, including illustration of current flow in the DC power supply circuit.

Figure 10A:
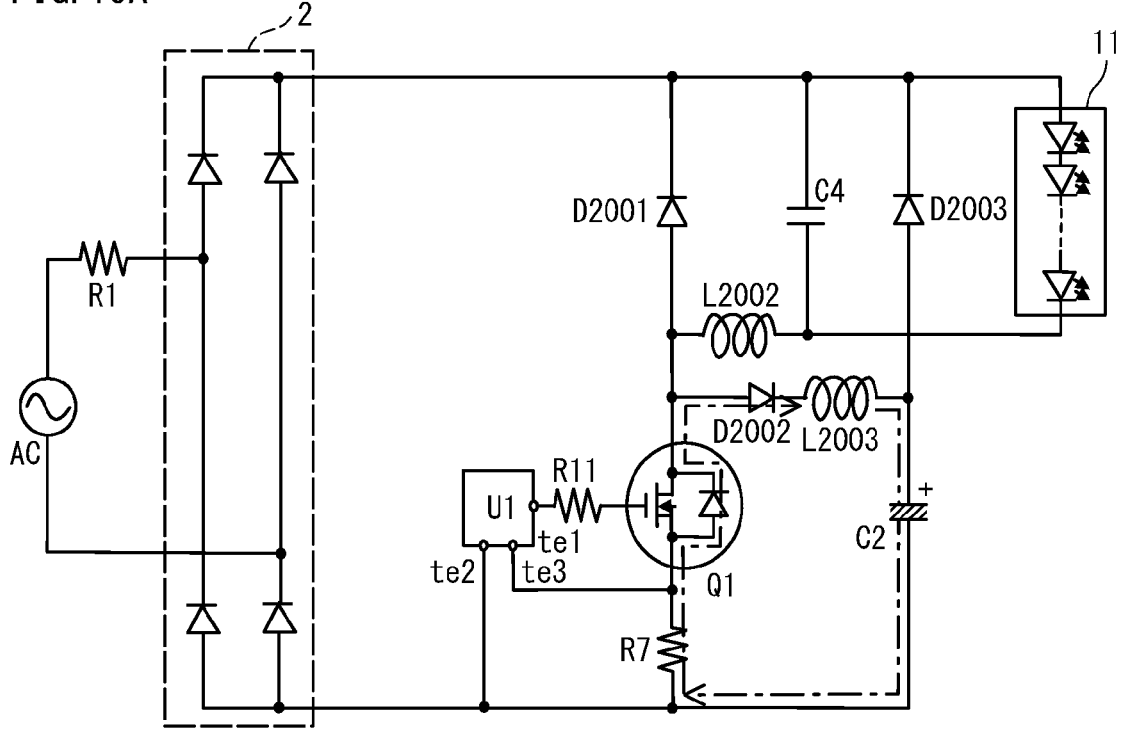
Figure 10B:
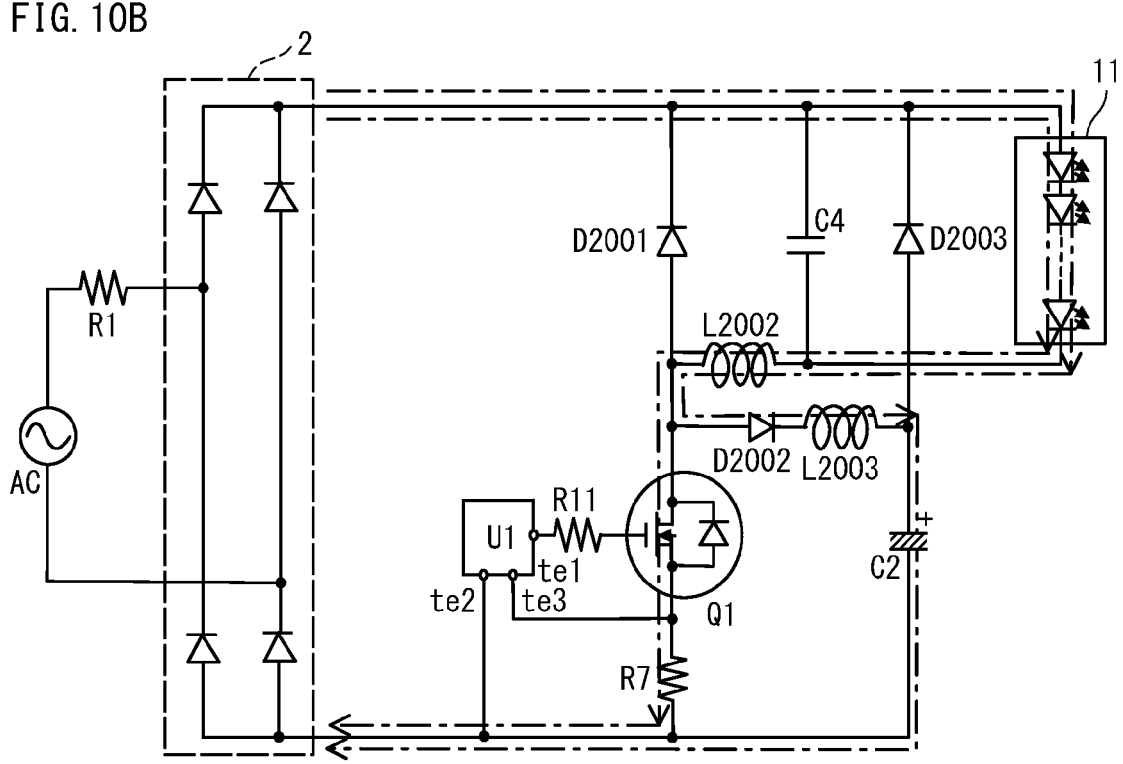

Each of FIGS. 10A and 10B is a circuit diagram of the DC power supply circuit pertaining to embodiment 2, including illustration of current flow in the DC power supply circuit.

Figure 11A:
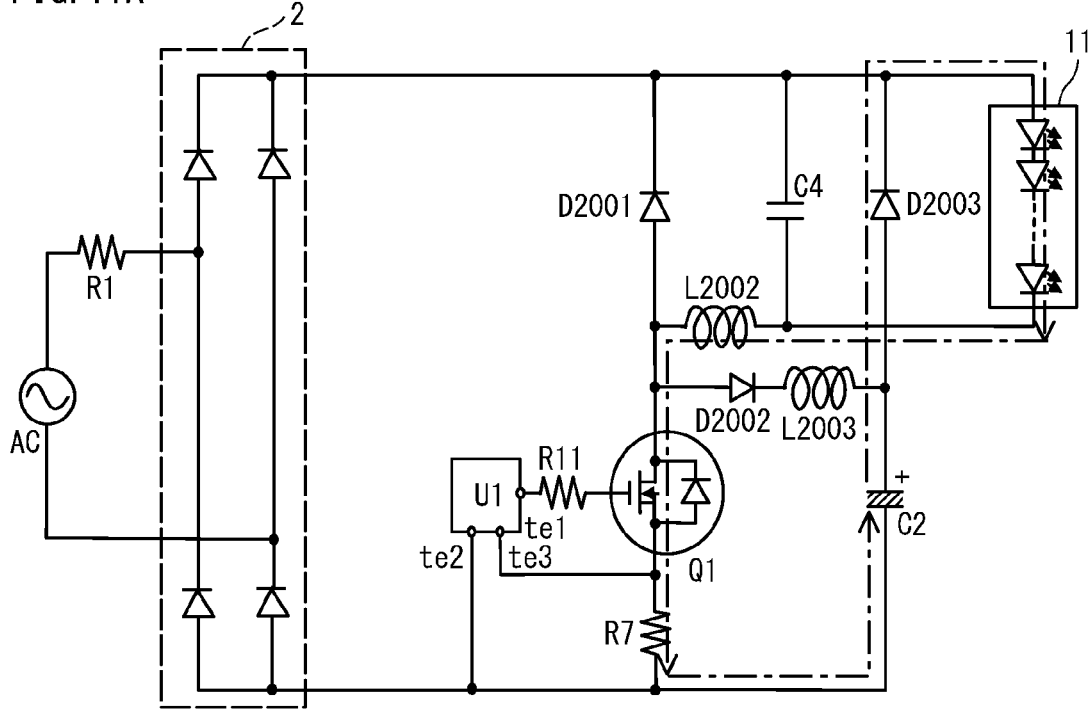
Figure 11B:
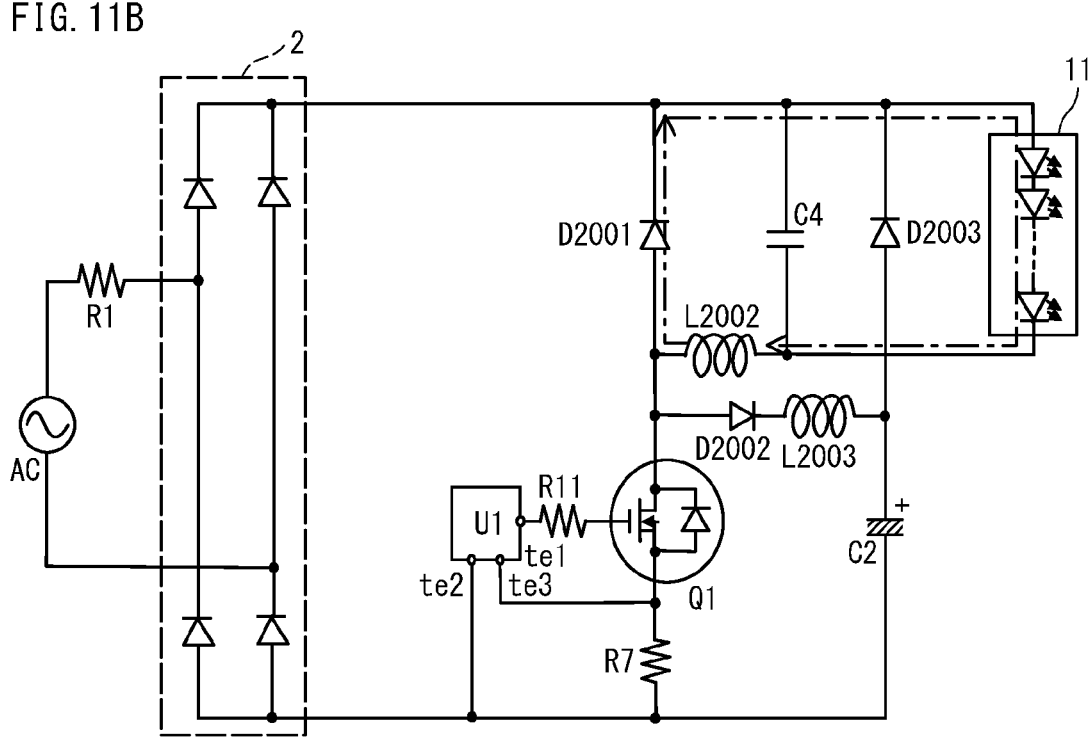

Each of FIGS. 11A and 11B is a circuit diagram of the DC power supply circuit pertaining to embodiment 2, including illustration of current flow in the DC power supply circuit.

Figure 12:
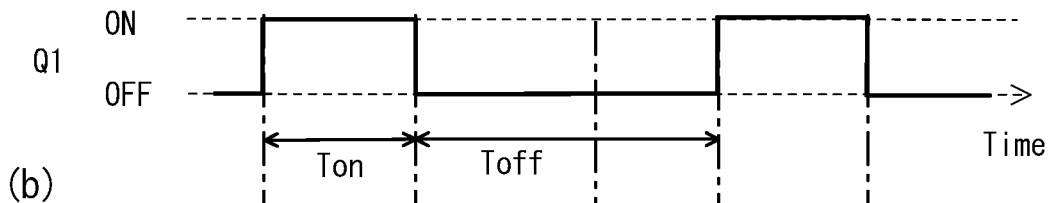
Figure 12:
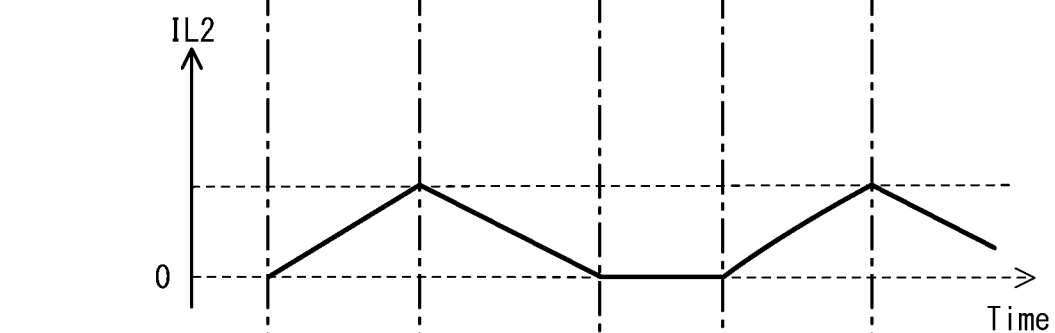
Figure 12:
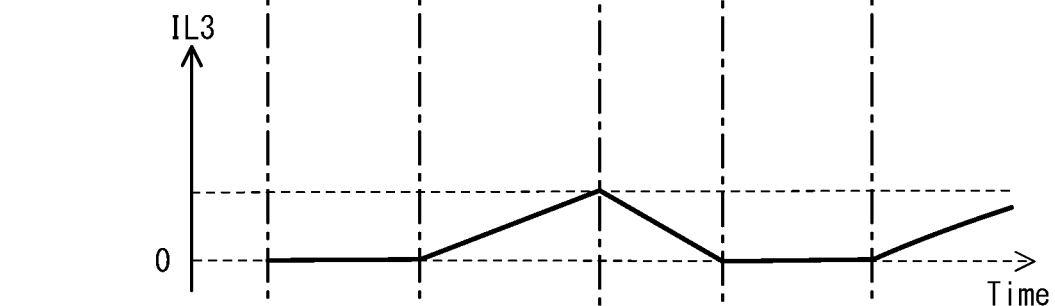
Figure 12:
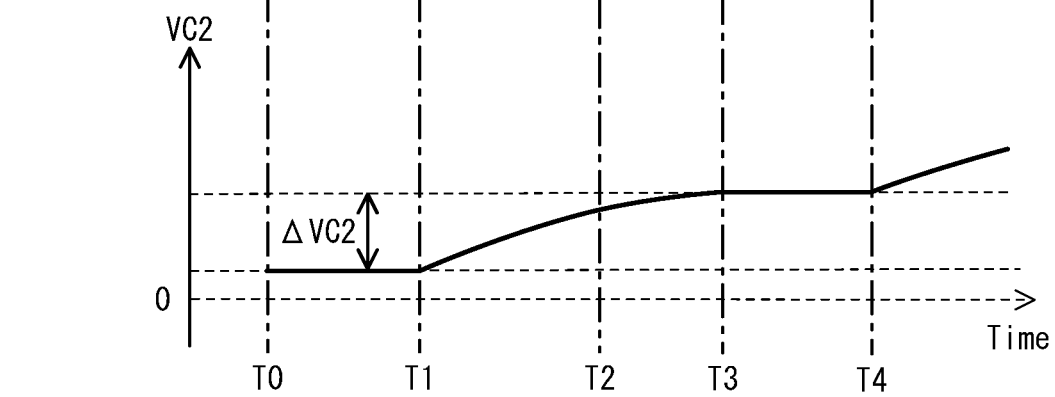

FIG. 12 includes portion (a) illustrating ON/OFF switching of switching element in the DC power supply circuit pertaining to embodiment 2, portion (b) illustrating a time domain waveform of current flowing through inductor in the DC power supply circuit pertaining to embodiment 2, portion (c) illustrating a time domain waveform of current flowing through another inductor (current-limiting element) in the DC power supply circuit pertaining to embodiment 2, and portion (d) illustrating a time domain waveform of voltage across terminals of capacitor in the DC power supply circuit pertaining to embodiment 2.

Figure 13:
Figure 13:
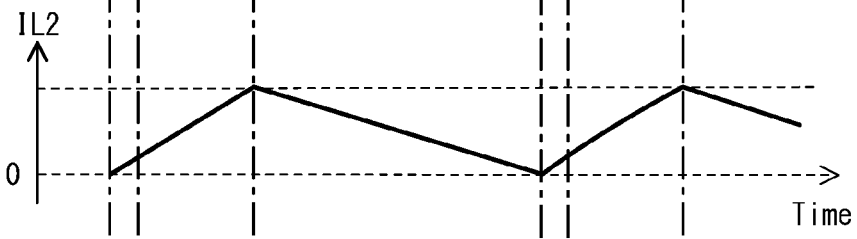
Figure 13:
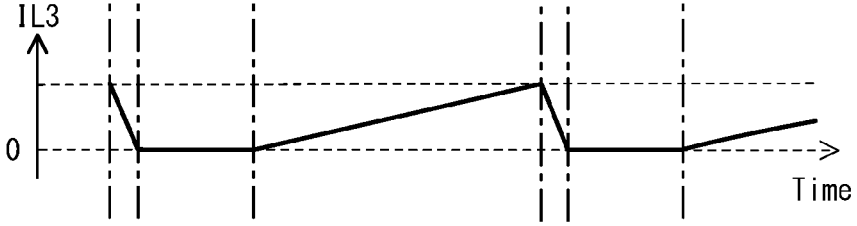
Figure 13:
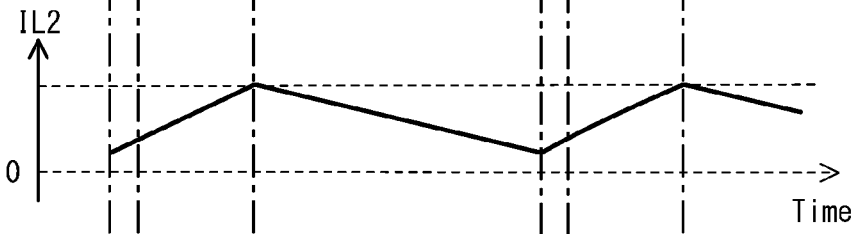
Figure 13:
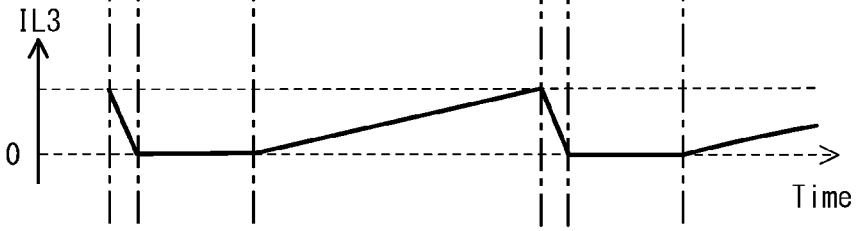
Figure 13:
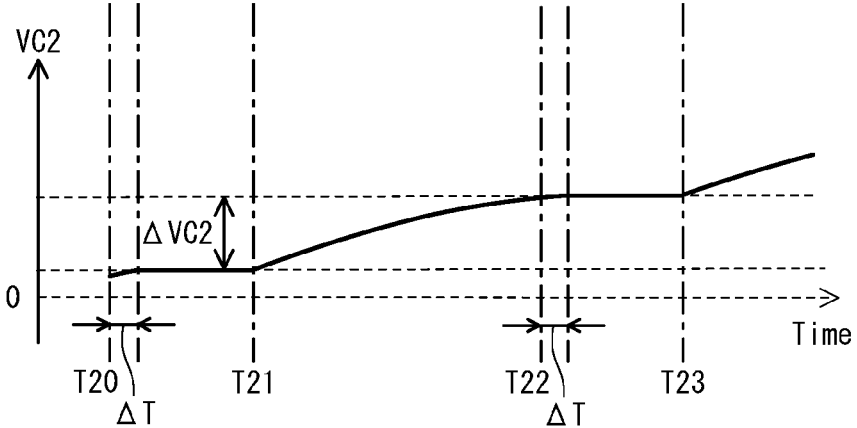

FIG. 13 includes portion (a) illustrating ON/OFF switching of switching element in the DC power supply circuit pertaining to embodiment 2, portions (b-1) and (c-1) each illustrating a time domain waveform of current flowing through inductor in the DC power supply circuit pertaining to embodiment 2, portions (b-2) and (c-2) each illustrating a time domain waveform of current flowing through another inductor (current-limiting element) in the DC power supply circuit pertaining to embodiment 2, and portion (d) illustrating a time domain waveform of voltage across terminals of capacitor in the DC power supply circuit pertaining to embodiment 2.

Figure 14:
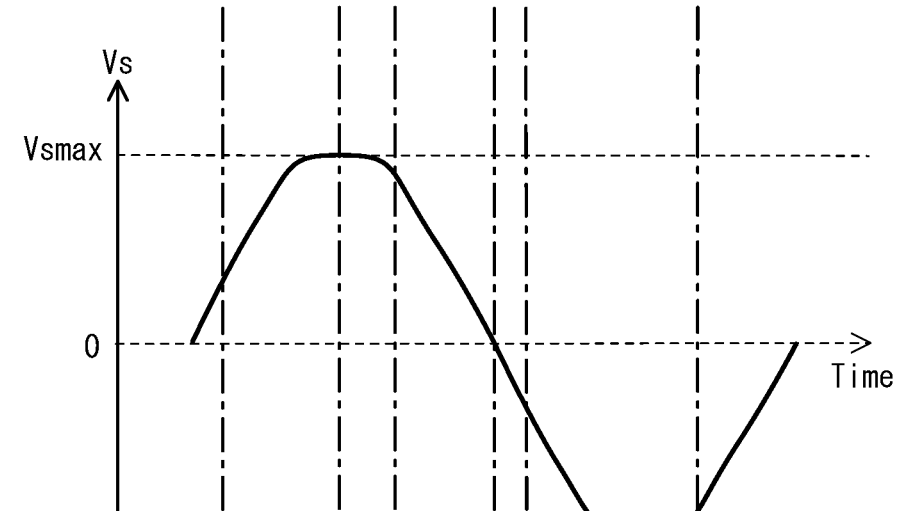
Figure 14:
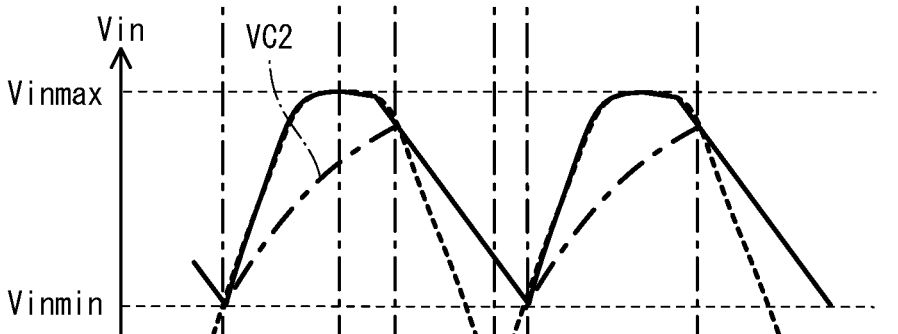
Figure 14:
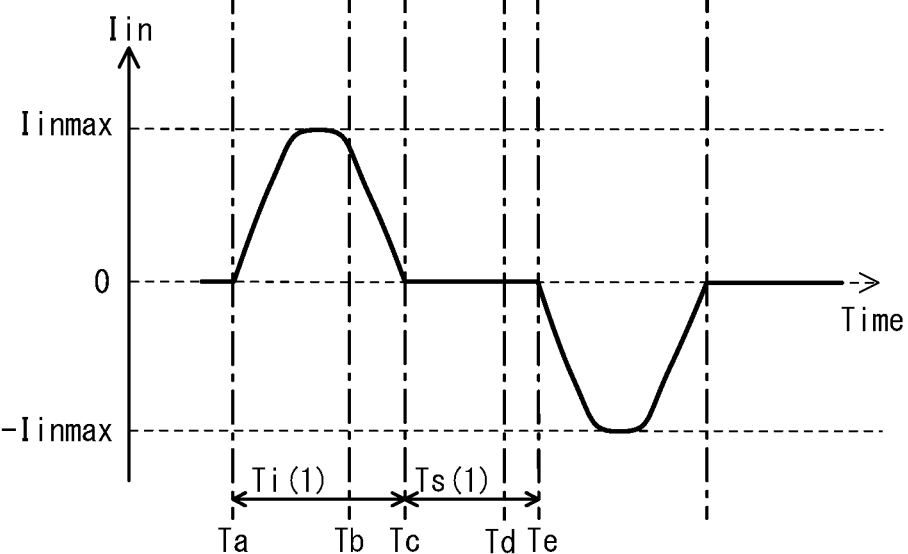

FIG. 14 includes portion (a) illustrating a time domain waveform of voltage input from AC power supply to rectifier circuit in the DC power supply circuit pertaining to embodiment 2, portion (b) illustrating a time domain waveform of voltage output from rectifier circuit in the DC power supply circuit pertaining to embodiment 2, and portion (c) illustrating a time domain waveform of current flowing from AC power supply to rectifier circuit in the DC power supply circuit pertaining to embodiment 2.

Figure 15:
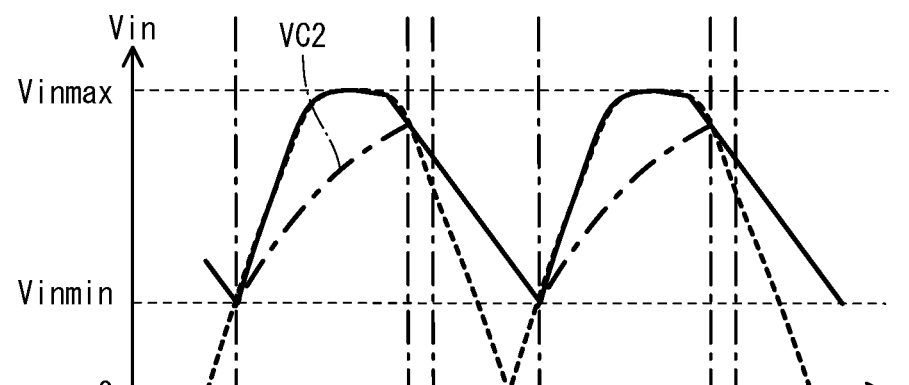
Figure 15:
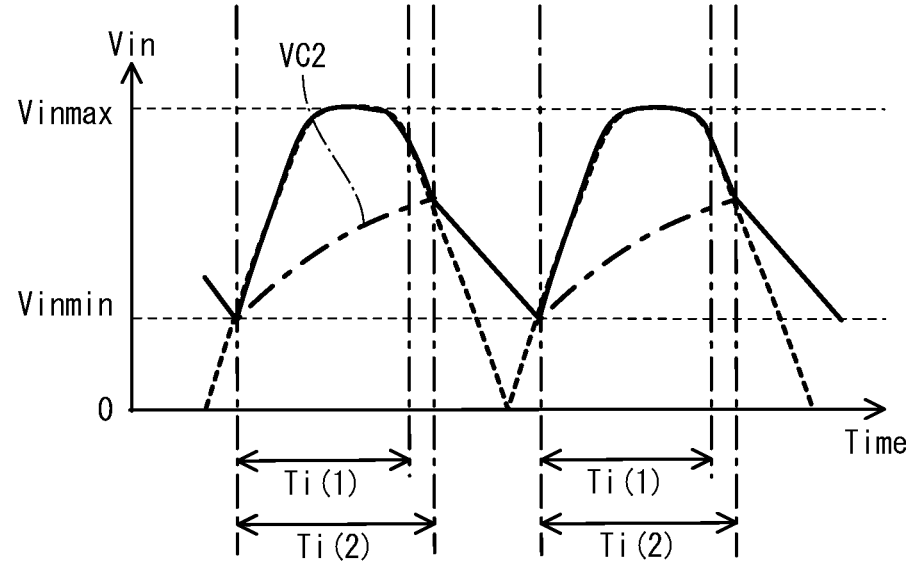

FIG. 15 includes portions (a) and (b) each illustrating a time domain waveform of voltage output from rectifier circuit in the DC power supply circuit pertaining to embodiment 2.

Figure 16:
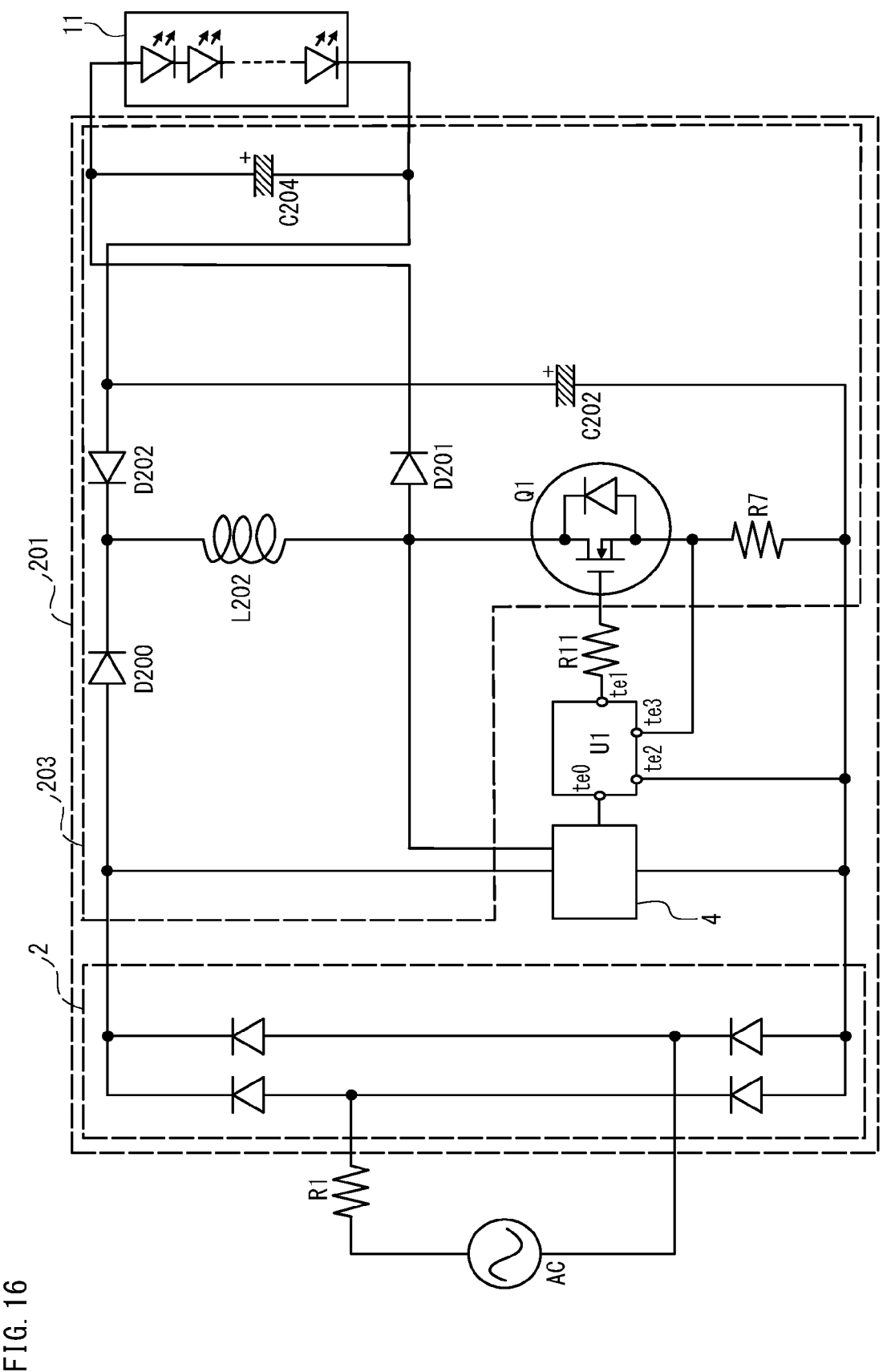

FIG. 16 is a circuit diagram illustrating a DC power supply circuit pertaining to embodiment 3.

Figure 17A:
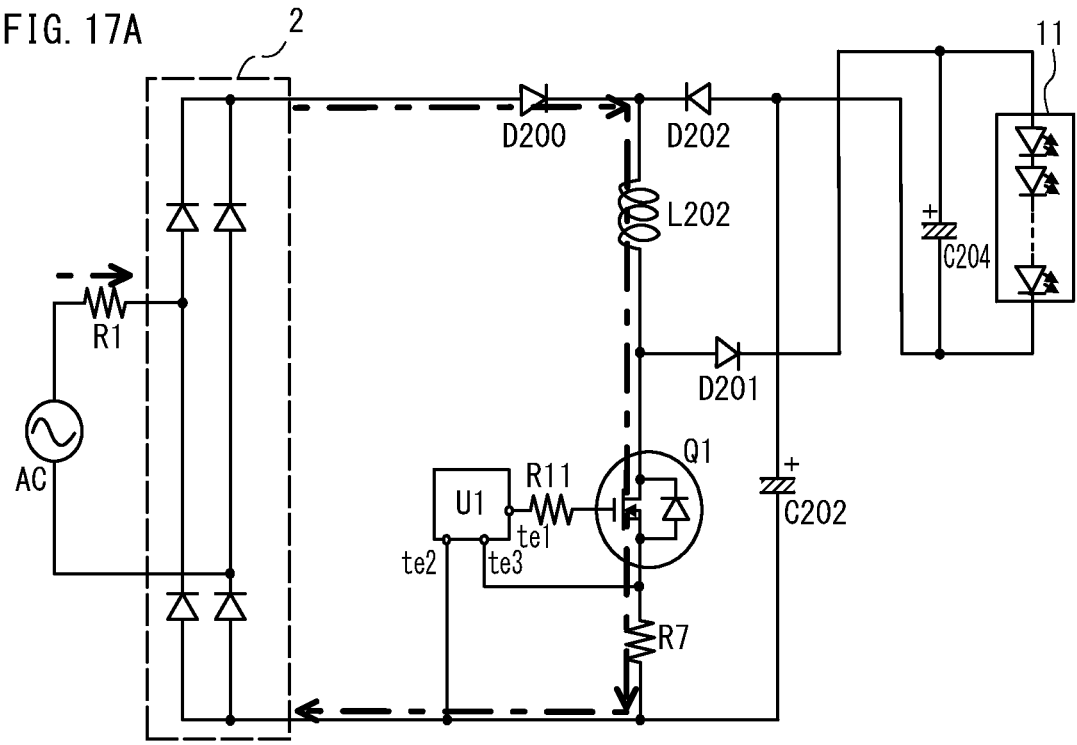
Figure 17B:
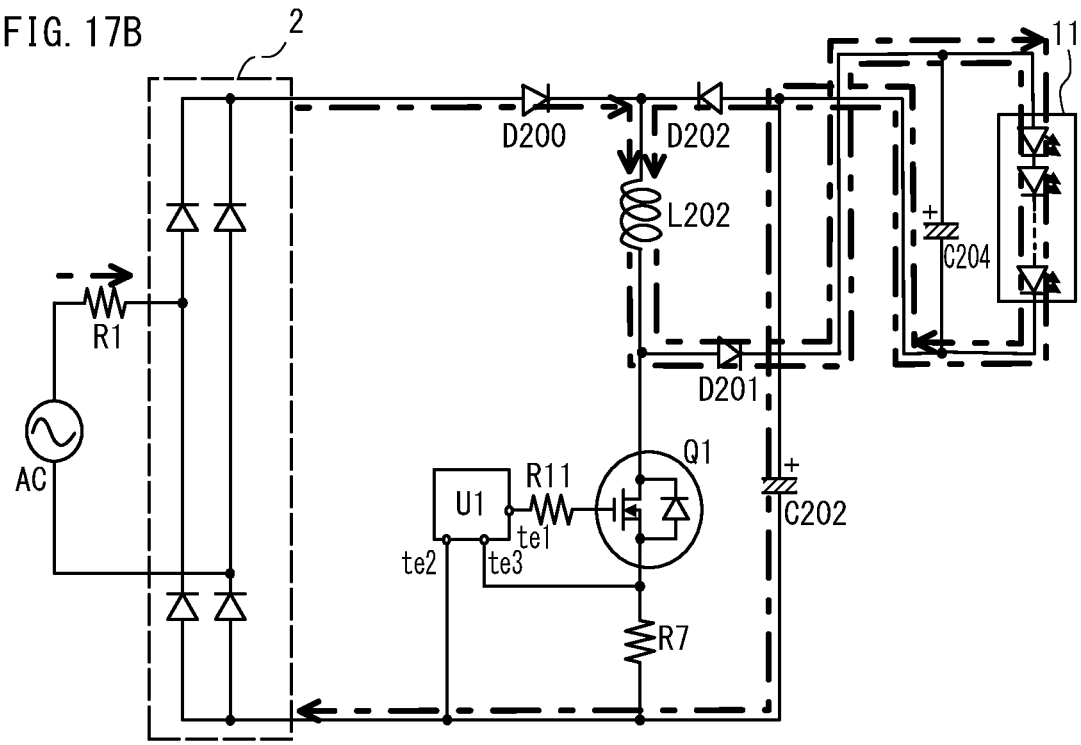

Each of FIGS. 17A and 17B is a circuit diagram of the DC power supply circuit pertaining to embodiment 3, including illustration of current flow in the DC power supply circuit.

Figure 18A:
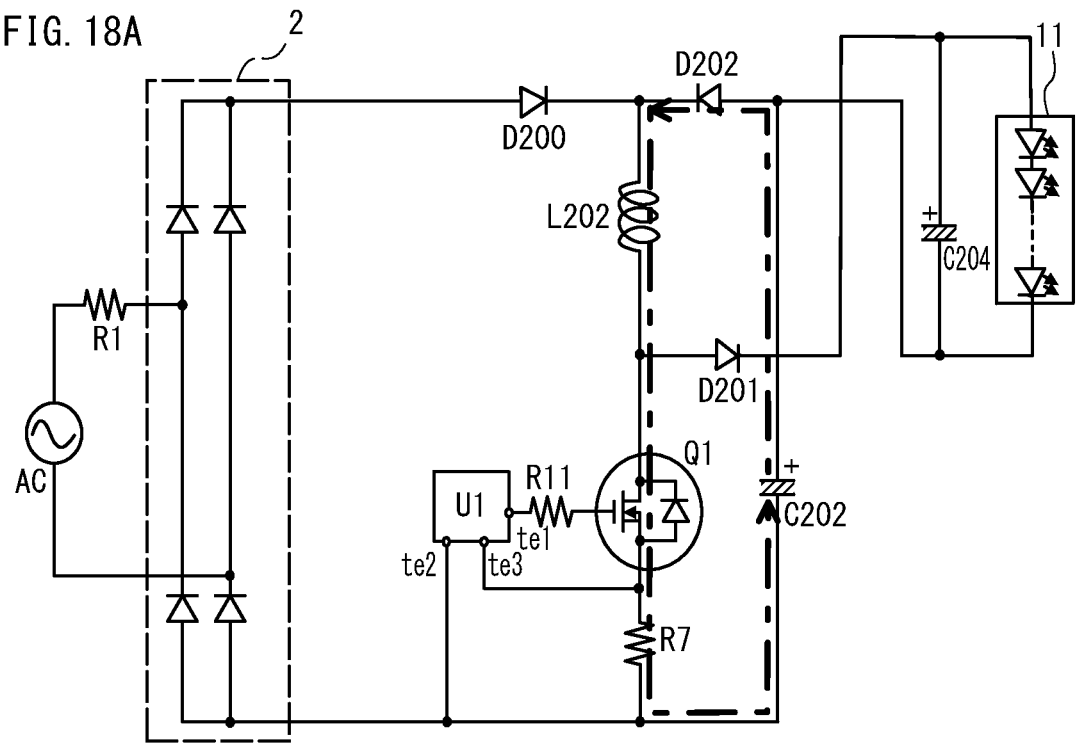
Figure 18B:
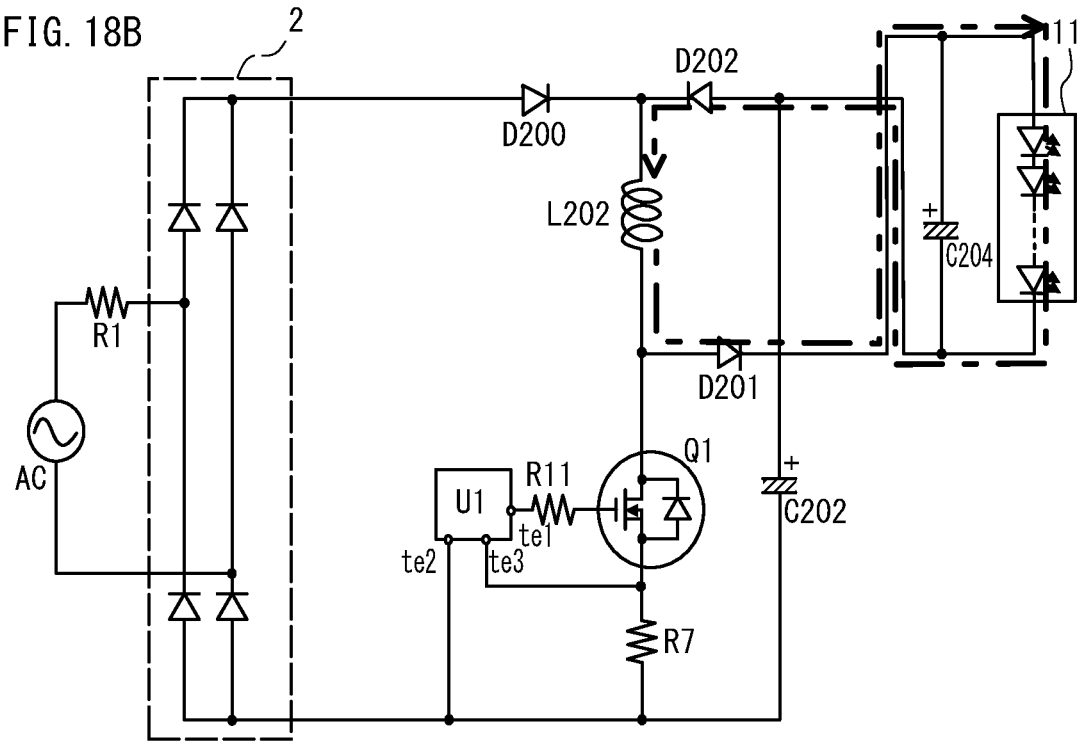

Each of FIGS. 18A and 18B is a circuit diagram of the DC power supply circuit pertaining to embodiment 3, including illustration of current flow in the DC power supply circuit.

Figure 19:
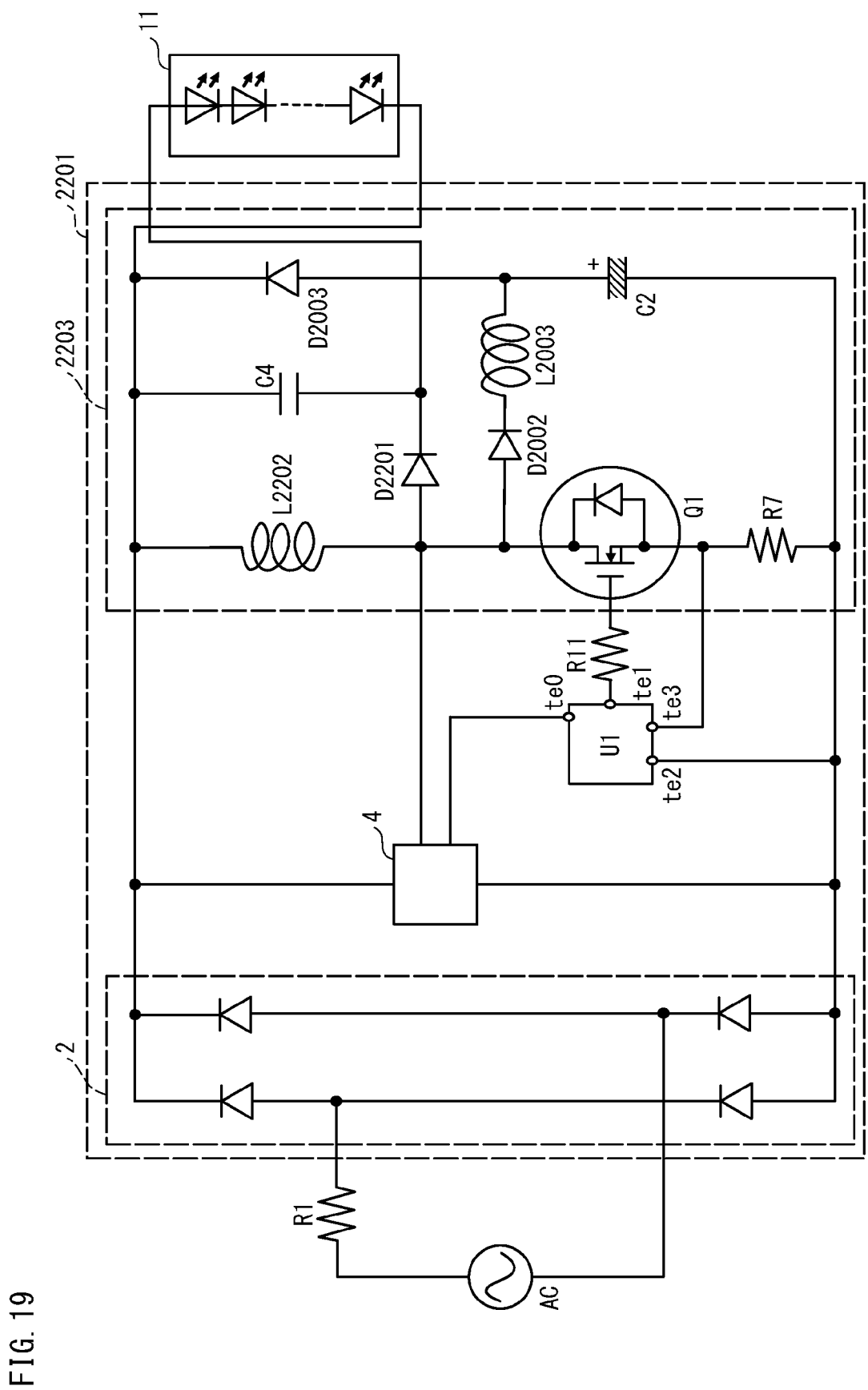

FIG. 19 is a circuit diagram illustrating a DC power supply circuit pertaining to embodiment 4.

Figure 20A:
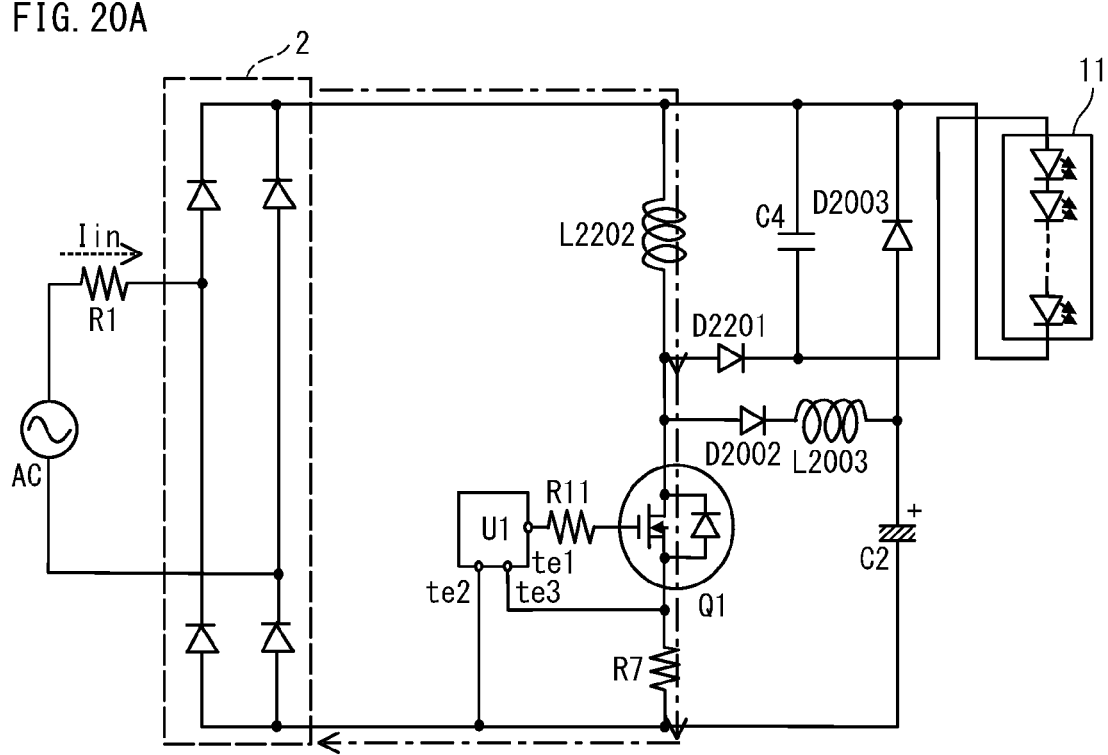
Figure 20B:
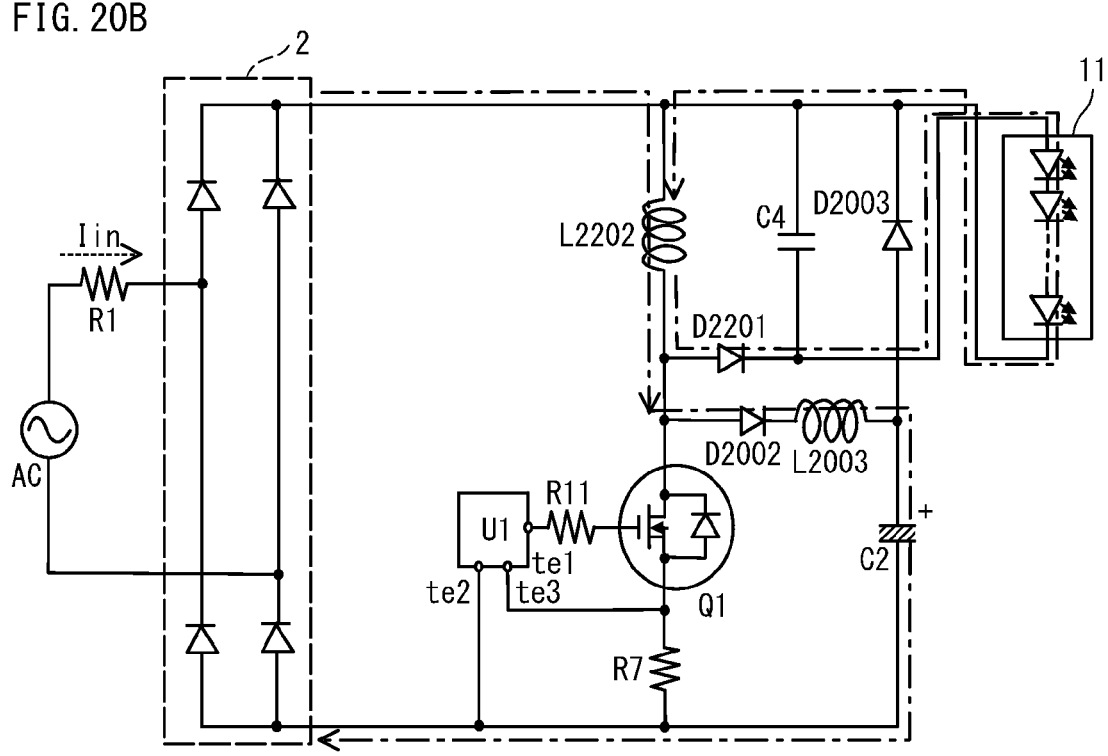

Each of FIGS. 20A and 20B is a circuit diagram of the DC power supply circuit pertaining to embodiment 4, including illustration of current flow in the DC power supply circuit.

Figure 21A:
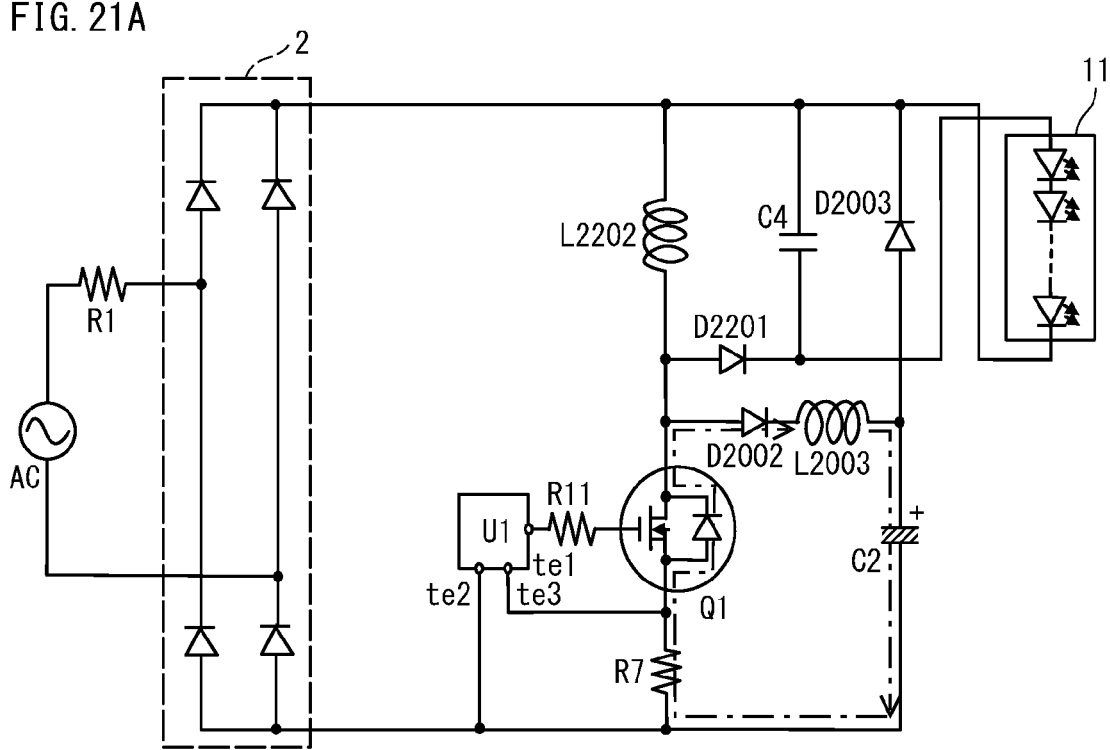
Figure 21B:
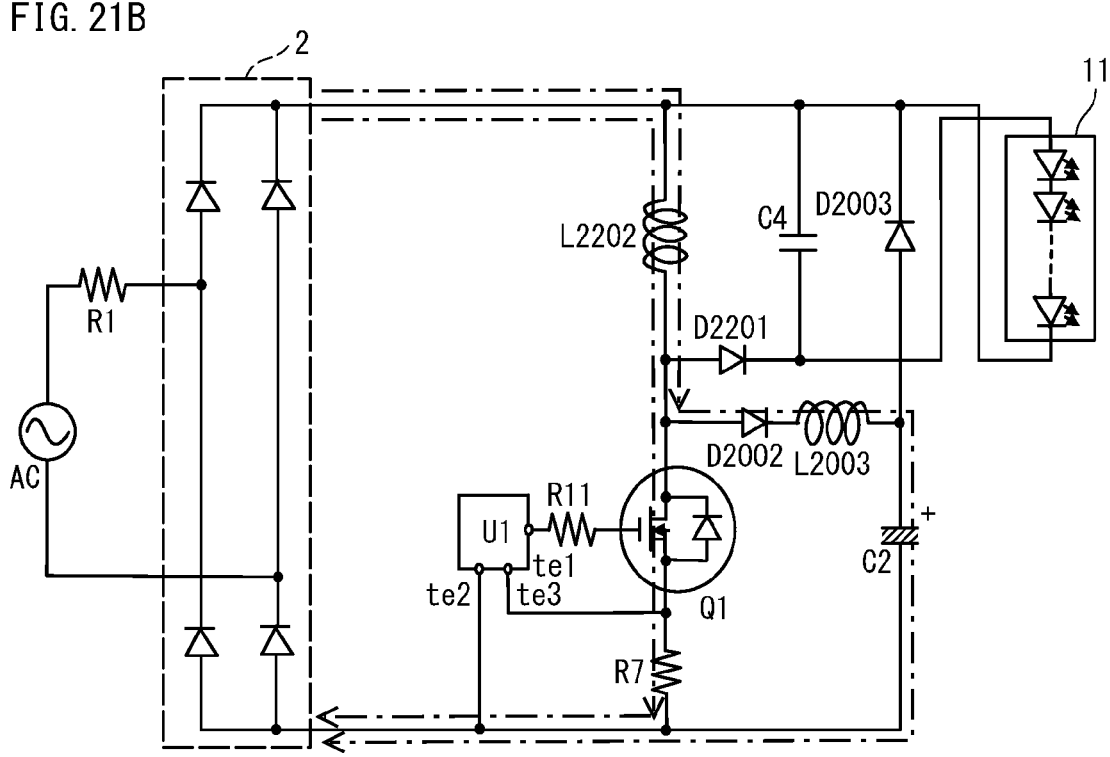

Each of FIGS. 21A and 21B is a circuit diagram of the DC power supply circuit pertaining to embodiment 4, including illustration of current flow in the DC power supply circuit.

Figure 22A:
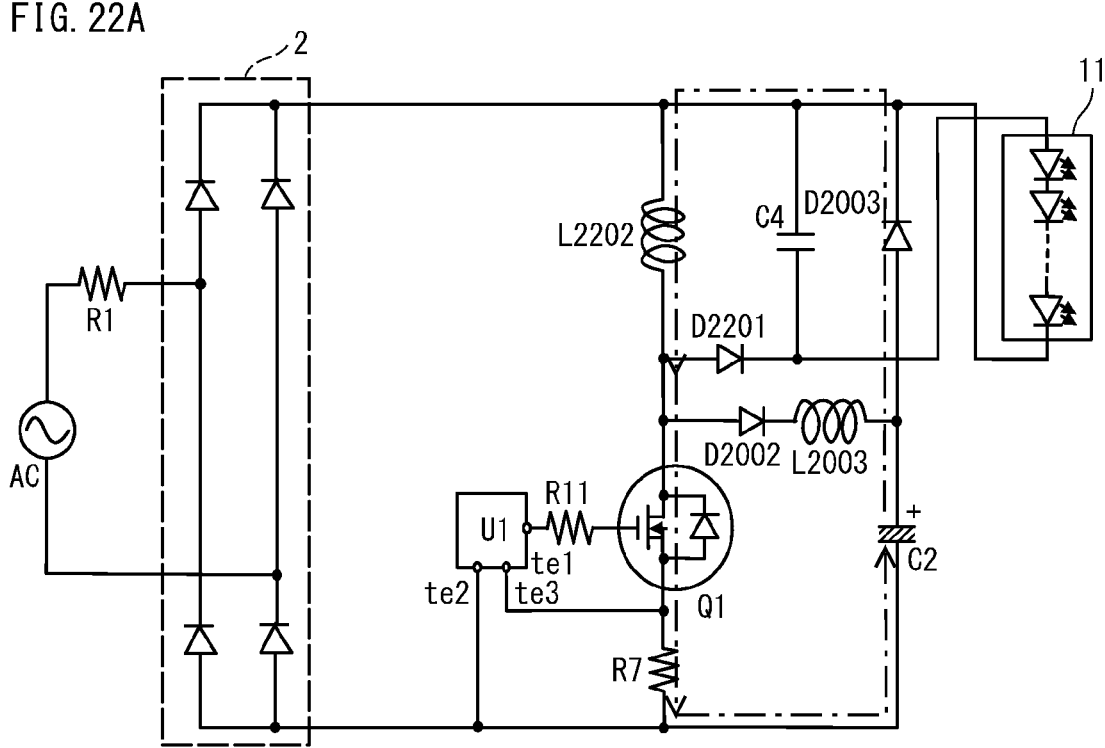
Figure 22B:
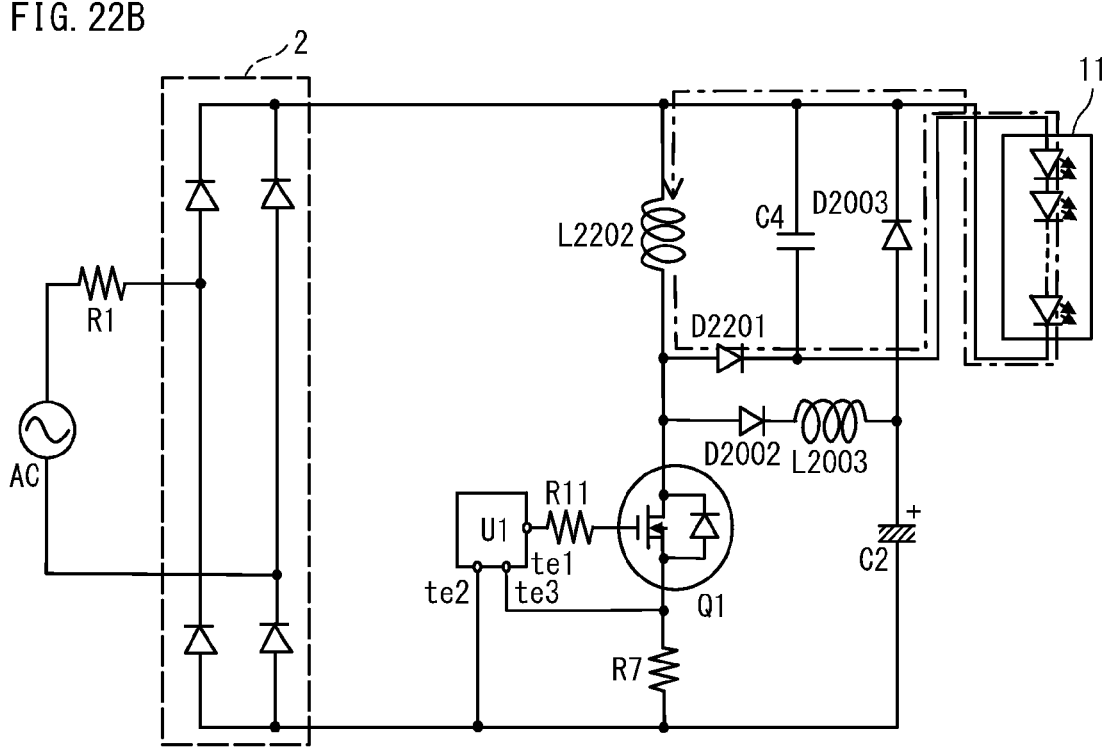

Each of FIGS. 22A and 22B is a circuit diagram of the DC power supply circuit pertaining to embodiment 4, including illustration of current flow in the DC power supply circuit.

Figure 23:
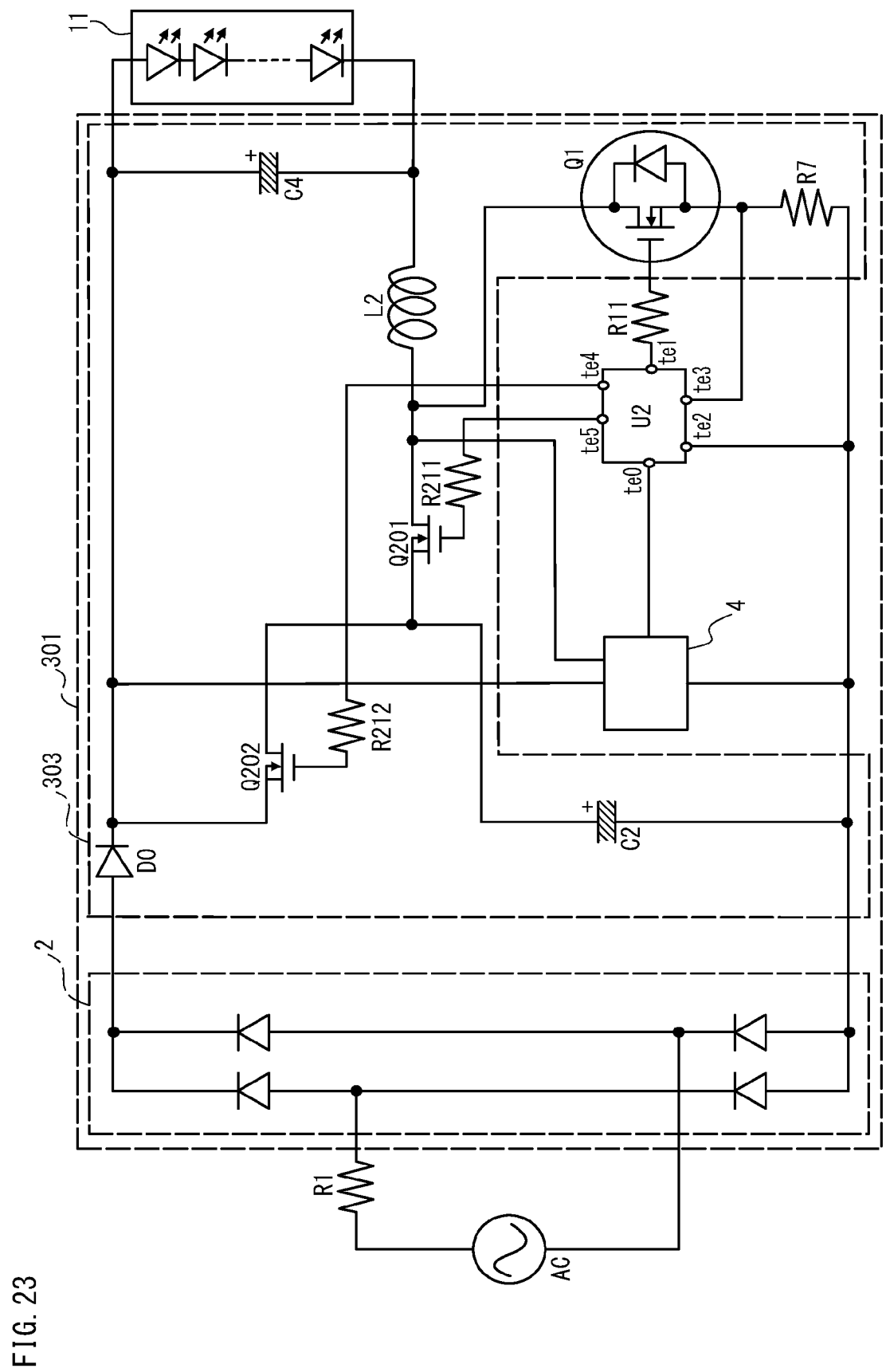

FIG. 23 is a circuit diagram illustrating a DC power supply circuit pertaining to a modification.

Figure 24A:
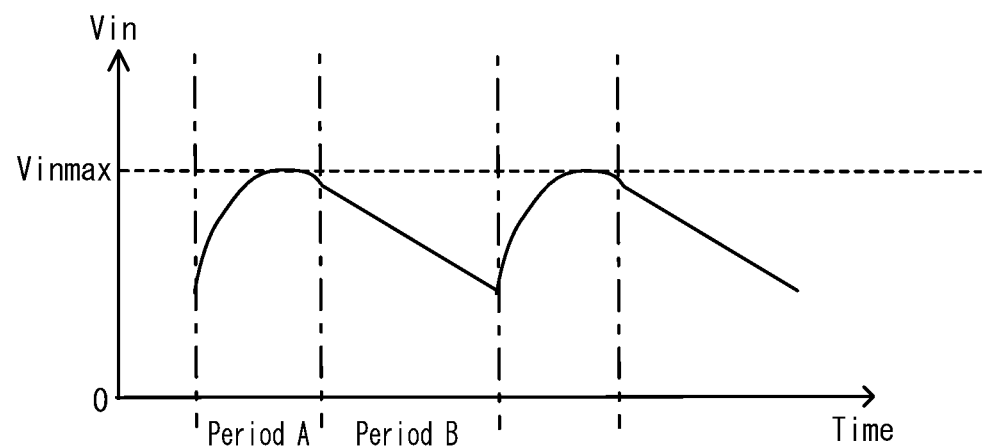
Figure 24B:
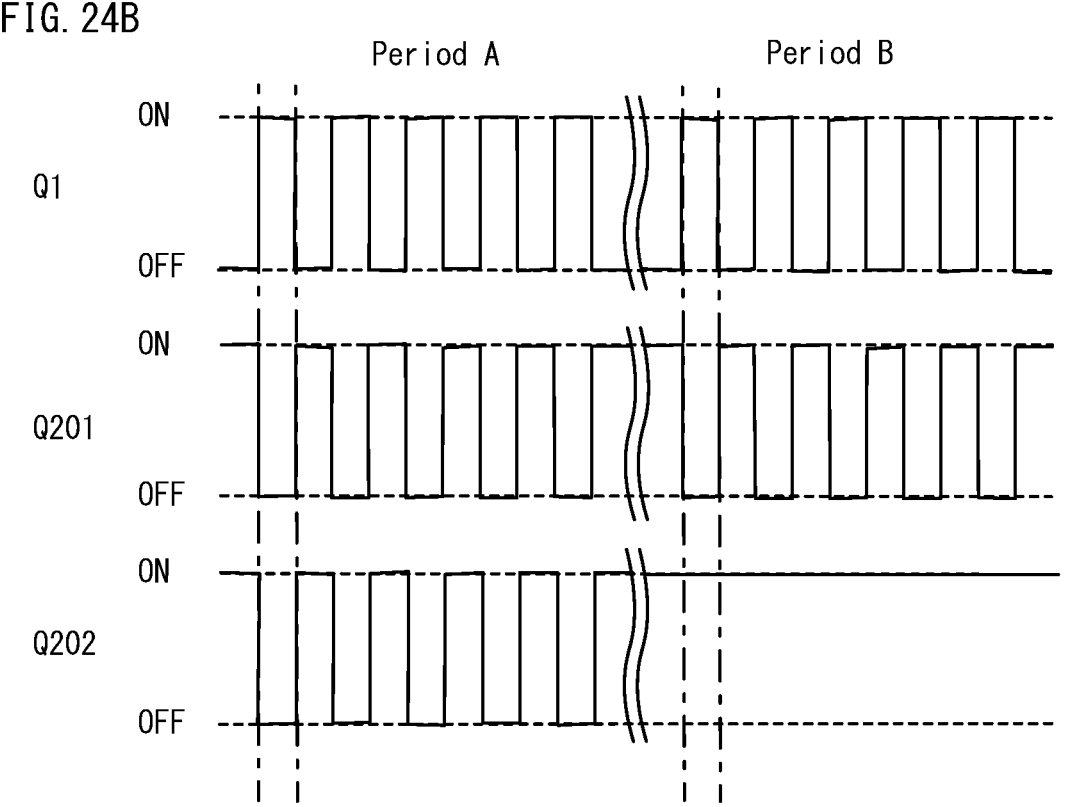

FIG. 24A illustrates a time domain waveform of voltage output from rectifier circuit in the DC power supply circuit pertaining to the modification, and FIG. 24B illustrates ON/OFF switching of each switching element in the DC power supply circuit pertaining to the modification.

Figure 25:
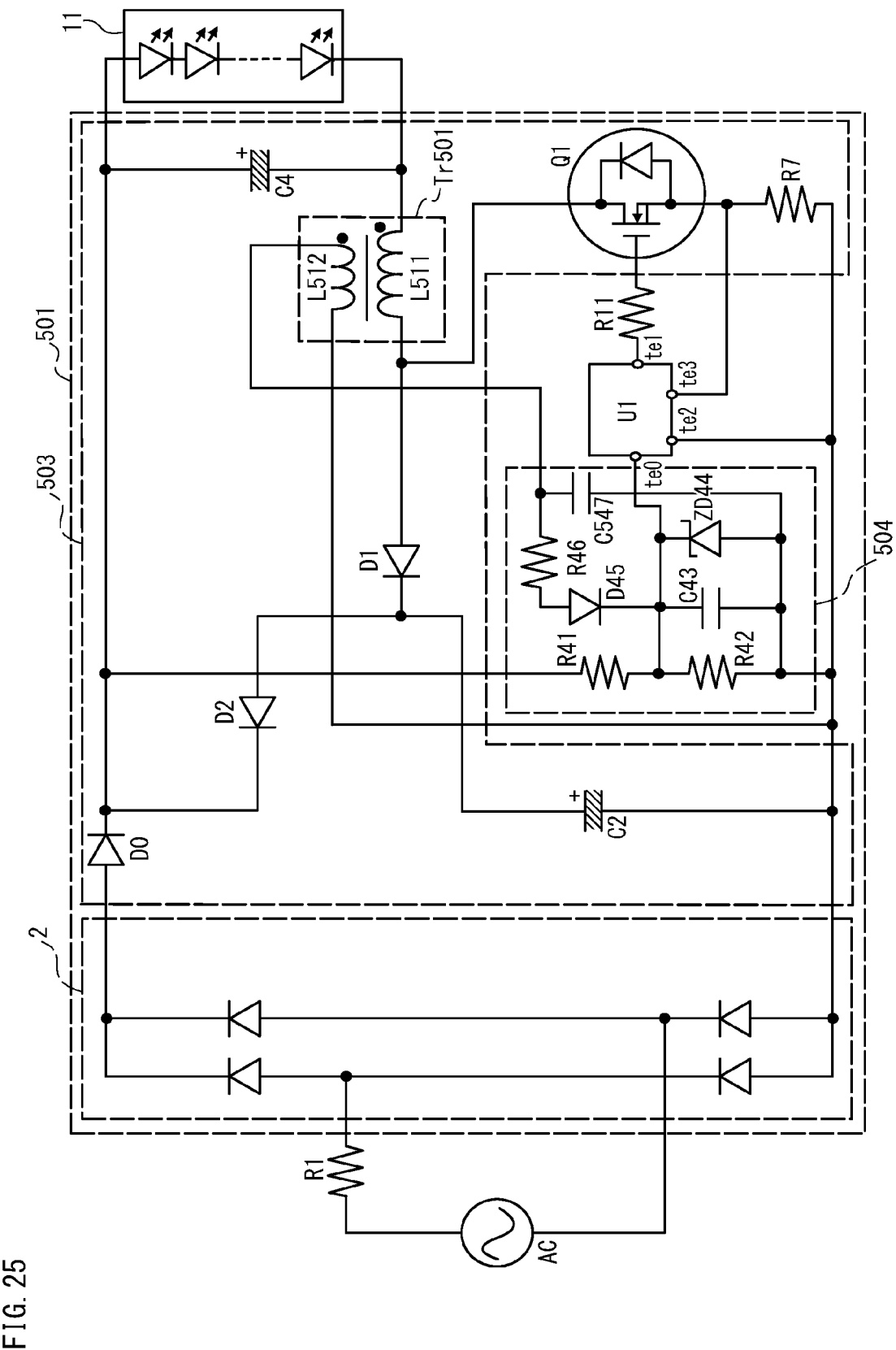

FIG. 25 is a circuit diagram illustrating a DC power supply circuit pertaining to another modification.

Figure 26:
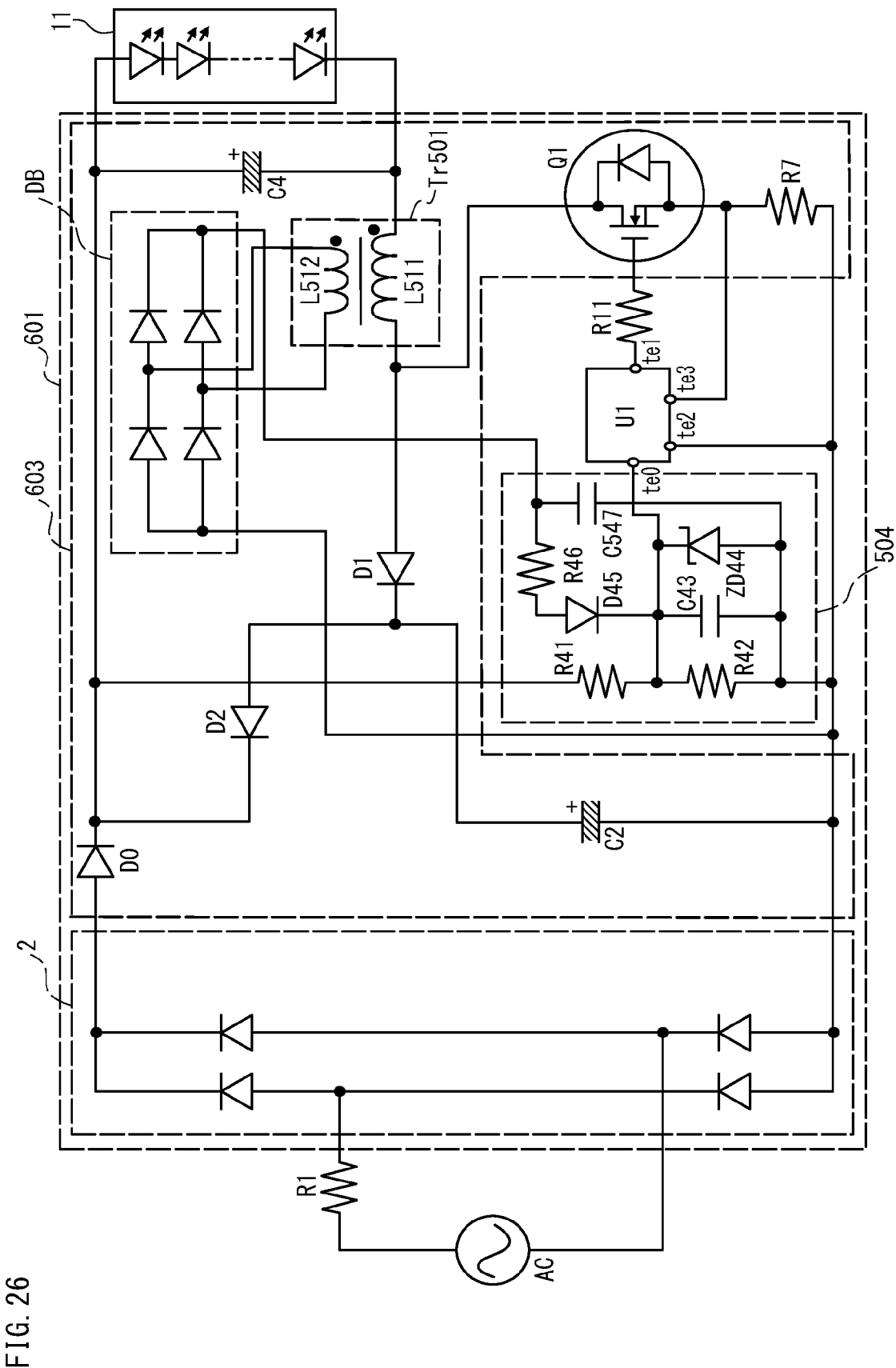

FIG. 26 is a circuit diagram illustrating a DC power supply circuit pertaining to another modification.

Figure 27:
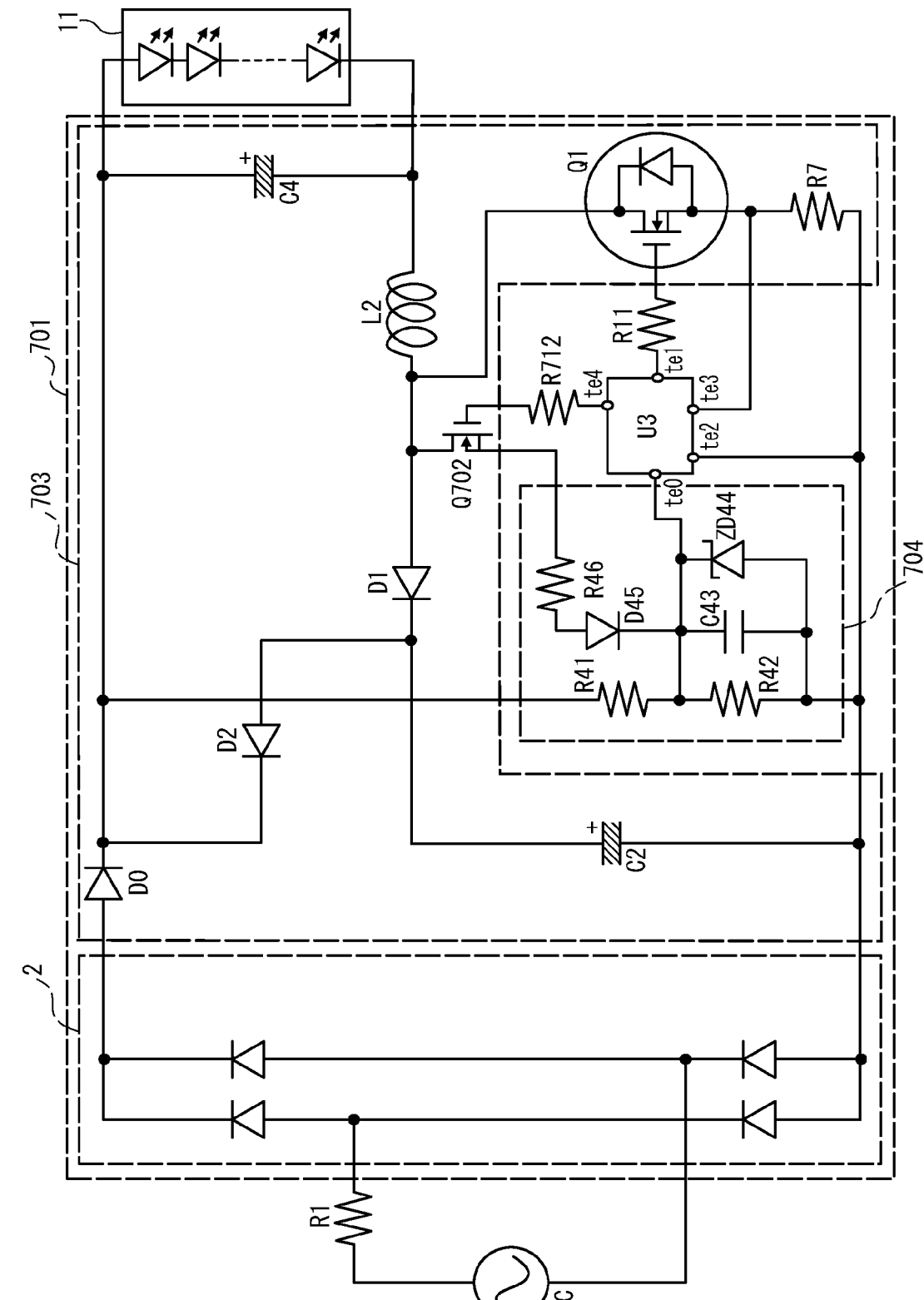

FIG. 27 is a circuit diagram illustrating a DC power supply circuit pertaining to another modification.

Figure 28:
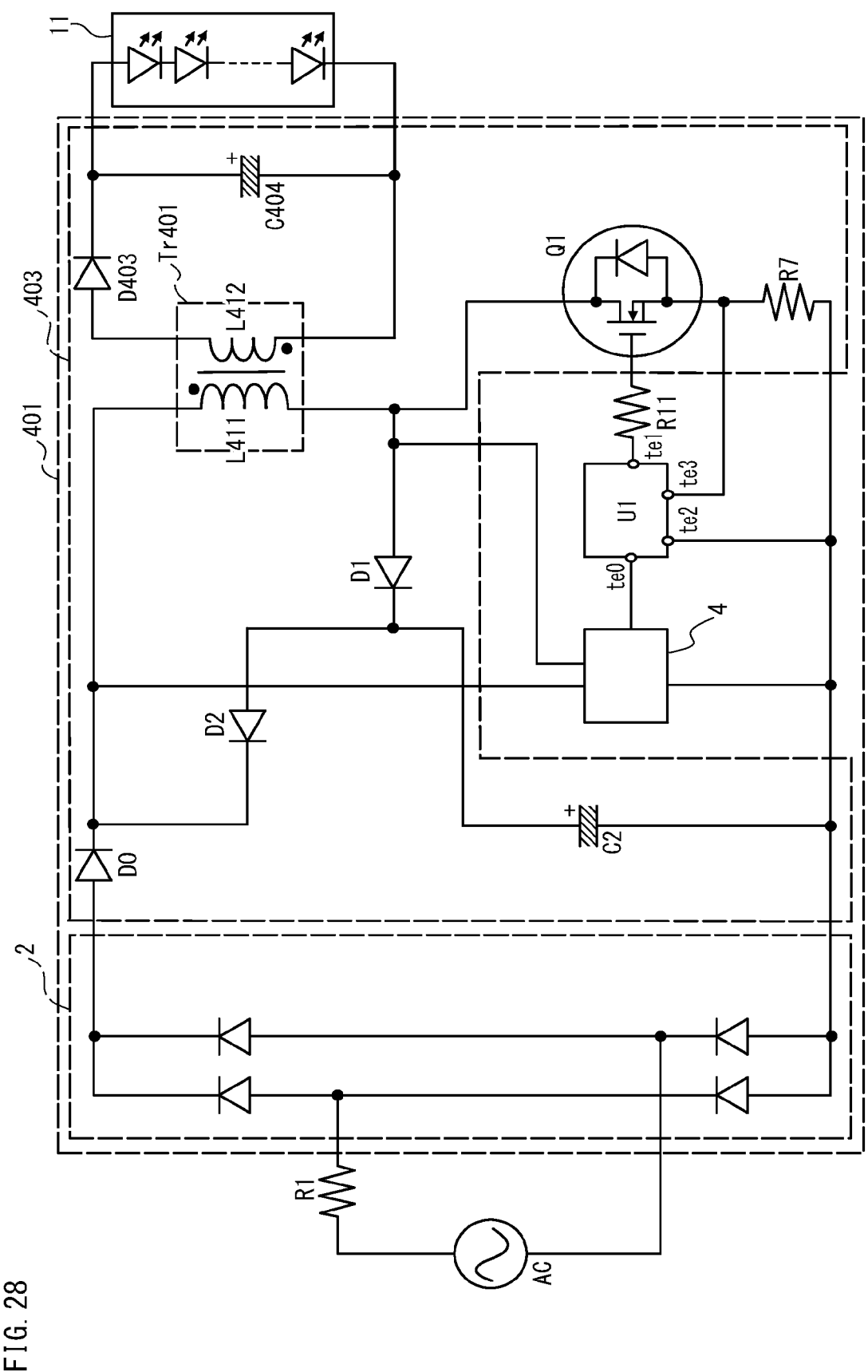

FIG. 28 is a circuit diagram illustrating a DC power supply circuit pertaining to another modification.

Figure 29:
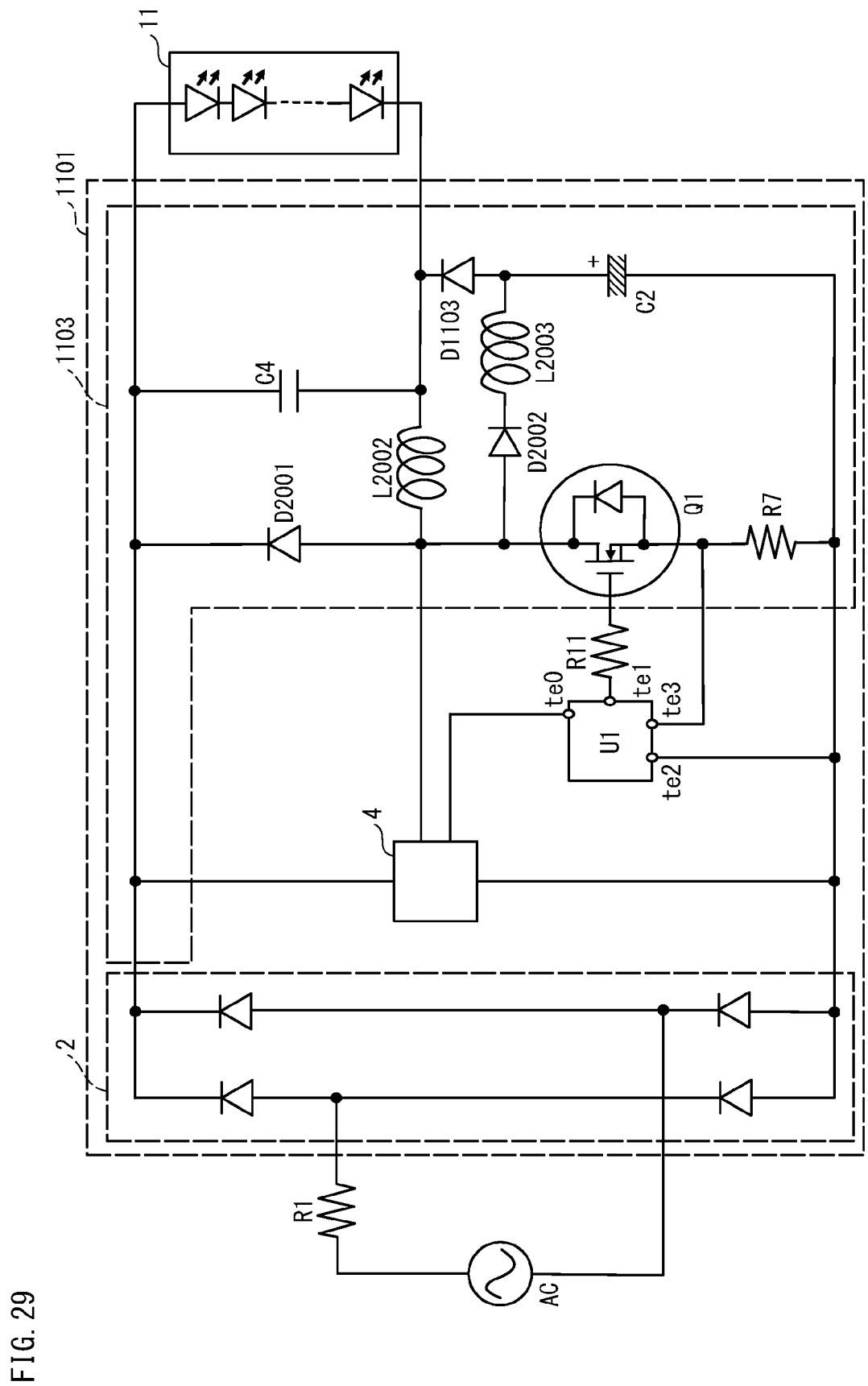

FIG. 29 is a circuit diagram illustrating a DC power supply circuit pertaining to another modification.

Figure 30:
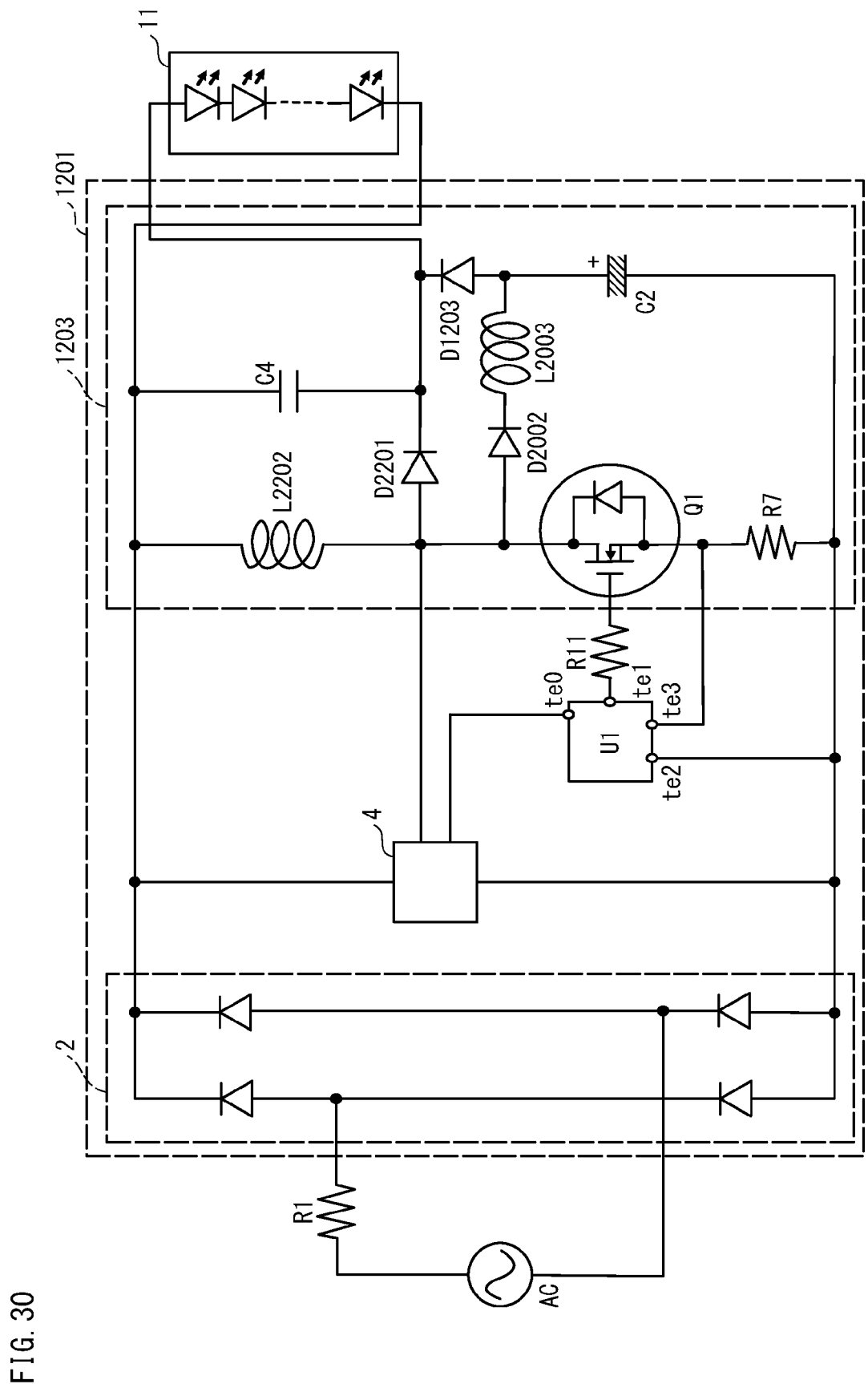

FIG. 30 is a circuit diagram illustrating a DC power supply circuit pertaining to another modification.

Figure 31:
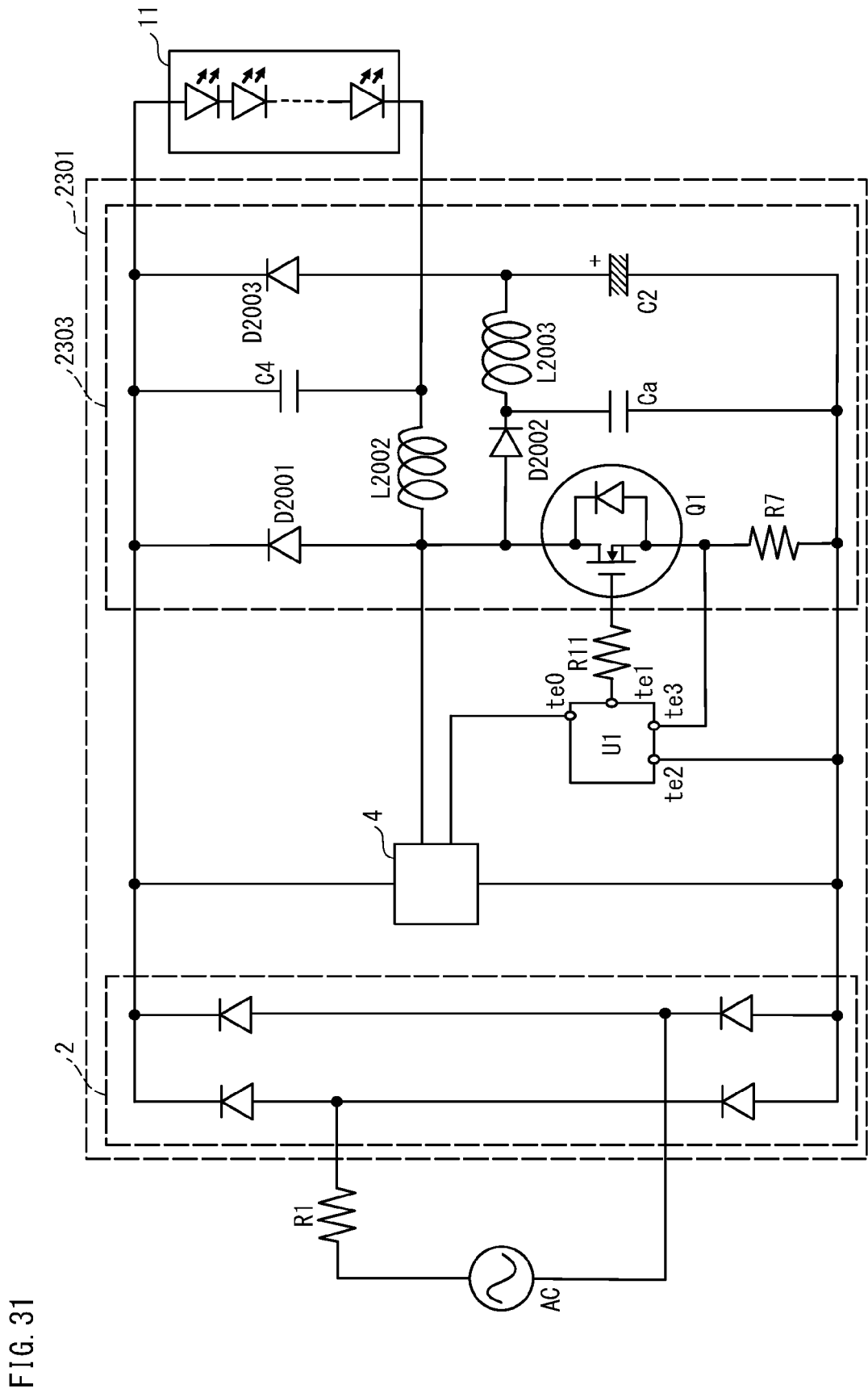

FIG. 31 is a circuit diagram illustrating a DC power supply circuit pertaining to another modification.

Figure 32:
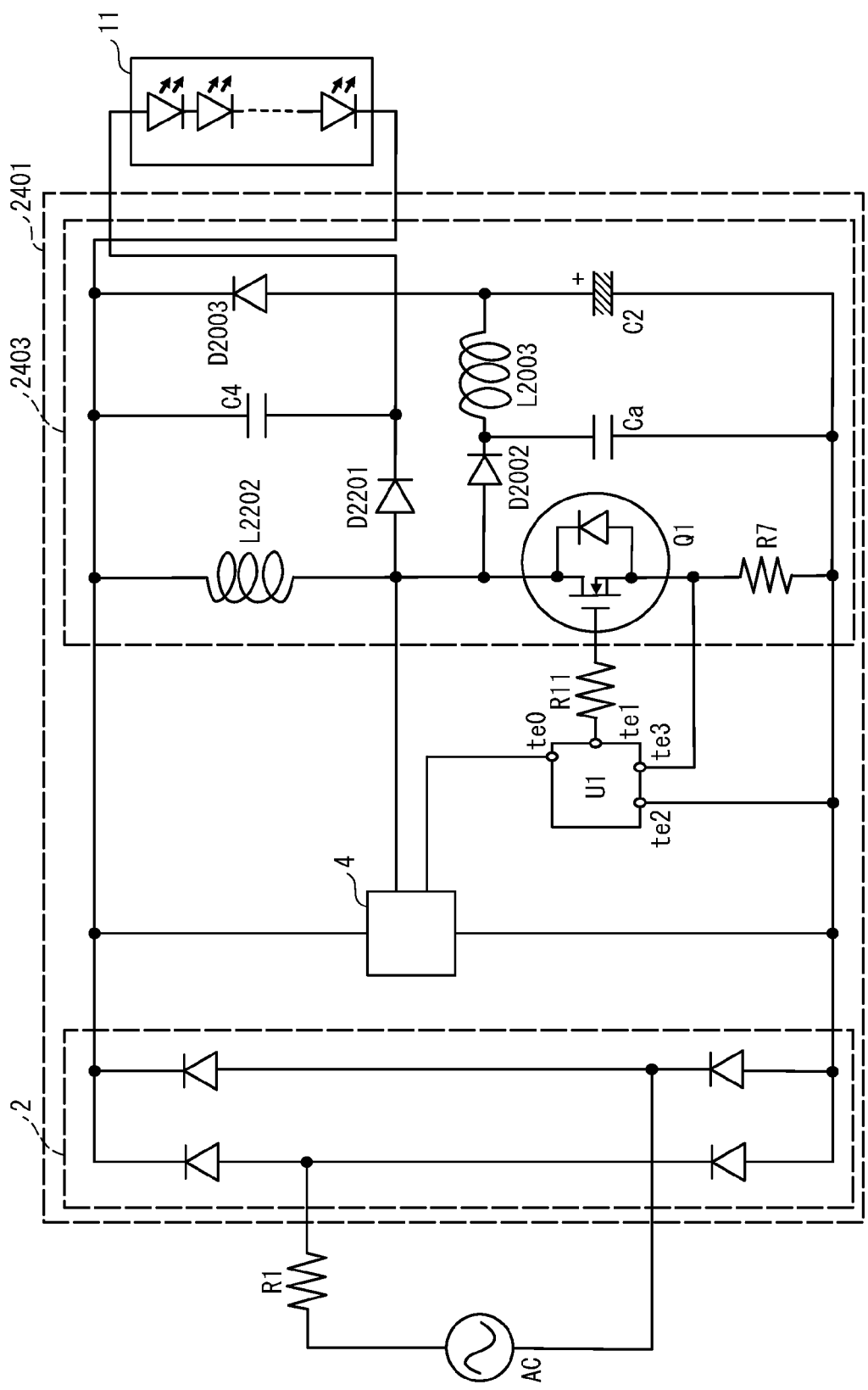

FIG. 32 is a circuit diagram illustrating a DC power supply circuit pertaining to another modification.

Figure 33:
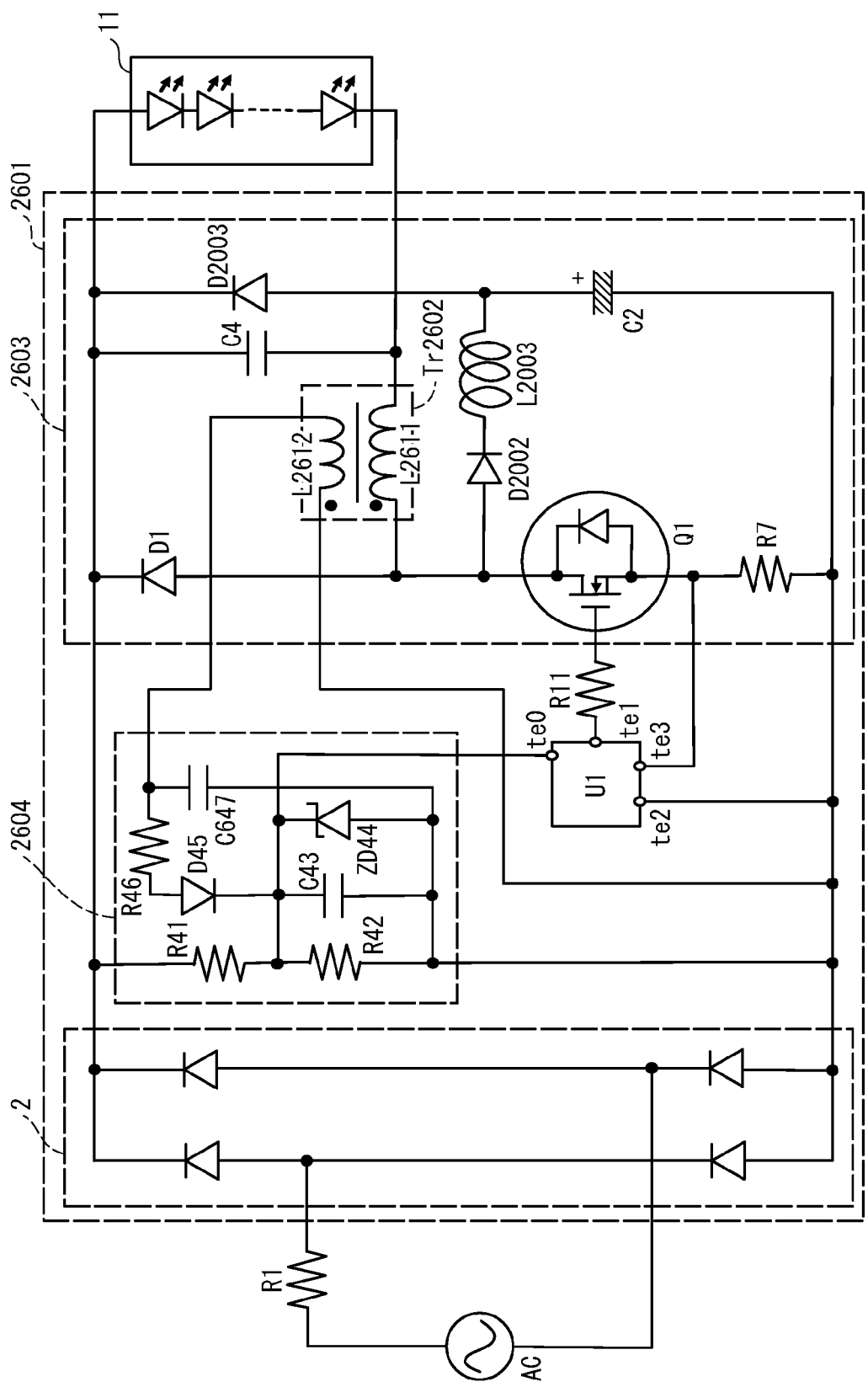

FIG. 33 is a circuit diagram illustrating a DC power supply circuit pertaining to another modification.

Figure 34:
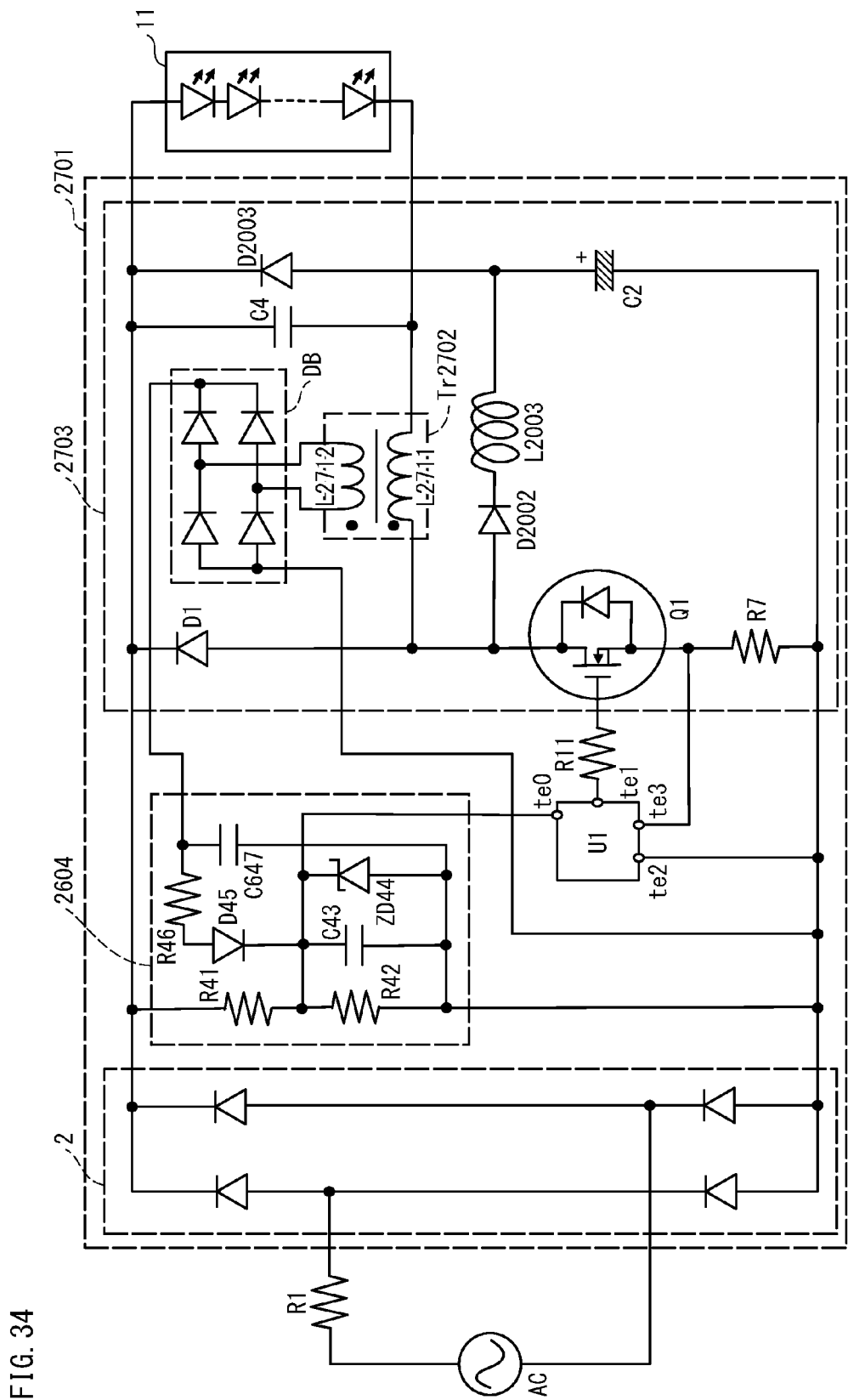

FIG. 34 is a circuit diagram illustrating a DC power supply circuit pertaining to another modification.

Figure 35:
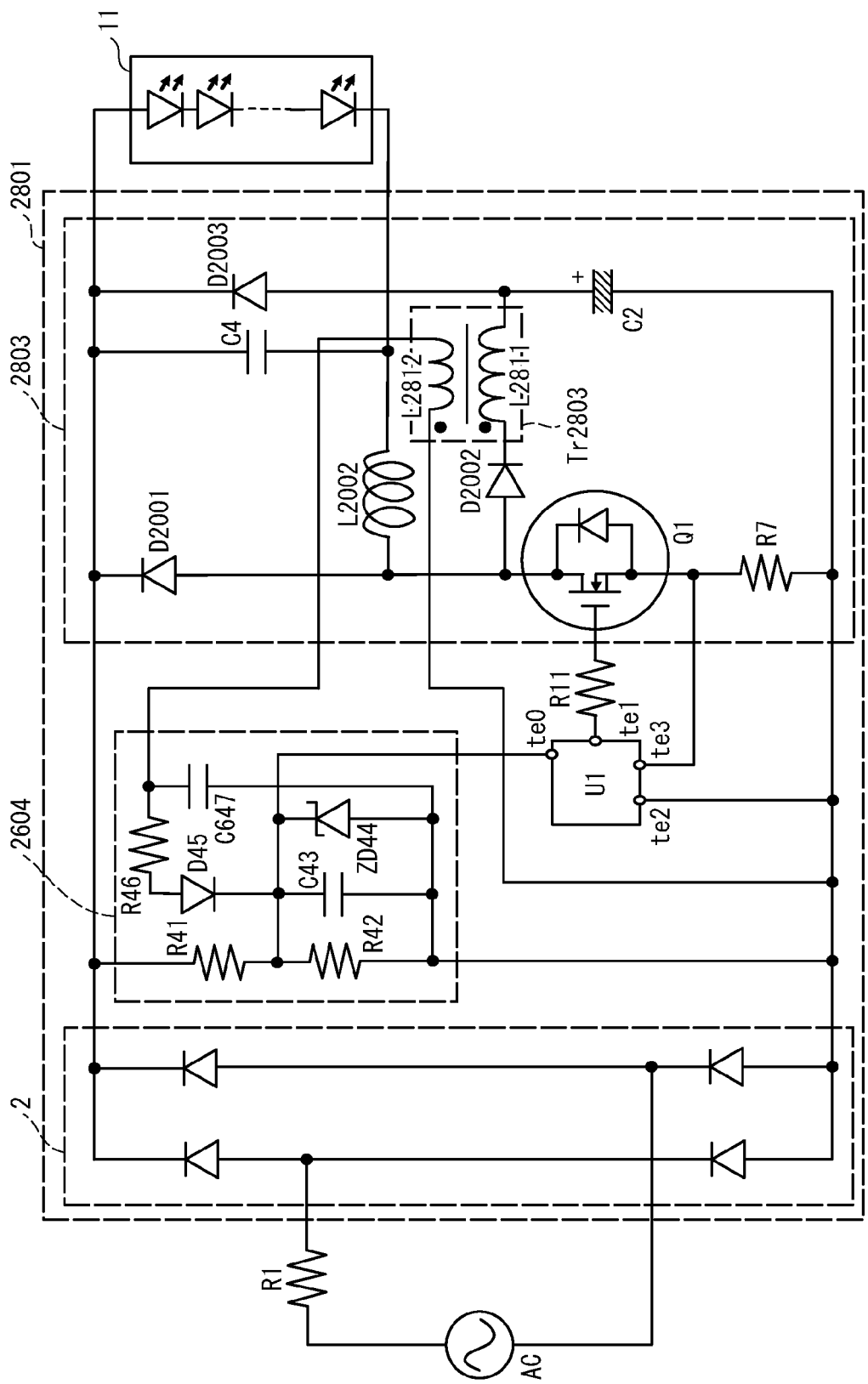

FIG. 35 is a circuit diagram illustrating a DC power supply circuit pertaining to another modification.

Figure 36:
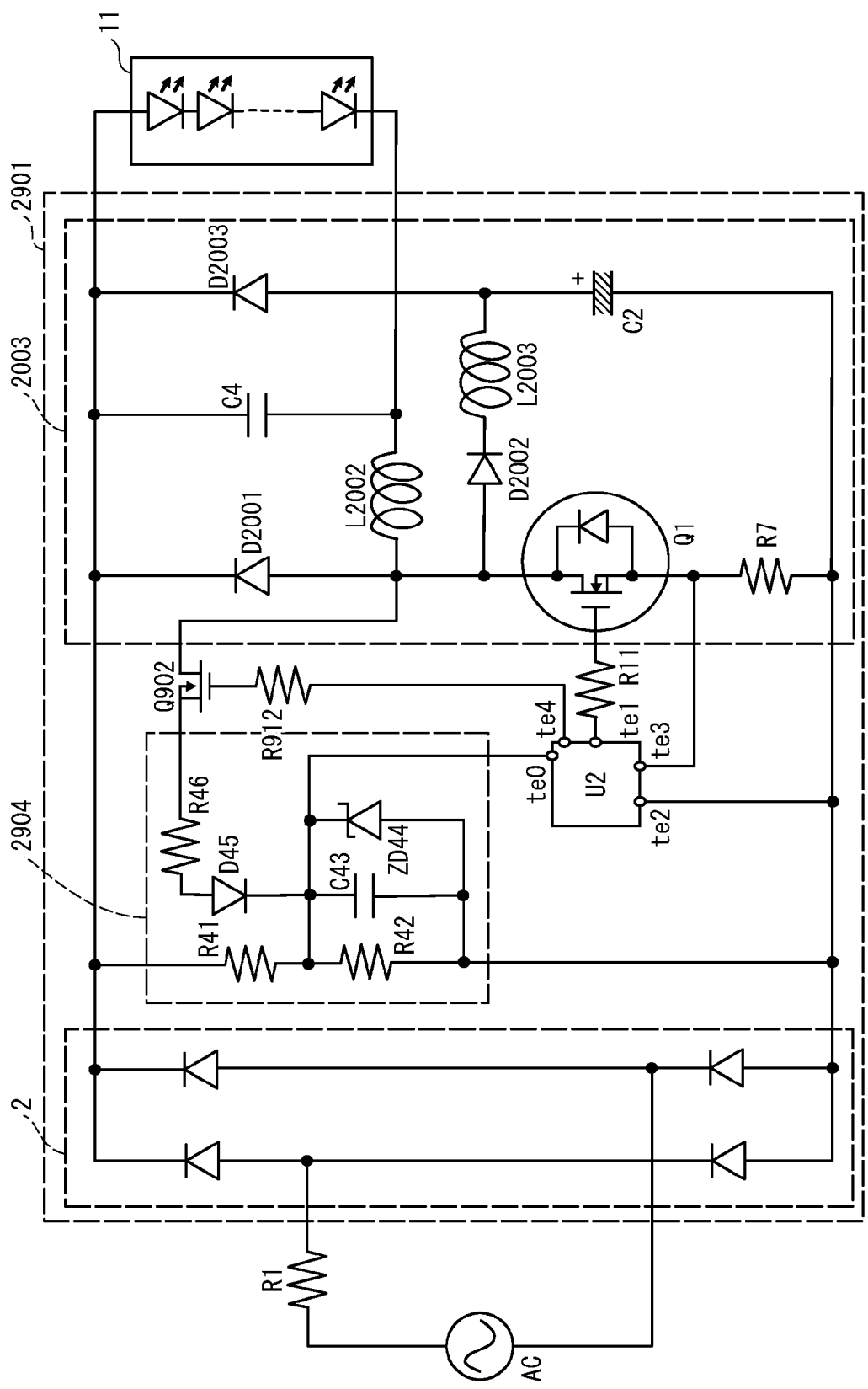

FIG. 36 is a circuit diagram illustrating a DC power supply circuit pertaining to another modification.

Figure 37:
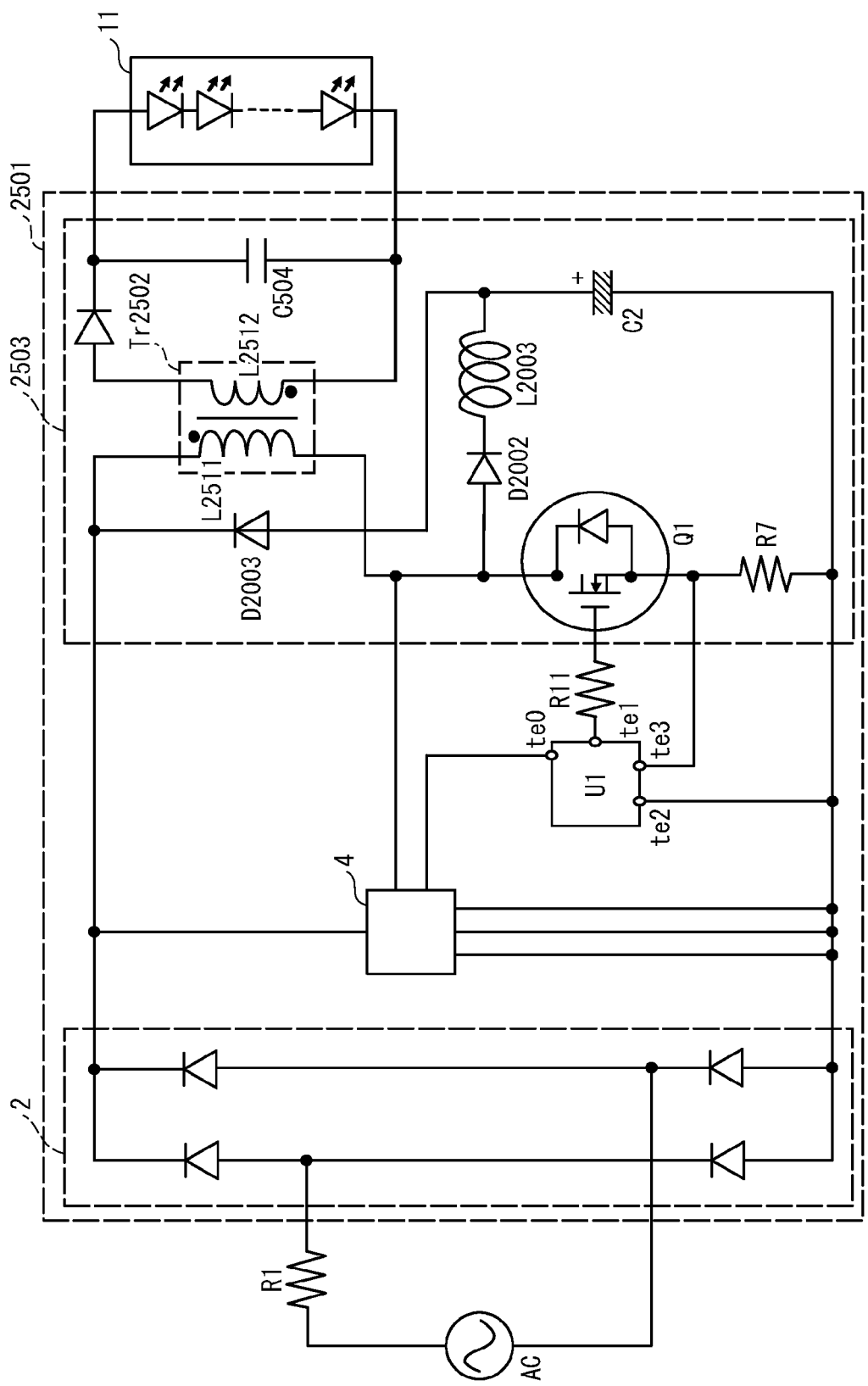

FIG. 37 is a circuit diagram illustrating a DC power supply circuit pertaining to another modification.

Figure 38A:
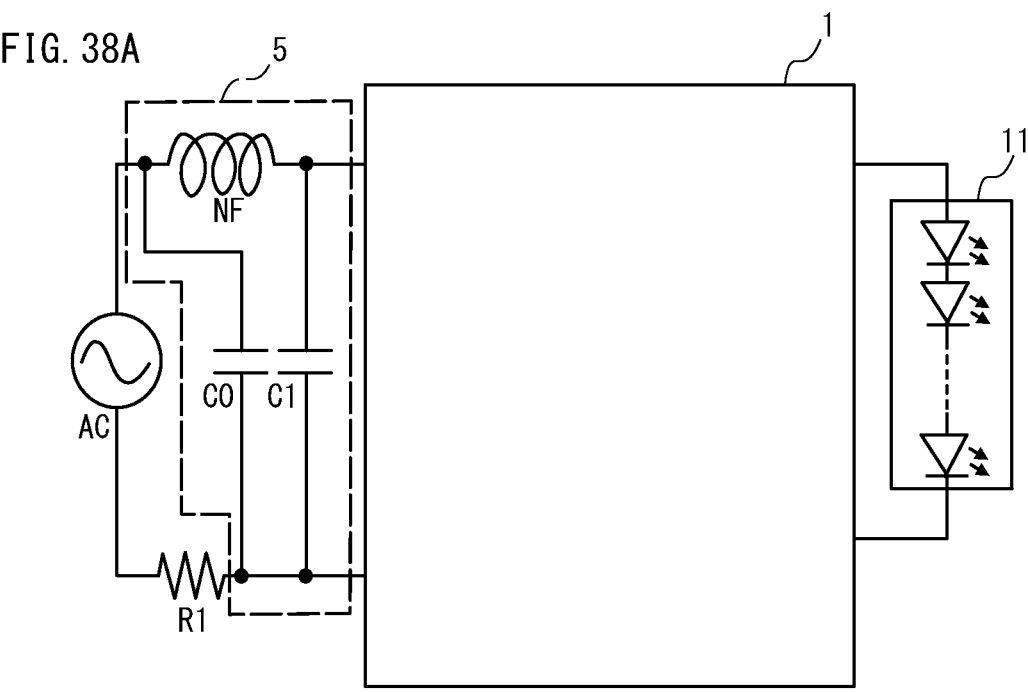
Figure 38B:
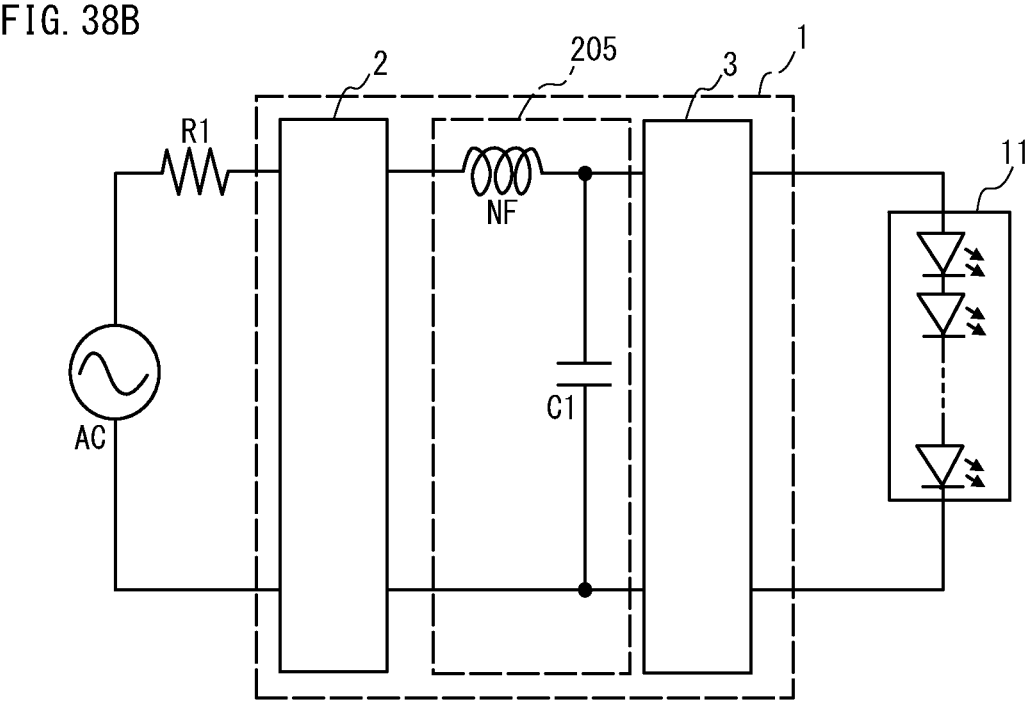

Each of FIGS. 38A and 38B is a circuit diagram illustrating a DC power supply circuit pertaining to another modification.

DESCRIPTION OF EMBODIMENTS

Embodiment 1

<1> Configuration

Figure 1:
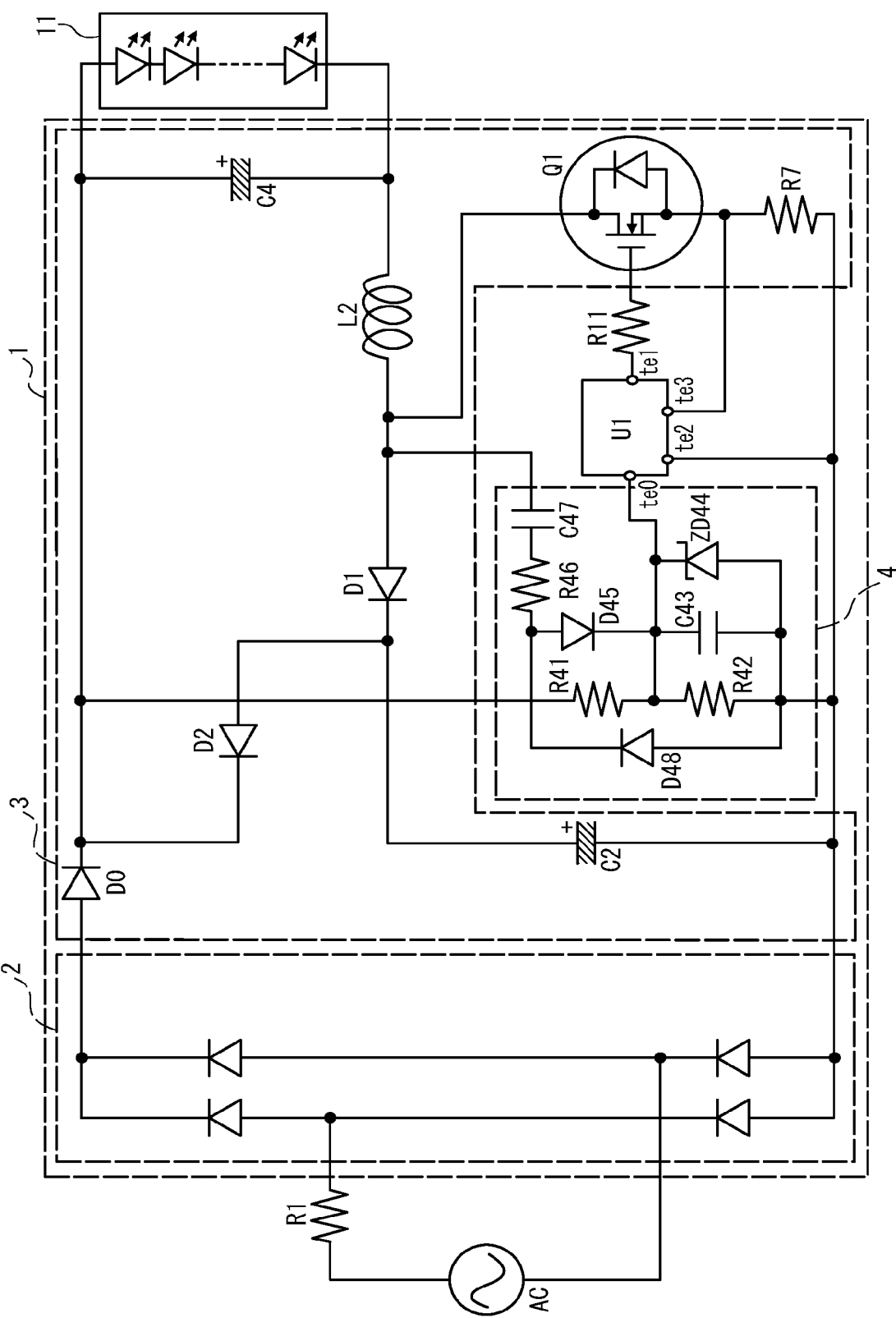
FIG. 1 is a circuit diagram illustrating a DC power supply circuit pertaining to embodiment 1.

FIG. 1 is a circuit diagram illustrating a DC power supply circuit 1 pertaining to embodiment 1.

The DC power supply circuit 1 includes a rectifier circuit 2, a voltage conversion circuit 3, and a drive circuit U1. The rectifier circuit 2 is connected to an AC power supply, which is indicated by reference sign AC in the drawings. The voltage conversion circuit 3 is connected across output terminals of the rectifier circuit 2. The drive circuit U1 drives the voltage conversion circuit 3. The DC power supply circuit 1 also includes a fixed voltage circuit 4 that supplies power to the drive circuit U1.

Further, a load 11, which is a series circuit consisting of a plurality of LEDs connected in series, is connected across output terminals of the voltage conversion circuit 3. A voltage across terminals of the load 11 has a fixed value, which is dependent upon the number of serially-connected LEDs consisting the load 11. In this sense, the load 11 differs from loads having resistive impedance, one example of which is a fluorescent lamp.

The AC power supply outputs, for example, AC with an effective voltage value of 100 V. Between the AC power supply and the rectifier circuit 2, a current-limiting resistor R1 is connected. The resistor R1 prevents the flow of excessive current from the AC power supply to the rectifier circuit 2.

<1-1> Rectifier Circuit

The rectifier circuit 2 is a diode bridge composed of four diodes.

<1-2> Voltage Conversion Circuit

The voltage conversion circuit 3 includes a step-down chopper circuit, and includes a switching element Q1, an inductor L2, diodes D0, D1, and D2, capacitors C2 and C4, and a resistor R7.

The switching element Q1 is an N-channel MOSFET. A source of the switching element Q1 is connected, via the resistor R7, to a low-potential output terminal of the rectifier circuit 2, a gate of the switching element Q1 is connected, via a resistor R11, to the drive circuit U1, and a drain of the switching element Q1 is connected to the inductor L2. The switching element Q1 includes a body diode whose anode is connected to the source and whose cathode is connected to the drain. The resistor R7 detects drain current flowing in the switching element Q1 based on a voltage across terminals of the resistor R7. A first terminal of the inductor L2 is connected to the load 11, and a second terminal of the inductor L2 is connected to the drain of the switching element Q1. An anode of the diode D0 is connected to a high-potential output terminal of the rectifier circuit 2, and a cathode of the diode D0 is connected to the load 11. An anode of the diode D1 (first unidirectional element) is connected to the second terminal of the inductor L2 and the drain of the switching element Q1, and a cathode of the diode D1 is connected to the capacitor C2 and an anode of the diode D2. The anode of the diode D2 (second unidirectional element) is connected to the cathode of the diode D1 and a cathode of the diode D2 is connected to the cathode of the diode D0.

A first terminal of the capacitor C2 is connected to the low-potential output terminal of the rectifier circuit 2 and a second terminal of the capacitor C2 is connected to the cathode of the diode D1 and the anode of the diode D2. The capacitor C2 is an electrolytic capacitor. Note that alternatively, the capacitor C2 may, for example, be a high dielectric constant ceramic capacitor or a film capacitor.

The capacitor C4 is connected in parallel to the load 11 and has a function of smoothing the voltage across the terminals of the load 11.

<1-3> Drive Circuit

The drive circuit U1 outputs a control signal having a rectangular voltage waveform and thus drives the switching element Q1 through pulse width modulation (PWM) control. In the following, this control signal is referred to as a PWM signal.

The drive circuit U1 has a power supply terminal te0, an output terminal te1, a grounding terminal te2, and a current detection terminal te3. The current detection terminal te3 detects the drain current flowing in the switching element Q1. The power supply terminal te0 is connected to an output terminal of the fixed voltage circuit 4. The grounding terminal te2 is connected to the low-potential output terminal of the rectifier circuit 2. The output terminal te1 is connected, via the resistor R11, to the gate of the switching element Q1. The current detection terminal te3 is connected between the source of the switching element Q1 and the resistor R7.

The drive circuit U1 inputs the PWM signal into the gate of the switching element Q1. The drive circuit U1 adjusts the pulse width of the PWM signal so that the drain current flowing in the switching element Q1, which is detected through the current detection terminal te3, is kept at the same level. Adjustment of pulse width of the PWM signal alters a period during which the gate voltage of the switching element Q1 is maintained higher than or equal to an ON voltage of the switching element Q1, and a period during which the gate voltage of the switching element Q1 is maintained lower than the ON voltage of the switching element Q1 (i.e., maintained at substantially 0 V). In the following, the period during which the switching element Q1 is maintained in an ON state is referred to as an ON period. On the other hand, a period during which the gate voltage of the switching element Q1 is maintained at substantially 0 V, or in other words, a period during which the switching element Q1 is maintained in an OFF state, is referred to as an OFF period. Further, a proportion of the ON period in one cycle of the ON/OFF switching of the switching element Q1 is referred to in the following as an on-duty ratio. The drive circuit U1 drives the switching element Q1 through fixed current control by altering the on-duty ratio.

<1-4> Fixed Voltage Circuit

The fixed voltage circuit 4 includes resistors R41 and R42, a capacitor C43, and a zener diode ZD44. The resistors R41 and R42 are connected in series across the output terminals of the rectifier circuit 2. A first terminal of the resistor R41 is connected to the high-potential output terminal of the rectifier circuit 2. The resistor R42 is connected between a second terminal of the resistor R41 and the low-potential output terminal of the rectifier circuit 2. The capacitor C43 is connected across terminals of the resistor R42. An anode of the zener diode ZD44 is connected to the low-potential output terminal of the rectifier circuit 2, and a cathode of the zener diode ZD44 is connected to a node between the resistors R41 and R42, and to the power supply terminal te0 of the drive circuit U1. Thus, the electric potential of the power supply terminal te0 of the drive circuit U1 is maintained at a fixed electric potential generated at the cathode of the zener diode ZD44.

The fixed voltage circuit 4 also includes a diode D45, a resistor R46, and a capacitor C47. A first terminal of the capacitor C47 is connected to the anode of the diode D1, which is included in the voltage conversion circuit 3. An anode of the diode D45 is connected, via the resistor R46, to a second terminal of the capacitor C47, and a cathode of the diode D45 is connected to the power supply terminal te0 of the drive circuit U1. A cathode of a diode D48 is connected to a node between the resistor R46 and the diode D45, and an anode of the diode D48 is connected to the low-potential output terminal of the rectifier circuit 2. The diode D48 discharges electrical charge from the capacitor C47. Thus, the capacitors C43 and C47 are charged during the OFF period. Further, the capacitor C47 is discharged and electrical charge accumulating in the capacitor C47 is transferred to the capacitor C43 in the ON period. Thus, power is supplied from the fixed voltage circuit 4 to the power supply terminal te0 of the drive circuit U1.

<2> Operation

The following explains operations of the DC power supply circuit 1 pertaining to the present embodiment.

At start-up of the DC power supply circuit 1, the switching element Q1 is OFF. In this state, when voltage is input from the rectifier circuit 2 to the voltage conversion circuit 3, an inrush current flows out from the high-potential output terminal of the rectifier circuit 2, flows through the load 11, the inductor L2, and the diode D1 in the stated order, and flows into the capacitor C2. The magnitude of this inrush current changes according to the phase of the voltage supplied from the AC power supply to the rectifier circuit 2. The flow of this inrush current into the capacitor C2 charges the capacitor C2. As a result of this charging, the voltage of the capacitor C2 equals a voltage that is lower than the voltage output from the rectifier circuit 2 by an amount equal to a voltage drop occurring at the load 11. The inrush current, which flows as described above, is limited by the load 11, the inductor L2, and the resistor R1, and the flow of excessive inrush current is prevented. Accordingly, damage to the diodes included in the rectifier circuit 2, etc., which would otherwise take place due to excessive inrush current flowing, is prevented. In addition, since the load 11 and the inductor L2 function as current-limiting elements, the resistor R1 need only have relatively small resistance. Thus, loss at the resistor R1 is reduced, and the DC power supply circuit 1 has improved circuit efficiency.

When the capacitor C2 has been charged as described above, current flows in the DC power supply circuit 1 along the following current paths. The current path at a given point is dependent upon whether the switching element Q1 is ON or OFF at the given point.

Each of FIGS. 2A, 2B, 3A, 3B is a circuit diagram of the DC power supply circuit 1, including illustration of current flow in the DC power supply circuit 1. In FIGS. 2A, 2B, 3A, 3B, the fixed voltage circuit 4 is not illustrated.

FIGS. 2A and 2B correspond to while an instantaneous value Vin of the voltage output from the rectifier circuit 2 is higher than or equal to a voltage VC2 across the terminals of the capacitor C2. Further, FIG. 2A illustrates the flow of current in the ON period, and FIG. 2B illustrates the flow of current in the OFF period.

As illustrated in FIG. 2A, while the instantaneous value Vin is higher than or equal to the voltage VC2, in the ON period, current flows out from the high-potential output terminal of the rectifier circuit 2, flows through the load 11, the inductor L2, the switching element Q1, and the resistor R7 in the stated order, and flows into the low-potential output terminal of the rectifier circuit 2. This path is referred to as a "first current path" in the following. When current flows along the first current path, the electric charge at a node between the capacitor C2 and the anode of the diode D2 is lower than the electric charge at the high-potential output terminal of the rectifier circuit 2 by an amount equal to the voltage drop occurring at the load 11. Due to this, the diode D2 does not conduct. Further, when current flows along the first current path, the electric charge at a node between the inductor L2 and the switching element Q1 is substantially 0 V. Due to this, the diode D1 does not conduct. Further, when current flows along the first current path, magnetic energy is accumulated in the inductor L2.

Meanwhile, as illustrated in FIG. 2B, while the instantaneous value Vin is higher than or equal to the voltage VC2, in the OFF period, current flows out from the inductor L2, flows through the diode D1, the diode D2, and the load 11 in the stated order, and returns to the inductor L2. This path is referred to as an "A current path" in the following. When current flows along the A current path, the voltage at the node between the inductor L2 and the anode of the diode D1 is higher than the voltage VC2 by an amount equal to an ON voltage of the diode D1. Thus, the diode D1 conducts. In addition, while the instantaneous value Vin is higher than or equal to the voltage VC2, in the OFF period, current also flows out from the high-potential output terminal of the rectifier circuit 2, flows through the load 11, the inductor L2, the diode D1, and the capacitor C2 in the stated order, and flows into the low-potential output terminal of the rectifier circuit 2. This path is referred to as a "second current path" in the following. When current flows along the second current path, the capacitor C2 is charged.

As described above, while the instantaneous value Vin is higher than or equal to the voltage VC2, current continues to flow from the rectifier circuit 2 to the voltage conversion circuit 3. Further, while the instantaneous value Vin is higher than or equal to the voltage VC2, in the OFF period, the capacitor C2 is charged by current flowing along the second current path.

FIGS. 3A and 3B correspond to while the instantaneous value Vin is lower than the voltage VC2. Further, FIG. 3A illustrates the flow of current in the ON period, and FIG. 3B illustrates the flow of current in the OFF period.

As illustrated in FIG. 3A, when the instantaneous value Vin is lower than the voltage VC2, in the ON period, current flows out from a high-potential terminal of the capacitor C2, flows through the diode D0, the load 11, the inductor L2, the switching element Q1, and the resistor R7 in the stated order, and flows into a low-potential terminal of the capacitor C2. This path is referred to as a "the third current path" in the following. When current flows along the third current path, the electric charge at the node between the capacitor C2 and the anode of the diode D2 is higher than the electric charge at the high-potential output terminal of the rectifier circuit 2. Due to this, the diode D0 does not conduct. Further, when current flows along the third current path, the electric charge at the node between the inductor L2 and the switching element Q1 is substantially 0 V. Due to this, the diode D1 does not conduct. Further, when current flows along the third current path, magnetic energy is accumulated in the inductor L2.

Meanwhile, as illustrated in FIG. 3B, when the instantaneous value Vin is lower than the voltage VC2, in the OFF period, current flows out from the inductor L2, flows through the diode D1, the diode D2, and the load 11 in the stated order, and returns to the inductor L2. This path is referred to as a "the fourth current path" in the following. When current flows along the fourth current path, the magnetic energy accumulated in the inductor L2 is discharged to the load 11.

As described above, while the instantaneous value Vin is lower than the voltage VC2, current does not flow from the rectifier circuit 2 to the voltage conversion circuit 3. Further, while the instantaneous value Vin is lower than the voltage VC2, in the ON period, current flows along the third current path due to the capacitor C2 discharging.

FIG. 4 includes portion (a) illustrating the ON/OFF switching of the switching element Q1 in the DC power supply circuit 1, portion (b) illustrating a time domain waveform of a drain-source voltage VL of the switching element Q1 in the DC power supply circuit 1, and portion (c) illustrating a time domain waveform of the voltage VC2 in the DC power supply circuit 1. Note that the time domain waveforms illustrated in FIG. 4 correspond to while the instantaneous value Vin is higher than or equal to the voltage VC2.

When the switching element Q1 turns ON, current does not flow into the capacitor C2. Thus, the voltage VC2 is maintained substantially at the same level (period between time T0 and time T1 in portion (c) of FIG. 4).

When the switching element Q1 subsequently turns OFF, the diode D1 conducts. Thus, current flows out from the rectifier circuit 2, flows through the load 11, the inductor L2, and the diode D1 in the stated order, and flows into the capacitor C2. Thus, the capacitor C2 is charged. In addition, energy accumulated in the inductor L2 is supplied to the load 11 via the diode D1 and the diode D2. Due to the charging of the capacitor C2 as described above, the voltage VC2 gradually increases (period between time T1 and time T2 in portion (c) of FIG. 4). Here, note that the capacitor C2 is provided with electrostatic capacitance such that it takes longer than one OFF period to charge the capacitor C2 to a maximum charged voltage thereof. Here, as illustrated in portion (c) of FIG. 4, when the capacitor C2 is charged for one OFF period, the voltage VC2 increases by a voltage $\Delta VC2$.

After the switching element Q1 subsequently turns ON, current does not flow into the capacitor C2 similar as in the previous ON period described above, and the voltage VC2 is maintained substantially at the same level (period between time T2 and time T3 in portion (c) of FIG. 4).

To summarize the above, while the instantaneous value Vin is higher than or equal to the voltage VC2, the voltage VC2 increases by the voltage $\Delta VC2$ for each cycle of the ON/OFF switching of the switching element Q1.

Meanwhile, while the instantaneous value Vin is lower than the voltage VC2, the voltage VC2 gradually decreases at a certain rate that is dependent upon the time constant of the DC power supply circuit 1. There is a relationship between such factors as power consumption of the capacitor C2 and the load 11, etc., and the time constant of the DC power supply circuit 1.

As described above, while the instantaneous value Vin is higher than or equal to the voltage VC2, the voltage VC2 increases intermittently by the voltage $\Delta VC2$ for each cycle of the ON/OFF switching of the switching element Q1. Due to this, during a period corresponding to one quarter-cycle in the first half of each half-cycle of AC input from the AC power supply to the rectifier circuit 2, the voltage VC2 increases at a slower rate compared to the instantaneous value Vin.

FIG. 5 includes portion (a) illustrating a time domain waveform of the voltage supplied from the AC power supply to the rectifier circuit 2 in the DC power supply circuit 1 (denoted as voltage Vs in the following), and portion (b) illustrating a time domain waveform of the instantaneous value Vin in the DC power supply circuit 1. The dashed line in portion (b) of FIG. 5 illustrates a time domain waveform of the voltage VC2. Note that the time domain waveform of the voltage VC2, although illustrated as a line in portion (b) of FIG. 5, has a stepwise shape as illustrated in portion (c) of FIG. 4.

In the following, description is provided on one half-cycle (the period between time T0 and time T1) of the voltage Vs, which is an alternating voltage. During the period between time T01 and time T02 at which one quarter-cycle of the voltage Vs is reached, the instantaneous value Vin is higher than or equal to the voltage VC2. During this period, in the OFF period, current flows from the high-potential output terminal of the rectifier circuit 2 into the capacitor C2 (refer to FIG. 2B). At time T02, the instantaneous value Vin reaches a maximum value Vinmax. Meanwhile, at time T02, the voltage VC2 is still lower than the voltage Vinmax. Subsequently, during the period between time T02 and time T03, the instantaneous value Vin gradually decreases and the voltage VC2 gradually increases. Following this, when the instantaneous value Vin substantially equals the voltage VC2, the diode D0 switches to non-conduction. Subsequently, during the period between time T03 and time T1, in the ON period, electric charge accumulated in the capacitor C2 is discharged from the capacitor C2 to the inductor L2 via the load 11 (refer to FIG. 3A), and in the OFF period, magnetic energy accumulated in the inductor L2 is discharged from the inductor L2 to the load 11 (refer to FIG. 3B).

As such, in the DC power supply circuit 1, during a period Ti(1) between time T01 and time T03, current flows from the high-potential output terminal of the rectifier circuit 2 to the capacitor C2. Meanwhile, during a period Ts(1), which includes the period between time T0 and time T01 and the period between time T03 and time T1, the instantaneous value Vin is lower than the voltage VC2, and current does not flow from the high-potential output terminal of the rectifier circuit 2 into the capacitor C2. Thus, in each half-cycle of AC supplied from the AC power supply, during a period from when the instantaneous value Vin reaches the maximum value Vinmax until when the instantaneous value Vin and the voltage VC2 equal one another at a voltage Vin1, the instantaneous value Vin is higher than or equal to the voltage VC2. Thus, during this period, current continues to flow from the AC power supply to the voltage conversion circuit 3 via the rectifier circuit 2.

FIG. 6 includes portion (a) illustrating a time domain waveform of the voltage Vs in the DC power supply circuit 1, portion (b) illustrating a time domain waveform of the instantaneous value Vin in the DC power supply circuit 1, and portion (c) illustrating a time domain waveform of a current flowing from the AC power supply to the rectifier circuit 2 in the DC power supply circuit 1 (referred to as current Iin in the following).

As illustrated in portion (c) of FIG. 6, the period Ti(1), during which the current Iin flows, and the period Ts(1), during which current Iin does not flow, alternate repeatedly. Further, in each half-cycle of the voltage Vs, the current Iin continues to flow for a certain period after an absolute value of the voltage Vs reaches a maximum value. Owing to this period, in the DC power supply circuit 1, current flows for a relatively long amount of time from the AC power supply to the voltage conversion circuit 3, via the rectifier circuit 3. Thus, when compared to a structure (referred to as a comparative example in the following) where, in each half-cycle of the voltage Vs, current does not flow from the AC power supply to the voltage conversion circuit 3, via the rectifier circuit 3, after an absolute value of the instantaneous value Vin reaches the maximum value Vinmax, the DC power supply circuit 1 has improved power factor. In fact, the power factor of the DC power supply circuit 1 pertaining to the present embodiment, when power of 8.83 W is input from the AC power supply to the DC power supply circuit 1, is approximately 0.78, whereas the power factor of a DC power supply circuit pertaining to the comparative example is between 0.50 and 0.61 under similar conditions.

Further, the DC power supply circuit 1 includes a so-called step-down chopper circuit. Due to this, substantially 100% of magnetic energy accumulated in the inductor L2 is supplied to the load 11, and thus, the DC power supply circuit 1 also has improved circuit efficiency. In fact, the circuit efficiency of the DC power supply circuit 1 pertaining to the present embodiment, when power of 8.83 W is input from the AC power supply to the DC power supply circuit 1, is 88.1%.

Further, in the DC power supply circuit 1, a minimum value Vinmin of the instantaneous value Vin is set higher than or equal to a voltage that is to be applied to the load 11, or that is, the rated voltage of the load 11. This configuration is made since when the minimum value Vinmin of the instantaneous value Vin is lower than the rated voltage of the load 11, the light-emitting modules consisting the load 11 emit light at different amounts. Specifically, the DC power supply circuit 1 has a predetermined time constant related to the decay of the voltage VC2, which is set through appropriate adjustment of the electrostatic capacitance of the capacitor C2 and the resistance value of the resistor R7.

The power factor of the DC power supply circuit 1 can be further improved by further extending the period Ti(1), during which the instantaneous value Vin is higher than or equal to the voltage VC2, and thereby further extending the period during which current continues to flow from the AC power supply to the voltage conversion circuit 3, via the rectifier circuit 2. The duration of the period Ti(1) can be changed by changing the length of each cycle of the ON/OFF switching and the on-duty ratio of the switching element Q1.

When denoting the length of each cycle of the ON/OFF switching of the switching element Q1 as Tq, and the on-duty ratio as Don, Expression 1 and Expression 2 provided in the following hold true.

[Math 1]

$$Vin1 - Vin\min = \sum_{k=1}^{n} \Delta VC2(n, k, Don, Vin, C2, L2) \quad \text{(Expression 1)}$$

[Math 2]

$$n = \frac{Ti(1)}{Tq} \quad \text{(Expression 2)}$$

In the above, the voltage ΔVC2 denotes the amount by which the voltage VC2 increases per each cycle of the ON/OFF operation of the switching element Q1. Further, n denotes the number of times the switching element Q1 switches ON and OFF during the period Ti(1), Don denotes the on-duty ratio of the switching element Q1, Vin denotes the instantaneous value of the voltage output from the rectifier circuit 2, C2 denotes the electrostatic capacitance of the capacitor C2, and L2 denotes the inductance of the inductor L2. As can be seen from Expression 1 and Expression 2, the voltage ΔVC2 (n,k,Don,Vin) is a function that is dependent upon n, which denotes the number of times the switching element Q1 switches ON and OFF during the period Ti(1), and Don, which denotes the on-duty ratio of the switching element Q1. As such, provided that the electrostatic capacitance of the capacitor C2 and the inductance of the inductor L2 are fixed, the value of the voltage Vin1 can be changed by setting as appropriate the length of each cycle of the ON/OFF switching and the on-duty ratio of the switching element Q1. Here, a lower value being set to the voltage ΔVC2, which denotes the amount by which the voltage VC2 increases per each cycle of the ON/OFF switching of the switching element Q1, results in a longer duration of the period Ti(1) and a consequent improvement in the power factor of the DC power supply circuit 1. Thus, in the DC power supply circuit 1, the length of each cycle of the ON/OFF switching and the on-duty ratio of the switching element Q1 are set based upon the voltage ΔVC2 by which the voltage VC2 increases.

FIG. 7 includes portions (a) and (b) each illustrating a time domain waveform of the instantaneous value Vin in the DC power supply circuit 1. The time domain waveform illustrated in portion (a) of FIG. 7 is the same time domain waveform as described above. The time domain waveform in portion (b) corresponds to the instantaneous value Vin when the DC power supply circuit 1 is modified such that the voltage VC2 increases by a smaller amount than described above. As can be seen when comparing period Ti(1) in portion (a) and period Ti(2) in portion (b), the duration of the period during which current flows from the rectifier circuit 2 into the capacitor C2 can be extended by modifying the DC power supply circuit 1 such that the voltage VC2 increases by a smaller amount.

Note that the duration of the period Ti(1) can be extended not only by changing the length of each cycle of the ON/OFF switching and the on-duty ratio of the switching element Q1, but also by providing the capacitor C2 with greater electrostatic capacitance and providing the inductor L2 with greater inductance.

<3> Conclusion

To summarize, in the DC power supply circuit 1 pertaining to the present embodiment, while the instantaneous value Vin is higher than or equal to the voltage VC2, current flows along the first current path or second current path, both of which starting at the high-potential output terminal of the rectifier circuit 2 and arriving at the low-potential output terminal of the rectifier circuit 2. Thus, while the instantaneous value Vin is higher than or equal to the voltage VC2, current continues to flow from the AC power supply to the voltage conversion circuit 3, via the rectifier circuit 2. Further, while the instantaneous value Vin is higher than or equal to the voltage VC2, in the ON period, current mainly flows along the first current path, which does not pass through the capacitor C2, and current does not flow into the capacitor C2. Thus, while the instantaneous value Vin is higher than or equal to the voltage VC2, in the ON period, the capacitor is not charged. Meanwhile, while the instantaneous value Vin is higher than or equal to the voltage VC2, in the OFF period, current flows along the second current path, which passed through the capacitor C2, and the capacitor C2 is charged. As such, a period during which the capacitor C2 is not charged and a period during which the capacitor C2 is charged alternate repeatedly, in synchronization with the ON/OFF switching of the switching element Q1.

This results in the voltage VC2 increasing at a slower rate compared to a structure in which current continues to flow from the high-potential output terminal of the rectifier circuit 2 to the capacitor C2 regardless of the ON/OFF switching of the switching element Q1. Due to this, in the DC power supply circuit 1 pertaining to the present embodiment, at the point when the instantaneous value Vin reaches the maximum value Vinmax, the voltage VC2 remains lower than the maximum value Vinmax. Accordingly, in the DC power supply circuit 1 pertaining to the present embodiment, the instantaneous value Vin remains higher than the voltage VC2 for a certain period of time after the instantaneous value Vin reaches the maximum value Vinmax, and during this period, current continues to flow from the high-potential output terminal of the rectifier circuit 2 to the capacitor C2 along the second current path. While current continues to flow from the high-potential output terminal of the rectifier circuit 2 to the capacitor C2 along the second current path, current continues to flow from the AC power supply to the voltage conversion circuit 3, via the rectifier circuit 2.

Due to this, the DC power supply circuit 1 pertaining to the present embodiment has improved power factor compared to a structure in which current does not flow from an AC power supply to a capacitor via a rectifier circuit after an instantaneous value of voltage output from the rectifier circuit has reached a maximum value. This is because in the DC power supply circuit 1 pertaining to the present embodiment, current continues to flow from the AC power supply to the voltage conversion circuit 3, via the rectifier circuit 2, even after the instantaneous value Vin reaches the maximum value Vinmax, and due to this, current flows through the rectifier circuit 2 for a longer period of time (period Ti(1)) compared to in the above-described structure.

In addition, a conventional DC power supply circuit may have improved power factor due to including a power factor correction (PFC) circuit connected to a rectifier circuit and a step-up/step-down circuit connected downstream of the PFC circuit. Typically, a PFC circuit includes a switching element, an inductor, a control IC, etc. In contrast to such a conventional DC power supply circuit, the DC power supply circuit 1 pertaining to the present embodiment has improved power factor while not including a PFC circuit. As such, compared to such a conventional DC power supply circuit, the DC power supply circuit 1 has smaller circuit size, and has improved circuit efficiency for power loss therein being reduced.

In addition, at start-up of the DC power supply circuit 1, the switching element Q1 is OFF. In this state, when voltage is input from the rectifier circuit 2 to the voltage conversion circuit 3, an inrush current flows out from the high-potential output terminal of the rectifier circuit 2, flows through the load 11, the inductor L2, and the diode D1 in the stated order, and flows into the capacitor C2. Due to flowing as described above, i.e., via the load 11, the inrush current is limited by the load 11, and the flow of excessive inrush current is prevented. Accordingly, damage to the diodes included in the rectifier circuit 2, etc., which would otherwise take place due to excessive inrush current flowing, is prevented. In addition, since the load 11 and the inductor L2 function as current-limiting elements, the resistor R1 need only have relatively small resistance. Thus, the DC power supply circuit 1 has improved circuit efficiency.

Embodiment 2

FIG. 8 is a circuit diagram illustrating a DC power supply circuit 2001 pertaining to embodiment 2.

The DC power supply circuit 2001 includes a rectifier circuit 2, a voltage conversion circuit 2003, and a drive circuit U1. The rectifier circuit 2 is connected to an AC power supply, which is indicated by reference sign AC in the drawings. The voltage conversion circuit 2003 is connected across output terminals of the rectifier circuit 2. The drive circuit U1 drives the voltage conversion circuit 2003. The DC power supply circuit 2001 also includes a fixed voltage circuit 4 that supplies power to the drive circuit U1. The voltage conversion circuit 2003 in the DC power supply circuit 2001 has a structure differing from that of the voltage conversion circuit 3 in the DC power supply circuit 1. Note that in the following, a component having the same structure as in embodiment 1 is labeled with the same reference sign as in embodiment 1, and description on such components is omitted from the following where appropriate. The voltage conversion circuit 2003 includes a step-down chopper circuit.

A load 11, which is a series circuit consisting of a plurality of LEDs connected in series, is connected across output terminals of the voltage conversion circuit 2003. A voltage across terminals of the load 11 has a fixed value, which is dependent upon the number of serially-connected LEDs consisting the load 11. In this sense, the load 11 differs from loads having resistive impedance, one example of which is a fluorescent lamp.

The voltage conversion circuit 2003 includes a switching element Q1, inductors L2002 and L2003, diodes D2001, D2002, and D2003, capacitors C2 and C4, and a resistor R7.

A first terminal of the inductor L2002 is connected to a high-potential output terminal of the rectifier circuit 2 via the load 11, and a second terminal of the inductor L2002 is connected to the switching element Q1.

The switching element Q1 is an N-channel MOSFET. A source of the switching element Q1 is connected, via the resistor 7, to a low-potential output terminal of the rectifier circuit 2, a gate of the switching element Q1 is connected, via a resistor R11, to the drive circuit U1, and a drain of the switching element Q1 is connected to the second terminal of the inductor L2002.

The diode D2001 (third unidirectional element) is connected between the second terminal of the inductor L2002 and the high-potential output terminal of the rectifier circuit 2. An anode of the diode D2001 is connected to the second terminal of the inductor L2002, and a cathode of the diode D2001 is connected to the high-potential output terminal of the rectifier circuit 2.

A first terminal of the capacitor C2 is connected to the low-potential output terminal of the rectifier circuit 2.

The diode D2003 (second unidirectional element) is connected between a second terminal of the capacitor C2 and the high-potential output terminal of the rectifier circuit 2. An anode of the diode D2003 is connected to the second terminal of the capacitor C2, and a cathode of the diode D2003 is connected to the high-potential output terminal of the rectifier circuit 2.

An anode of the diode D2002 (first unidirectional element) is connected to a node between the inductor L2002 and the switching element Q1, and a cathode of the diode D2002 is connected to the inductor L2003.

A first terminal of the inductor L2003 (current-limiting element) is connected to the cathode of the diode D2002, and a second terminal of the inductor L2003 is connected to the second terminal of the capacitor C2.

Further, a first terminal of a capacitor C47, which is included in the fixed voltage circuit 4, is connected to the anode of the diode D2001, which is included in the voltage conversion circuit 2003.

The following explains operations of the DC power supply circuit 2001 pertaining to the present embodiment.

At start-up of the DC power supply circuit 2001, the switching element Q1 is OFF. In this state, when voltage is input from the rectifier circuit 2 to the voltage conversion circuit 2003, an inrush current flows out from the high-potential output terminal of the rectifier circuit 2, flows through the load 11, the inductor L2002, the diode D2002, and the inductor L2003 in the stated order, and flows into the capacitor C2. The flow of this inrush current into the capacitor C2 charges the capacitor C2. As a result of this charging, the voltage of the capacitor C2 equals a voltage that is lower than the voltage output from the rectifier circuit 2 by an amount equal to a voltage drop occurring at the load 11. The inrush current, which flows as described above, is limited by the load 11, the inductors L2002 and L2003, and the resistor R1. When the capacitor C2 is charged and voltage necessary for operation of the drive circuit U1 is secured, the drive circuit U1 starts operating and the switching element Q1 is turned ON. When the switching element Q1 is turned ON, the flow of inrush current into the capacitor C2 decreases. When the switching element Q1 subsequently turns OFF, current flows into the capacitor C2 via the load 11 and the inductors L2002 and L2003, and the capacitor C2 is charged to a further extent. Following this, the above-described operations are repeated, and the charging of the capacitor C2 progresses. Note that due to the switching element Q1 switching ON and OFF as described above, the inrush current flowing through the inductors L2002 and L2003 takes the form of a high-frequency current. Accordingly, the inductors L2002 and L2003 function as high-impedance resistance with respect to this high-frequency inrush current, and limit the flow of inrush current into the capacitor C2. Due to the inrush current being limited as described above, damage to the diodes included in the rectifier circuit 2, etc., which would otherwise take place due to excessive inrush current flowing, is prevented. In addition, since the load 11 and the inductors L2002 and L2003 function as current-limiting elements, the resistor R1 need only have relatively small resistance. Thus, loss at the resistor R1 is reduced, and the DC power supply circuit 2001 has improved circuit efficiency. In addition, when the resistor R1 has smaller resistance, a smaller amount of heat is generated by the resistor R1. As such, the DC power supply circuit 2001 operates at low circuit temperature, and thus has a long lifetime.

Following this, current flows in the DC power supply circuit 2001 along the following current paths. The current path at a given point is dependent upon whether the switching element Q1 is ON or OFF at the given point.

Each of FIGS. 9A, 9B, 10A, 10B, 11A, 11B is a circuit diagram of the DC power supply circuit 2001, including illustration of current flow in the DC power supply circuit 2001. In FIGS. 9A, 9B, 10A, 10B, 11A, 11B, the fixed voltage circuit 4 is not illustrated.

FIGS. 9A and 9B, and FIGS. 10A and 10B correspond to while an instantaneous value Vin of the voltage output from the rectifier circuit 2 is higher than or equal to a voltage VC2 across the terminals of the capacitor C2. Further, FIGS. 9A and 10B illustrate the flow of current in the ON period, and FIGS. 9B and 10A illustrate the flow of current in the OFF period.

As illustrated in FIG. 9A, while the instantaneous value Vin is higher than or equal to the voltage VC2, in the ON period, current flows out from the high-potential output terminal of the rectifier circuit 2, flows through the load 11, the inductor L2002, the switching element Q1, and the resistor R7 in the stated order, and flows into the low-potential output terminal of the rectifier circuit 2. This path is referred to as a "first current path" in the following. When current flows along the first current path, the electric charge at a node between the inductor L2002 and the switching element Q1 is substantially 0 V. Due to this, the diode D2001 does not conduct. Further, if current had been flowing into the capacitor C2 via the inductor L2003 and charging of the capacitor C2 had been taking place immediately before the switching element Q1 is turned ON, current flows through the diode D2002 while decreasing, until discharge of energy accumulated in the inductor L2002 to the capacitor C2, the load 11, etc, is completed. In such a case, at the point when energy is no longer accumulated in the inductor L2003, the diode D2002 switches to non-conduction. Further, when current flows along the first current path, magnetic energy is accumulated in the inductor L2002.

Meanwhile, as illustrated in FIG. 9B, while the instantaneous value Vin is higher than or equal to the voltage VC2, in the OFF period, current flows out from the inductor L2002, flows through the diode D2001 and the load 11 in the stated order, and returns to the inductor L2002. This path is referred to as an "A current path" in the following. When current flows along the A current path, a voltage at the node between the inductor L2002 and the anode of the diode D2001 is higher than the voltage VC2 by an amount equal to an ON voltage of the diode D2001. Thus, the diode D2001 conducts. In addition, while the instantaneous value Vin is higher than or equal to the voltage VC2, in the OFF period, current also flows out from the high-potential output terminal of the rectifier circuit 2, flows through the load 11, the inductor L2002, the diode D2002, the inductor L2003, and the capacitor C2 in the stated order, and flows into the low-potential output terminal of the rectifier circuit 2. This path is referred to as a "second current path" in the following. When current flows along the second current path, the capacitor C2 is charged, magnetic energy is accumulated in the inductor L2002, and magnetic energy is accumulated in the inductor L2003.

Further, note that while the instantaneous value Vin is higher than or equal to the voltage VC2, in the OFF period, particularly when the inductor L2002 completes discharging magnetic energy accumulated therein, current flows out from the second terminal of the inductor L2003, flows through the capacitor C2, the resistor R7, a body diode of the switching element Q1, and the diode D2002 in the stated order, and flows into the first terminal of the inductor L2003, as illustrated in FIG. 10A. This path is referred to as a B current path in the following. At the same time, current discharged from the capacitor C4 is supplied to the load 11. Note that current flows along the B current path when the DC power supply circuit 2001 is operated in a mode (a so-called discontinuous mode) where the period of time required for discharge of the energy accumulated in the inductor L2002 to be completed (this period of time referred to as an "energy discharge period" in the following) is shorter than one OFF period, and thus, current does not flow through the inductor L2002 during a certain period. As such, when the DC power supply circuit 2001 is operated in a mode (a so-called critical mode) where the energy discharge period has the same duration as one ON period, or in a mode (a so-called continuous mode) where the energy discharge period is longer than one ON period, current does not flow along the B current path.

Further, while the instantaneous value Vin is higher than or equal to the voltage VC2, in the ON period, particularly when the DC power supply circuit 2001 is operating in the critical mode or the continuous mode and energy is still remaining in the inductor L2002 at the point when the switching element Q1 is turned ON, current temporarily (only during a period ΔT) flows out from the high-potential output terminal of the rectifier circuit 2, flows through the load 11, the inductor L2002, the diode D2002, the inductor L2003, and the capacitor C2 in the stated order, and flows into the low-potential output terminal of the rectifier circuit 2, as illustrated in FIG. 10B. This path is referred to as a "C current path" in the following. Note that in this case, current flows along the C current path at the same time as flowing along the first current path. As such, during the period ΔT immediately after the switching element Q1 is turned ON, current flows along the C current path and into the capacitor C2, whereby the capacitor C2 is charged.

As described above, while the instantaneous value Vin is higher than or equal to the voltage VC2, current continues to flow from the rectifier circuit 2 to the voltage conversion circuit 2003. Further, while the instantaneous value Vin is higher than or equal to the voltage VC2, in the OFF period, current flows along the second current path or the B current path and the capacitor C2 is charged. Meanwhile, while the instantaneous value Vin is higher than or equal to the voltage VC2, in the ON period, current is supplied from the high-potential output terminal of the rectifier circuit 2 to the load 11 along the first current path. On the other hand, while the instantaneous value Vin is higher than or equal to the voltage VC2, in the OFF period, current is supplied to the load 11 from the inductor L2002 along the A current path and from the high-potential output terminal of the rectifier circuit 2 along the second current path. Further, when the discharge of energy accumulated in the inductor L2002 is completed, current is supplied to the load 11 from only the capacitor C4.

FIGS. 11A and 11B correspond to while the instantaneous value Vin is lower than the voltage VC2. Further, FIG. 11A illustrates the flow of current in the ON period, and FIG. 11B illustrates the flow of current in the OFF period.

As illustrated in FIG. 11A, while the instantaneous value Vin is lower than the voltage VC2, in the ON period, current flows out from a high-potential terminal of the capacitor C2, flows through the diode D2003, the load 11, the inductor L2002, the switching element Q1, and the resistor R7 in the stated order, and flows into a low-potential terminal of the capacitor C2. This path is referred to as a "third current path" in the following. When current flows along the third current path, the electric charge at the node between the inductor L2002 and the switching element Q1 is substantially 0 V. Due to this, the diodes D2001 and D2002 do not conduct. Further, when current flows along the third current path, magnetic energy is accumulated in the inductor L2002.

Meanwhile, as illustrated in FIG. 11B, while the instantaneous value Vin is lower than the voltage VC2, in the OFF period, current flows out from the inductor L2002, flows through the diode D2001 and the load 11 in the stated order, and returns to the inductor L2002. This path is referred to as a "fourth current path" in the following. When current flows along the fourth current path, the magnetic energy accumulated in the inductor L2002 is discharged to the load 11.

When the discharge of energy accumulated in the inductor L2002 is completed, the flow of current along the fourth current path stops.

As described above, while the instantaneous value Vin is lower than the voltage VC2, current does not flow from the rectifier circuit 2 to the voltage conversion circuit 2003. Further, while the instantaneous value Vin is lower than the voltage VC2, in the ON period, current is supplied from the capacitor C2 to the load 11 along the third current path. On the other hand, while the instantaneous value Vin is lower than the voltage VC2, in the OFF period, current is supplied from the inductor L2002 to the load 11 along the fourth current path. Further, when the discharge of energy accumulated in the inductor L2002 is completed, current is supplied to the load 11 from only the capacitor C4.

FIG. 12 includes portion (a) illustrating the ON/OFF switching of the switching element Q1 in the DC power supply circuit 2001, portion (b) illustrating a time domain waveform of a current IL2 flowing through the inductor L2002 in the DC power supply circuit 2001, portion (c) illustrating a time domain waveform of a current IL3 flowing through the inductor L2003 in the DC power supply circuit 2001, and portion (d) illustrating a time domain waveform of the voltage VC2 in the DC power supply circuit 2001. Note that the time domain waveforms illustrated in FIG. 12 correspond to while the instantaneous value Vin is higher than or equal to the voltage VC2.

When the switching element Q1 turns ON, current flowing along the first current path, i.e., the current IL2 gradually increases (refer to portions (a) and (b) of FIG. 12). At this point, the diode D2002 does not conduct. Thus, current does not flow into the capacitor C2 via the inductor L2003 (refer to portion (c) of FIG. 12). Thus, the voltage VC2 is maintained substantially at the same level (period between time T0 and time T1 in portion (d) of FIG. 12).

When the switching element Q1 subsequently turns OFF, current flows from the high-potential output terminal of the rectifier circuit 2 into the capacitor C2 along the second current path. During the OFF period, the current IL2 gradually decreases, while the current IL3 gradually increases (refer to portions (b) and (c) of FIG. 12). Further, during the OFF period, the voltage VC2 gradually increases (period between time T1 and time T2 in portion (d) of FIG. 12). In addition, during the OFF period, due to current flowing along the A current path, the energy accumulated in the inductor L2002 is discharged to the load 11.

During the OFF period, when the discharge of energy accumulated in the inductor L2002 is completed, current flows from the inductor L2003 into the capacitor C2 along the B current path. When current flows along B current path, the capacitor C2 is charged to a further extent and the voltage VC2 gradually increases to a further extent (period between time T2 and time T3 in portion (d) of FIG. 12).

Here, note that the capacitor C2 is provided with electrostatic capacitance such that it takes longer than one OFF period to charge the capacitor C2 to a maximum charged voltage thereof. Here, as illustrated in portion (d) of FIG. 12, when the capacitor C2 is charged for one OFF period, the voltage VC2 increases by a voltage ΔVC2 (period between time T1 and time T3 in portion (d) of FIG. 12).

Following this, when the switching element Q1 turns ON once again, the diode D2002 does not conduct and current does not flow from the inductor L2003 into the capacitor C2 along B current path. Thus, the voltage VC2 is maintained substantially at the same level (period between time T3 and time T4 in portion (d) of FIG. 12).

As described above, while the instantaneous value Vin is higher than or equal to the voltage VC2, the voltage VC2 increases by the voltage ΔVC2 for each cycle of the ON/OFF switching of the switching element Q1.

Meanwhile, while the instantaneous value Vin is lower than the voltage VC2, the voltage VC2 gradually decreases at a certain rate that is dependent upon the time constant of the DC power supply circuit 2001. There is a relationship between such factors as power consumption of the capacitor C2 and the load 11, etc., and the time constant of the DC power supply circuit 2001.

As described above, while the instantaneous value Vin is higher than or equal to the voltage VC2, the voltage VC2 increases intermittently by the voltage ΔVC2 for each cycle of the ON/OFF switching of the switching element Q1. Due to this, during a period corresponding to one quarter-cycle in the first half of each half-cycle of AC input from the AC power supply to the rectifier circuit 2, the voltage VC2 increases at a slower rate compared to the instantaneous value Vin.

Note that the duration of the energy discharge period, i.e., the period of time required for the discharge of magnetic energy accumulated in the inductor L2002 to be completed, can be changed depending upon the magnitude of the output voltage from the rectifier circuit 2. In addition, in the DC power supply circuit 2001, the drive circuit U1 drives the switching element Q1 through fixed voltage control. Thus, the on-duty ratio and the length of each cycle of the ON/OFF switching of the switching element Q1 can be changed. As such, the DC power supply circuit 2001 not only can be operated in the discontinuous mode, which is explained above with reference to FIG. 12, but also can be operated in the critical mode and the continuous mode.

FIG. 13 includes portion (a) illustrating the ON/OFF switching of the switching element Q1 in the DC power supply circuit 2001, portion (b-1) illustrating a time domain waveform of the current IL2 when the DC power supply circuit 2001 is operating in the critical mode, and portion (b-2) illustrating a time domain waveform of the current IL3 when the DC power supply circuit 2001 is operating in the critical mode. FIG. 13 further includes portion (c-1) illustrating a time domain waveform of the current IL2 when the DC power supply circuit 2001 is operating in the continuous mode, and portion (c-2) illustrating a time domain waveform of the current IL3 when the DC power supply circuit 2001 is operating in the continuous mode. FIG. 13 also includes portion (d) illustrating a time domain waveform of the voltage VC2. Note that the time domain waveforms illustrated in FIG. 13 correspond to while the instantaneous value Vin is higher than or equal to the voltage VC2.

As illustrated in portions (b-1), (b-2), (c-1), and (c-2) of FIG. 13, in the ON period, the current IL2 gradually increases, in both the critical mode and the continuous mode (refer to the period between time T20 and time T21 in portions (b-1) and (c-1) of FIG. 13). Further, current flowing from the high-potential output terminal of the rectifier circuit 2 to the capacitor C2 along the C current path, i.e., the current IL3, only flows for the period ΔT at the beginning of the ON period and does not flow after the period ΔT has passed (refer to the period between time T20 and time T21 in portions (b-2) and (c-2) of FIG. 13). Thus, the voltage VC2 gradually increases only during the period ΔT at the beginning of the ON period, and is maintained at substantially the same level after the period ΔT has passed (refer to portion (d) of FIG. 13).

When the switching element Q1 subsequently turns OFF, the current IL2 gradually decreases (refer to the period between time T21 and time T22 in portions (b-1) and (c-1) in FIG. 13), and the current IL3, i.e., the current flowing into the capacitor C2, gradually increases (refer to the period between time T21 and time T22 in portions (b-2) and (c-2) in FIG. 13). Thus, during the OFF period, the voltage VC2 gradually increases (period between time T21 and time T22 in portion (d) of FIG. 13).

Subsequently, after the switching element Q1 turns ON once again, current does not flow through the inductor L2003. Thus, the voltage VC2 gradually increases only during the period ΔT at the beginning of the ON period, and is maintained at substantially the same level after the period ΔT has passed (refer to the period between time T22 and time T23 in portion (d) of FIG. 13).

As described above, even when the DC power supply circuit 2001 is operating in the critical mode or the continuous mode, while the instantaneous value Vin is higher than or equal to the voltage VC2, the voltage VC2 increases intermittently by the voltage ΔVC2 for each cycle of the ON/OFF switching of the switching element Q1. Due to this, during a period corresponding to one quarter-cycle in the first half of each half-cycle of AC input from the AC power supply to the rectifier circuit 2, the voltage VC2 increases at a slower rate compared to the instantaneous value Vin, regardless of the operation mode of the DC power supply circuit 2001.

Note that when the DC power supply circuit 2001 is operating in the critical mode or the continuous mode, the current IL2 flows ceaselessly. Thus, compared to when the DC power supply circuit 2001 is operating in the discontinuous mode, a period (referred to as a "current flow period" in the following) during which current flows from the rectifier circuit 2 into the voltage conversion circuit 2003 has a longer duration when the DC power supply circuit 2001 is operating in the critical mode or the continuous mode. Further, when the DC power supply circuit 2001 is to be operated in the continuous mode or the critical mode, the on-duty ratio and the length of each cycle of the ON/OFF switching of the switching element Q1 are set such that during each ON period, there is a period during which current does not flow into the capacitor C2 for a predetermined period of time.

FIG. 14 includes portion (a) illustrating a time domain waveform of the voltage supplied from the AC power supply to the rectifier circuit 2 in the DC power supply circuit 2001

(denoted as voltage Vs in the following), portion (b) illustrating a time domain waveform of the instantaneous value Vin in the DC power supply circuit 2001, and portion (c) illustrating a time domain waveform of a current supplied from the AC power supply to the rectifier circuit 2 in the DC power supply circuit 2001 (referred to as current Iin in the following). The dashed line in portion (b) of FIG. 14 illustrates a time domain waveform of the voltage VC2. Note that the time domain waveform of the voltage VC2, although illustrated as a line in portion (b) of FIG. 14, has a stepwise shape as illustrated in portion (d) of FIG. 12 and portion (d) of FIG. 13. Further, the time domain waveform illustrated in portion (c) in FIG. 14 is a time domain waveform corresponding to when the DC power supply circuit 2001 is operated in the critical mode or the continuous mode. Note that when the DC power supply circuit 2001 is operated in the discontinuous mode, a time domain waveform of the current Iin exhibits a pulse shape that is in synchronization with the cycle of the ON/OFF switching of the switching element Q1, having a shape that is similar to the time domain waveform illustrated in portion (c) in FIG. 14.

In the following, description is provided on one half-cycle of the voltage Vs, which is an alternating voltage. During the period between time Ta and time Tb at which one quarter-cycle of the voltage Vs is reached, the instantaneous value Vin is higher than or equal to the voltage VC2. During this period, in the OFF period, current flows from the high-potential output terminal of the rectifier circuit 2 into the capacitor C2. At time Tb, the instantaneous value Vin reaches a maximum value Vinmax. Meanwhile, at time Tb, the voltage VC2 is still lower than the voltage Vinmax. Subsequently, during the period between time Tb and time Tc, the instantaneous value Vin gradually decreases and the voltage VC2 gradually increases. Following this, when the instantaneous value Vin equals the voltage VC2, the diode D2003 switches to non-conduction. Subsequently, during the period between time Tc and time Td, in the ON period, electric charge accumulated in the capacitor C2 is discharged from the capacitor C2 to the load 11 and the inductor L2002 by current flowing along the third current path (refer to FIG. 11A), while in the OFF period, magnetic energy accumulated in the inductor L2002 is discharged to the load 11 (refer to FIG. 11B) by current flowing along the fourth current path. Following this, when the instantaneous value Vin substantially equals the voltage VC2 once again at time Te, the diode D2003 switches to non-conduction, and current starts to flow from the high-potential output terminal of the rectifier circuit 2 to the low-potential output terminal of the rectifier circuit 2 along the first current path or the second current path.

As such, in the DC power supply circuit 2001, during a period Ti(1) between time Ta and time Tc, current flows from the rectifier circuit 2 to the voltage conversion circuit 2003. Meanwhile, during a period Ts(1) between time Tc and time Te, the instantaneous value Vin is lower than the voltage VC2, and current does not flow from the rectifier circuit 2 to the voltage conversion circuit 2003. Thus, in each half-cycle of AC supplied from the AC power supply, during a period from when the instantaneous value Vin reaches the maximum value Vinmax until when the instantaneous value Vin and the voltage VC2 equal one another at the voltage Vin1, the instantaneous value Vin is higher than or equal to the voltage VC2. Thus, during this period, current continues to flow from the AC power supply to the voltage conversion circuit 2003 via the rectifier circuit 2. Thus, when compared to a structure (referred to as a comparative example in the following) where, in each half-cycle of the voltage Vs, current does not flow from the AC power supply AC to the rectifier circuit 2 via the voltage conversion circuit 2003 when the instantaneous value Vin has reached the maximum value Vinmax, the DC power supply circuit 2001 has improved power factor. In fact, the power factor of the DC power supply circuit 2001 pertaining to the present embodiment, when power of 4.48 W is input from the AC power supply to the DC power supply circuit 2001, is approximately 0.74, whereas the power factor of a DC power supply circuit pertaining to the comparative example is between 0.50 and 0.61 under similar conditions. Further, the DC power supply circuit 2001 includes a so-called step-down chopper circuit. Due to this, substantially 100% of magnetic energy accumulated in the inductor L2002 is supplied to the load 11, and thus, the DC power supply circuit 2001 also has improved circuit efficiency.

Further, in the DC power supply circuit 2001, a minimum value Vinmin of the instantaneous value Vin is set higher than or equal to the voltage that is to be applied to the load 11, or that is, the rated voltage of the load 11. This configuration is made since when the minimum value Vinmin of the instantaneous value Vin is lower than the rated voltage of the load 11, the light-emitting modules consisting the load 11 emit light at different amounts. Specifically, the DC power supply circuit 2001 has a predetermined time constant related to the decay of the voltage VC2, which is set through appropriate adjustment of the electrostatic capacitance of the capacitor C2 and the resistance value of the resistor R7.

The power factor of the DC power supply circuit 2001 can be further improved by further extending the period Ti(1), during which the instantaneous value Vin is higher than or equal to the voltage VC2, and thereby further extending the period during which current continues to flow from the AC power supply to the voltage conversion circuit 2003, via the rectifier circuit 2.

When denoting the length of each cycle of the ON/OFF switching of the switching element Q1 as Tq, and the on-duty ratio as Don, Expression 3 and Expression 4 provided in the following hold true.

[Math 3]

$$Vin1 - Vinmin = \sum_{k=1}^{n} \Delta VC2(n, k, Don, Vin, C2, L2, L3) \quad \text{(Expression 3)}$$

[Math 4]

$$n = \frac{Ti(1)}{Tq} \quad \text{(Expression 4)}$$

In the above, the voltage $\Delta VC2$ denotes the amount by which the voltage VC2 increases per each cycle of the ON/OFF operation of the switching element Q1. Further, n denotes the number of times the switching element Q1 switches ON and OFF during the period Ti(1), Don denotes the on-duty ratio of the switching element Q1, Vin denotes the instantaneous value of the voltage output from the rectifier circuit 2, C2 denotes the electrostatic capacitance of the capacitor C2, L2 denotes the inductance of the inductor L2002, and L3 denotes the inductance of the inductor L2003. As can be seen from Expression 3 and Expression 4, the voltage $\Delta VC2$ (n,k,Don,Vin,C2,L2,L3) is a function that is dependent upon n, which denotes the number of times the switching element Q1 switches ON and OFF during the period Ti(1), and Don, which denotes the on-duty ratio of the switching element Q1. As such, provided that the electrostatic capacitance of the capacitor C2 and the inductance of the inductor L2002 are fixed, the value of the voltage Vin1 can be changed by setting as appropriate the length of each cycle of the ON/OFF switching of the switching element Q1 switches ON and OFF and the on-duty ratio of the switching element Q1. Here, a lower value being set to the voltage ΔVC2, which denotes the amount by which the voltage VC2 increases per each cycle of the ON/OFF switching of the switching element Q1, results in a longer duration of the period Ti(1) and a consequent improvement in the power factor of the DC power supply circuit 2001. Thus, in the DC power supply circuit 2001, the length of each cycle of the ON/OFF switching and the on-duty ratio of the switching element Q1 are set based upon the voltage ΔVC2 by which the voltage VC2 increases.

FIG. 15 includes portions (a) and (b) each illustrating a time domain waveform of the instantaneous value Vin in the DC power supply circuit 2001. The time domain waveform illustrated in portion (a) of FIG. 15 is the same time domain waveform as described above. The time domain waveform in portion (b) is that of the instantaneous value Vin of the rectifier circuit 2 when a configuration is made to the DC power supply circuit 2001 such that the voltage VC2 across the terminals of the capacitor C2 increases by a smaller amount than described above. As can be seen when comparing period Ti(1) in portion (a) and period Ti(2) in portion (b), by making a configuration such that the voltage VC2 increases by a smaller amount, the duration, in each half-cycle of AC supplied from the AC power supply, of a period from when the instantaneous value Vin reaches the maximum value Vinmax until when the instantaneous value Vin and the voltage VC2 equal one another at a voltage Vin1 can be extended, and accordingly, the duration of the period during which current flows from the rectifier circuit 2 into the capacitor C2 can be extended.

Note that the duration of the period Ti(1) can be extended not only by changing the length of each cycle of the ON/OFF switching and the on-duty ratio of the switching element Q1, but also by providing the capacitor C2 with greater electrostatic capacitance and providing the inductor L2002 and L2003 with greater inductance.

To summarize, in the DC power supply circuit 2001 pertaining to the present embodiment, while the instantaneous value Vin is higher than or equal to the voltage VC2, current flows along the first current path or the second current path, both of which starting at the high-potential output terminal of the rectifier circuit 2 and ending at the low-potential output terminal of the rectifier circuit 2. Thus, while the instantaneous value Vin is higher than or equal to the voltage VC2, current continues to flow from the AC power supply into the voltage conversion circuit 2003 via the rectifier circuit 2.

Further, while the instantaneous value Vin is higher than or equal to the voltage VC2, in the ON period, current mainly flows along the first current path, which does not pass through the capacitor C2, and current does not flow into the capacitor C2. Thus, while the instantaneous value Vin is higher than or equal to the voltage VC2, in the ON period, the capacitor is not charged. Meanwhile, while the instantaneous value Vin is higher than or equal to the voltage VC2, in the OFF period, current flows along the second current path, which passes through the capacitor C2, and the capacitor C2 is charged. As such, a period during which the capacitor C2 is charged and a period during which the capacitor C2 is not charged alternate repeatedly, in synchronization with the ON/OFF switching of the switching element Q1.

This results in the voltage VC2 increasing at a slower rate compared to a structure in which current continues to flow from the high-potential output terminal of the rectifier circuit 2 to the capacitor C2 regardless of the ON/OFF switching of the switching element Q1. Due to this, in the DC power supply circuit 2001 pertaining to the present embodiment, at the point when the instantaneous value Vin reaches the maximum value Vinmax, the voltage VC2 remains lower than the maximum value Vinmax. Accordingly, in the DC power supply circuit 2001 pertaining to the present embodiment, the instantaneous value Vin remains higher than the voltage VC2 for a certain period of time after the instantaneous value Vin reaches the maximum value Vinmax, and during this period, current continues to flow from the high-potential output terminal of the rectifier circuit 2 to the capacitor C2 along the second current path. While current continues to flow from the high-potential output terminal of the rectifier circuit 2 to the capacitor C2 along the second current path, current continues to flow from the AC power supply to the voltage conversion circuit 2003, via the rectifier circuit 2.

Due to this, the DC power supply circuit 2001 pertaining to the present embodiment has improved power factor compared to a structure in which current does not flow from an AC power supply to a capacitor via a rectifier circuit after an instantaneous value of voltage output from the rectifier circuit has reached a maximum value. This is because in the DC power supply circuit 2001 pertaining to the present embodiment, current continues to flow from the AC power supply to the voltage conversion circuit 2003, via the rectifier circuit 2, even after the instantaneous value Vin reaches the maximum value Vinmax, and due to this, current flows through the rectifier circuit 2 for a longer period of time (period Ti(1)) compared to in the above-described structure.

In addition, a conventional DC power supply circuit may have improved power factor due to including a power factor correction (PFC) circuit connected to a rectifier circuit and a step-up/step-down circuit connected downstream of the PFC circuit. Typically, a PFC circuit includes a switching element, an inductor, a control IC, etc. In contrast to such a conventional DC power supply circuit, the DC power supply circuit 2001 pertaining to the present embodiment has improved power factor while not including a PFC circuit. As such, compared to such a conventional DC power supply circuit, the DC power supply circuit 2001 has smaller circuit size, and has improved circuit efficiency for power loss therein being reduced.

In addition, at start-up of the DC power supply circuit 2001, the switching element Q1 is OFF. In this state, when voltage is input from the rectifier circuit 2 to the voltage conversion circuit 2003, an inrush current flows out from the high-potential output terminal of the rectifier circuit 2, flows through the load 11, the inductors L2002 and L2003, and the diode D2002 in the stated order, and flows into the capacitor C2. In the DC power supply circuit 2001, due to the load 11 and the inductors L2002 and L2003 functioning as current-limiting elements with respect to inrush current, the flow of excessive inrush current is prevented. Accordingly, damage to the diodes included in the rectifier circuit 2, etc., which would otherwise take place due to excessive inrush current flowing, is prevented. Note that due to the switching element Q1 switching ON and OFF as described above, the inrush current flowing through the inductors L2002 and L2003 takes the form of a high-frequency current. Accordingly, the inductors L2002 and L2003 function as high-impedance resistance with respect to this high-frequency inrush current. As such, even when the inductors L2002 and L2003 are inductors of small size having small inductance, inrush current can be effectively limited. In addition, since the inductors L2002 and L2003 function as current-limiting elements, the resistor R1 need only have relatively small resistance. Thus, the DC power supply circuit 2001 has improved circuit efficiency.

Embodiment 3

In embodiment 1, description is provided on the voltage conversion circuit 3, which includes a step-down chopper circuit. However, a voltage conversion circuit pertaining to the present disclosure may alternatively include a step-up/step-down chopper circuit.

FIG. 16 is a circuit diagram illustrating a DC power supply circuit 201 pertaining to embodiment 3. Note that in the following, a component having the same structure as in embodiment 1 is labeled with the same reference sign as in embodiment 1, and description on such components is omitted from the following where appropriate.

As illustrated in FIG. 16, the DC power supply circuit 203 includes a voltage conversion circuit 203. The voltage conversion circuit 203 includes a switching element Q1, an inductor L202, diodes D200, D201, and D202, capacitors C202 and C204, and a resistor R7.

A first terminal of the inductor L202 is connected to a cathode of the diode D200, and a second terminal of the inductor L202 is connected to a drain of the switching element Q1. An anode of the diode D200 is connected to a high-potential output terminal of the rectifier circuit 2, and a cathode of the diode D200 is connected to the first terminal of the inductor L202. An anode of the diode D201 (first unidirectional element) is connected to the second terminal of the inductor L202 and the drain of the switching element Q1, and a cathode of the diode D201 is connected to a high-potential terminal of the load 11. A first terminal of the capacitor C202 is connected to a low-potential output terminal of the rectifier circuit 2, and a second terminal of the capacitor C202 is connected to an anode of the diode D202. The capacitor C202 is an electrolytic capacitor. Note that alternatively, the capacitor C202 may, for example, be a high dielectric constant ceramic capacitor or a film capacitor. The anode of the diode D202 (second unidirectional element) is connected to the second terminal of the capacitor C202 and a low-potential terminal of the load 11, and a cathode of the diode D202 is connected to the first terminal of the inductor L202 and the cathode of the diode D200. The capacitor C204 is connected in parallel to the load 11 and has a function of smoothing a voltage across the terminals of the load 11.

The following explains operations of the DC power supply circuit 201 pertaining to the present embodiment.

At start-up of the DC power supply circuit 201, the switching element Q1 is OFF. In this state, when voltage is input from the rectifier circuit 2 to the voltage conversion circuit 203, an inrush current flows out from the high-potential output terminal of the rectifier circuit 2, flows through the diode D200, the inductor L202, the diode D201, and the load 11 in the stated order, and flows into the capacitor C202, similar as in the DC power supply circuit 1 pertaining to embodiment 1. The flow of this inrush current into the capacitor C202 charges the capacitor C202. As a result of this charging, the voltage of the capacitor C202 equals a voltage that is lower than the voltage output from the rectifier circuit 2 by an amount equal to a voltage drop occurring at the load 11. Following this, current flows in the DC power supply circuit 201 along one of the following current paths. A current path at a given point is dependent upon the magnitude of the voltage output from the rectifier circuit 2 at the given point and whether the switching element Q1 is ON or OFF at the given point.

Each of FIGS. 17A, 17B, 18A, 18B is a circuit diagram of the DC power supply circuit 201, including illustration of current flow in the DC power supply circuit 201. In FIGS. 17A, 17B, 18A, 18B, the fixed voltage circuit 4 is not illustrated.

FIGS. 17A and 17B correspond to while an instantaneous value Vin of the voltage output from the rectifier circuit 2 is lower than a voltage VC2 across the terminals of the capacitor C202. Further, FIG. 17A illustrates the flow of current in the ON period, and FIG. 17B illustrates the flow of current in the OFF period.

As illustrated in FIG. 17A, while the instantaneous value Vin is higher than or equal to the voltage VC2, in the ON period, current flows out from the high-potential output terminal of the rectifier circuit 2, flows through the diode D200, the inductor L202, the switching element Q1, and the resistor R7 in the stated order, and flows into the low-potential output terminal of the rectifier circuit 2. This path is referred to as a "first current path" in the following. When current flows along the first current path, electric charge at a node between the inductor L202 and the cathode of the diode D200 is higher than electric charge at the second terminal (high-potential terminal) of the capacitor C202. Due to this, the diode D202 does not conduct. Further, when current flows along the first current path, electric charge at a node between the inductor L202 and the switching element Q1 is substantially 0 V. Due to this, the diode D201 does not conduct. Further, when current flows along the first current path, magnetic energy is accumulated in the inductor L202.

Meanwhile, as illustrated in FIG. 17B, while the instantaneous value Vin is higher than or equal to the voltage VC2, in the OFF period, current flows out from the inductor L202, flows through the diode D201, the load 11, and the diode D202 in the stated order, and returns to the inductor L202. This path is referred to as an "A current path" in the following. When current flows along the A current path, a voltage at the node between the inductor L202 and the switching element Q1 is higher than a voltage at a node between the load 11 and the cathode of the diode S201 by an amount equal to an ON voltage of the diode D201. Thus, the diode D201 conducts. In addition, while the instantaneous value Vin is higher than or equal to the voltage VC2, in the OFF period, current also flows from the high-potential output terminal of the rectifier circuit 2, flows through the diode D200, the inductor L202, the diode D201, the load 11, and the capacitor C202 in the stated order, and flows into the low-potential output terminal of the rectifier circuit 2. This path is referred to as a "second current path" in the following. When current flows along the second current path, the capacitor C202 is charged.

As described above, while the instantaneous value Vin is higher than or equal to the voltage VC2, current continues to flow from the rectifier circuit 2 to the voltage conversion circuit 203.

FIGS. 18A and 18B correspond to while the instantaneous value Vin is lower than the voltage VC2. Further, FIG. 18A illustrates the flow of current in the ON period, and FIG. 18B illustrates the flow of current in the OFF period.

As illustrated in FIG. 18A, while the instantaneous value Vin is lower than the voltage VC2, in the ON period, current flows out from the second terminal (high-potential terminal) of the capacitor C202, flows through the diode D202, the inductor L202, the switching element Q1, and the resistor R7 in the stated order, and flows into the first terminal (low-potential terminal) of the capacitor C202. This path is referred to as a "third current path" in the following. When current flows along the third current path, electric charge at a node between the capacitor C202 and the anode of the diode D202 is higher than electric charge at the high-potential output terminal of the rectifier circuit 2. Due to this, the diode D200 does not conduct. Further, when current flows along the third current path, electric charge at the node between the inductor L202 and the switching element Q1 is substantially 0 V. Due to this, the diode D201 does not conduct. Further, when current flows along the third current path, magnetic energy is accumulated in the inductor L202.

Meanwhile, as illustrated in FIG. 18B, while the instantaneous value Vin is lower than the voltage VC2, in the OFF period, current flows out from the inductor L202, flows through the diode D201 the load 11, and the diode D202 in the stated order, and returns to the inductor L202. This path is referred to as a "fourth current path" in the following. When current flows along the fourth current path, the magnetic energy accumulated in the inductor L202 is discharged to the load 11.

As described above, while the instantaneous value Vin is lower than the voltage VC2, current does not flow from the rectifier circuit 2 to the voltage conversion circuit 203.

Similar as in the above, in the DC power supply circuit 201 pertaining to the present embodiment, while the instantaneous value Vin is higher than or equal to the voltage VC2, the voltage VC2 increases intermittently by a voltage ΔVC2 for each cycle of the ON/OFF switching of the switching element Q1 (refer to portions (a) through (c) in FIG. 4). Due to this, similar as in the DC power supply circuit 1 pertaining to embodiment 1, in the DC power supply circuit 201 pertaining to the present embodiment, during a period corresponding to one quarter-cycle in the first half of each half-cycle of AC input from the AC power supply to the rectifier circuit 2, the instantaneous value Vin increases at a faster rate compared to the voltage VC2 (refer to portion (b) in FIG. 5). In other words, the voltage VC2 increases at a slower rate compared to the instantaneous value Vin in the DC power supply circuit 201.

Thus, in each half-cycle of voltage Vs, which is an alternating voltage, a current Iin flows from the AC power supply to the rectifier circuit 2 for a certain period of time even after an absolute value of the voltage Vs reaches a maximum value thereof. Owing to this, in the DC power supply circuit 201, current flows from the AC power supply to the voltage conversion circuit 203, via the rectifier circuit 2, for a relatively long amount of time. As such, the DC power supply circuit 201 pertaining to the present embodiment has improved power factor compared to a DC power supply circuit pertaining to a comparative example. In fact, the circuit efficiency of the DC power supply circuit 201 pertaining to the present embodiment, when power of 8.20 W is input from the AC power supply to the DC power supply circuit 201, is about 0.72.

Embodiment 4

In embodiment 2, description is provided on the voltage conversion circuit 2003, which includes a step-down chopper circuit. Alternatively, the voltage conversion circuit 2003 may include a step-up/step-down chopper circuit.

FIG. 19 is a circuit diagram illustrating a DC power supply circuit 2201 pertaining to embodiment 4. Note that in the following, a component having the same structure as in embodiment 2 is labeled with the same reference sign as in embodiment 2, and description on such components is omitted from the following where appropriate.

The DC power supply circuit 2201 includes a voltage conversion circuit 2203. The voltage conversion circuit 2203 includes a switching element Q1, inductors L2003 and L2202, diodes D2002 and D2003 (first unidirectional element and second unidirectional element, respectively), a diode D2201, capacitors C2 and C4, and a resistor R7.

A first terminal of the inductor L2202 is connected to a high-potential output terminal of the rectifier circuit 2, and a second terminal of the inductor L2202 is connected to a drain of the switching element Q1. An anode of the diode D2201 (third unidirectional element) is connected to the second terminal of the inductor L2202, and a cathode of the diode D2201 is connected to the load 11. Further, similar as in the DC power supply circuit 2001 pertaining to embodiment 2, in the DC power supply circuit 2201, the inductor L2003 (current-limiting element) is connected between a cathode of the diode D2002 and a second terminal of the capacitor C2, which is opposite a first terminal of the capacitor C2 that is connected to a low-potential output terminal of the rectifier circuit 2.

The following explains operations of the DC power supply circuit 2201 pertaining to the present embodiment.

At start-up of the DC power supply circuit 2201, the switching element Q1 is OFF. In this state, when voltage is input from the rectifier circuit 2 to the voltage conversion circuit 2203, an inrush current flows out from the high-potential output terminal of the rectifier circuit 2, flows through the inductor L2202, the diode D2002, and the inductor L2003 in the stated order, and flows into the capacitor C2. The flow of this inrush current into the capacitor C2 charges the capacitor C2 such that the voltage of the capacitor C2 equals the voltage output from the rectifier circuit 2. Following this, after at least one half-cycle of AC supplied from the power supply AC to the rectifier circuit 2 elapses, current flows in the DC power supply circuit 2201 along the following current paths. A current path at a given point is dependent upon the magnitude of the voltage output from the rectifier circuit 2 at the given point and whether the switching element Q1 is ON or OFF at the given point.

Each of FIGS. 20A, 20B, 21A, 21B, 22A, 22B is a circuit diagram of the DC power supply circuit 2201, including illustration of current flow in the DC power supply circuit 2201. In FIGS. 20A, 20B, 21A, 21B, 22A, 22B, the fixed voltage circuit 4 is not illustrated.

FIGS. 20A and 20B and FIG. 21A correspond to while an instantaneous value Vin of the voltage output from the rectifier circuit 2 is higher than or equal to a voltage VC2 across the terminals of the capacitor C2. Further, FIG. 20A illustrates the flow of current in the ON period, and FIGS. 20B and 21A illustrate the flow of current in the OFF period.

As illustrated in FIG. 20A, while the instantaneous value Vin is higher than or equal to the voltage VC2, in the ON period, current flows out from the high-potential output terminal of the rectifier circuit 2, flows through the inductor L202, the switching element Q1, and the resistor R7 in the stated order, and flows into the low-potential output terminal of the rectifier circuit 2. This path is referred to as a "first current path" in the following. When current flows along the first current path, electric charge at a node between the inductor L2202 and the switching element Q1 is substantially 0 V. Due to this, the diodes D2201 and D2002 do not conduct. Further, when current flows along the first current path, magnetic energy is accumulated in the inductor L2202.

Meanwhile, as illustrated in FIG. 20B, while the instantaneous value Vin is higher than or equal to the voltage VC2, in the OFF period, current out flows from the inductor L2202, flows through the diode D2201 and the load 11 in the stated order, and returns to the inductor L2202. This path is referred to as an "A current path" in the following. When current flows along the A current path, a voltage at a node between the inductor L2202 and the anode of the diode D2201 is higher than the voltage output from the rectifier circuit 2 by an amount equal to an ON voltage of the diode D2201. Thus, the diode D2201 conducts. In addition, while the instantaneous value Vin is higher than or equal to the voltage VC2, in the OFF period, current also flows out from the high-potential output terminal of the rectifier circuit 2, flows through the inductor L2202, the diode D2002, the inductor L2003, and the capacitor C2 in the stated order, and flows into the low-potential output terminal of the rectifier circuit 2. This path is referred to as a "second current path" in the following. When current flows along the second current path, the capacitor C2 is charged and magnetic energy is accumulated in the inductor L2202.

Further, note that while the instantaneous value Vin is higher than or equal to the voltage VC2, in the OFF period, particularly when the inductor L2202 completes discharging magnetic energy accumulated therein, current flows out from the second terminal of the inductor L2003, flows through the capacitor C2, the resistor R7, a body diode of the switching element Q1, and the diode D2002 in the stated order, and flows into the first terminal of the inductor L2003, as illustrated in FIG. 21A. This path is referred to as a "B current path" in the following. At the same time, current discharged from the capacitor C4 is supplied to the load 11. Note that current flows along the B current path when the DC power supply circuit 2201 is operated in the discontinuous mode, similar as in embodiment 2. As such, when the DC power supply circuit 2201 is operated in the critical mode or the continuous mode, current does not flow along the B current path. Further, while the instantaneous value Vin is higher than or equal to than the voltage VC2, in the ON period, particularly when the DC power supply circuit 2201 is operating in the critical mode or the continuous mode, current temporarily (only during a period ΔT) flows out from the high-potential output terminal of the rectifier circuit 2, flows through the inductor L2202, the diode D2002, the inductor L2003, and the capacitor C2 in the stated order, and flows into the low-potential output terminal of the rectifier circuit 2, as illustrated in FIG. 21B. This path is referred to as a "C current path" in the following. Note that in this case, current flows along the C current path at the same time as flowing along the first current path. As such, during the period ΔT immediately after the switching element Q1 is turned ON, current flows along the C current path and into the capacitor C2, whereby the capacitor C2 is charged.

As described above, while the instantaneous value Vin is higher than or equal to the voltage VC2, current continues to flow from the rectifier circuit 2 to the voltage conversion circuit 2203. Further, while the instantaneous value Vin is higher than or equal to the voltage VC2, in the OFF period, current flows along the second current path or the B current path, and the capacitor C2 is charged. Meanwhile, while the instantaneous value Vin is higher than or equal to the voltage VC2, in the ON period, current is supplied from the high-potential output terminal of the rectifier circuit 2 to the load 11 along the first current path. On the other hand, while the instantaneous value Vin is higher than or equal to the voltage VC2, in the OFF period, current is supplied to the load 11 from the inductor L2202 along the A current path and from the high-potential output terminal of the rectifier circuit 2 along the second current path. Further, when the discharge of energy accumulated in the inductor L2202 is completed, current is supplied to the load 11 from only the capacitor C4.

FIGS. 22A and 22B correspond to while the instantaneous value Vin is lower than the voltage VC2. Further, FIG. 22A illustrates the flow of current in the ON period, and FIG. 22B illustrates the flow of current in the OFF period.

As illustrated in FIG. 22A, while the instantaneous value Vin is lower than the voltage VC2, in the ON period, current flows out from the second terminal (high-potential terminal) of the capacitor C2, flows through the diode D2003, the inductor L2202, the switching element Q1, and the resistor R7 in the stated order, and flows into the first terminal (low-potential terminal) of the capacitor C2. This path is referred to as a "third current path" in the following. When current flows along the third current path, electric charge at the node between the inductor L2202 and the switching element Q1 is substantially 0 V. Due to this, the diodes D2201 and D2002 do not conduct. Further, when current flows along the third current path, magnetic energy is accumulated in the inductor L2202.

Meanwhile, as illustrated in FIG. 22B, while the instantaneous value Vin is lower than the voltage VC2, in the OFF period, current flows out from the inductor L2202, flows through the diode D2201 and the load 11 in the stated order, and returns to the inductor L2202. This path is referred to as a "fourth current path" in the following. When current flows along the fourth current path, the magnetic energy accumulated in the inductor L2202 is discharged to the load 11.

Following this, when the discharge of energy accumulated in the inductor L2202 is completed, the flow of current along the fourth current path stops.

As described above, while the instantaneous value Vin is lower than the voltage VC2, current does not flow from the rectifier circuit 2 to the voltage conversion circuit 2203. In particular, while the instantaneous value Vin is lower than the voltage VC2, in the ON period, current is supplied to the load 11 from the capacitor C2 along the third current path. On the other hand, while the instantaneous value Vin is lower than the voltage VC2, in the OFF period, current is supplied to the load 11 from the inductor L2202 along the fourth current path. Further, when the discharge of energy accumulated in the inductor L2202 is completed, current is supplied to the load 11 from only the capacitor C4.

In the DC power supply circuit 2201 pertaining to the present embodiment, while the instantaneous value Vin is higher than or equal to the voltage VC2, the voltage VC2 increases intermittently by a voltage ΔVC2 for each cycle of the ON/OFF switching of the switching element Q1 (refer to portions (d) in FIG. 11 and portion (d) in FIG. 12). Due to this, similar as in the DC power supply circuit 1 pertaining to embodiment 1, during a period corresponding to one quarter-cycle in the first half of each half-cycle of AC input from the AC power supply to the rectifier circuit 2, the voltage VC2 increases at a slower rate compared to the instantaneous value Vin (refer to portion (b) in FIG. 14).

Thus, similar as in the DC power supply circuit 2001 pertaining to embodiment 2, in each half-cycle of a voltage Vs, which is an alternating voltage, a current Iin flows from the AC power supply to the rectifier circuit 2 for a certain period even after an absolute value of the voltage Vs reaches a maximum value thereof. Owing to this, in the DC power supply circuit 2201, current flows from the AC power supply to the voltage conversion circuit 2203, via the rectifier circuit 2, for a relatively long amount of time. As such, the DC power supply circuit 2201 pertaining to the present embodiment has improved power factor compared to a DC power supply circuit pertaining to a comparative example.

<Modifications>

(1) In the DC power supply circuit 1 pertaining to embodiment 1, the voltage conversion circuit 3 includes the diodes D1 and D2 as unidirectional elements. Alternatively, the voltage conversion circuit 3 may include a unidirectional element other than a diode.

FIG. 23 is a circuit diagram illustrating a DC power supply circuit 301 pertaining to the present modification.

The DC power supply circuit 301 includes a voltage conversion circuit 303. The voltage conversion circuit 303 includes switching elements Q201 and Q202, each of which is an N-channel MOSFET. Further, the DC power supply circuit 301 includes a drive circuit U2. The drive circuit U2 has control terminals te4 and te5, which output signal voltages and control ON/OFF switching of the switching elements Q202 and Q201, respectively.

A source of the switching element Q201 is connected to a capacitor C2, a gate of the switching element Q201 is connected to the control terminal te5 of the drive circuit U2 via a resistor 8211, and a drain of the switching element Q201 is connected to a node between an inductor L2 and a switching element Q1. Further, a source of the switching element Q202 is connected to a cathode of a diode D0, a gate of the switching element Q202 is connected to the control terminal te4 of the drive circuit U2 via a resistor 8212, and a drain of the switching element Q202 is connected to the capacitor C2.

FIG. 24A illustrates a time domain waveform of a voltage Vin output from a rectifier circuit 2 in the DC power supply circuit 301 pertaining to the present modification, and FIG. 24B illustrates ON/OFF switching of each of the switching elements Q1, Q201, and Q202 in the DC power supply circuit 301 pertaining to the present modification. Note that in the following, as illustrated in FIG. 24, a period during which the voltage Vin is higher than or equal to a voltage VC2 across terminals of the capacitor C2 is referred to as period A, and a period during which the voltage Vin is lower than the voltage VC2 is referred to as period B.

As illustrated in FIG. 24B, during period A, the drive circuit U2 supplies, to each of the switching elements Q201 and Q202, a signal voltage that has a rectangular waveform and that is offset by half a cycle from a signal voltage input to the switching element Q1.

Meanwhile, during period B, the drive circuit U2 supplies, to the switching element Q201, a signal voltage that has a rectangular waveform and that is offset by half a cycle from a signal voltage input to the switching element Q1, and maintains a signal voltage input to the switching element Q202 at a voltage higher than or equal to an ON voltage of the switching element Q202. As such, the switching element Q202 is maintained in ON state.

As such, in the voltage conversion circuit 303, the switching elements Q201 and Q202 function as rectifying elements.

(2) In embodiment 1, description is provided on the DC power supply circuit 1, in which the capacitors C43 and C47 are charged in the OFF period, and charge accumulated in the capacitor C47 is discharged to the capacitor C43 in the ON period. However, the DC power supply circuit 1 is not limited in this way. For example, the DC power supply circuit 1 may be modified as described in the following, so as to include a transformer in place of the inductor L2, and such that current flows from a secondary coil of this transformer to the fixed voltage circuit 4, i.e., such that the fixed voltage circuit 4 is charged by current flowing from the secondary coil.

FIG. 25 is a circuit diagram illustrating a DC power supply circuit 501 pertaining to this modification. Note that in the following, a component having the same structure as in embodiment 1 is labeled with the same reference sign as in embodiment 1, and description on such components is omitted from the following where appropriate.

The DC power supply circuit 501 includes a voltage conversion circuit 503. The voltage conversion circuit 503 includes a transformer Tr501. The transformer Tr501 includes a primary coil L511 and a secondary coil T512. The primary coil L511 functions in a similar way as does the inductor L2 in embodiment 1. In the transformer Tr502, the primary coil L511 and the secondary coil T512 have the same polarity. The DC power supply circuit 501 also includes a fixed voltage circuit 504. In the fixed voltage circuit 504, a capacitor C547 is connected between a low-potential output terminal of a rectifier circuit 2 and a node between the secondary coil T512 of the transformer Tr502 and a resistor R46. The capacitor C547 functions as a so called snubber capacitor with respect to the secondary coil T512. In this modification, current is supplied from the secondary coil T512 to the fixed voltage circuit 504 when a switching element Q1 turns OFF, i.e., when magnetic energy is accumulated in the primary coil L511 of the transformer Tr501. More specifically, a capacitor C43 is charged by current flowing out from the secondary coil T512, flowing through the resistor R46 and a diode D45, and flowing into the capacitor C43. Note that the capacitor C547 need not be included.

In the DC power supply circuit 501 illustrated in FIG. 25, the primary coil L511 and the secondary coil T512 of the transformer Tr501 have the same polarity. Alternatively, the primary coil L511 and the secondary coil T512 may have opposite polarities. In such a case, current is supplied from the secondary coil T512 to the fixed voltage circuit 504 when the switching element Q1 turns ON, i.e., when the primary coil L511 discharges magnetic energy.

As such, in the DC power supply circuit 501 illustrated in FIG. 25, current is supplied from the secondary coil L512 to the fixed voltage circuit 504 when magnetic energy is discharged by the primary coil L511 or when magnetic energy is accumulated in the primary coil L511. Alternatively, a modification as described in the following may be made, where current is supplied from the secondary coil L512 to the fixed voltage circuit 504 when magnetic energy is discharged by the primary coil L511 and when magnetic energy is accumulated in the primary coil L511.

FIG. 26 is a circuit diagram illustrating a DC power supply circuit 601 pertaining to this modification. Note that in FIG. 26, a component having the same structure as in FIG. 25 is labeled with the same reference sign as in FIG. 25, and description on such components is omitted from the following where appropriate.

The DC power supply circuit 601 differs from the DC power supply circuit 501 illustrated in FIG. 25 for including a voltage conversion circuit 603, which includes a diode bridge DB. Input terminals of the diode bridge DB are connected between terminals of a secondary coil T512 of a transformer Tr501. Further, a high-potential output terminal of the diode bridge DB is connected to a fixed voltage circuit 504, and a low-potential output terminal of the diode bridge DB is connected to a low-potential output terminal of a rectifier circuit 2. In the transformer Tr501, a primary coil L511 and the secondary coil T512 may have opposite polarities.

In the DC power supply circuit 601, current is supplied from the diode bridge DB to the fixed voltage circuit 504 when a switching element Q1 turns ON and when the switching element Q1 turns OFF. Note that in the fixed voltage circuit 504 in FIGS. 25 and 26, the diode D54 need not be included.

Further, a modification as described in the following may be made to the DC power supply circuit 1, in terms of the supply of power from the voltage conversion circuit 3. In the following modification, power is supplied from the voltage conversion circuit 3 to the fixed voltage circuit 4 when voltage at a node between the inductor L2 and the diode D1 is lower than or equal to a predetermined voltage in the OFF period.

FIG. 27 is a circuit diagram illustrating a DC power supply circuit 701 pertaining to this modification. Note that in the following, a component having the same structure as in embodiment 1 is labeled with the same reference sign as in embodiment 1, and description on such components is omitted from the following where appropriate.

The DC power supply circuit 701 includes a switching element Q702. The switching element Q702 is connected between a fixed voltage circuit 704 and a node between an inductor L2 and an anode of a diode D1. The inductor L2 and the diode D1 are included in a voltage conversion circuit 703. Further, the DC power supply circuit 701 includes a drive circuit U3. The drive circuit U3 has a control terminal te4 that outputs a signal voltage and controls the switching element Q702.

The switching element Q702 is an N-channel MOSFET. A source of the switching element Q702 is connected to the fixed voltage circuit 704, a gate of the switching element Q702 is connected to the control terminal te4 of the drive circuit U3 via a resistor R712, and a drain of the switching element Q702 is connected to the node between the inductor L2 and the anode of the diode D1. The fixed voltage circuit 704 includes a resistor R46, which is connected directly to the source of the switching element Q702. As such, the fixed voltage circuit 704 corresponds to the fixed voltage circuit 504 illustrated in FIG. 25 without the capacitor C547.

In the DC power supply circuit 701, the drive circuit U3 turns ON the switching element Q702 by providing the signal voltage of the control terminal te4 with a predetermined voltage higher than 0 V, when the voltage at the node between the inductor L2 and the anode of the diode D1 equals or drops below a predetermined voltage while the switching element Q1 is being maintained in the OFF state by a signal voltage having a predetermined voltage higher than 0 V being output from the output terminal te1. Note that the timing at which the switching element Q702 is turned ON is set in advance. Thus, power loss at the resistor R46 in the fixed voltage circuit 704 is reduced, which improves circuit efficiency. Further, the fixed voltage circuit 704 includes a reduced number of circuit elements, which reduces circuit size.

Note that the fixed voltage circuits described with reference to FIGS. 25 through 27 are also applicable to the DC power supply circuit 201 pertaining to embodiment 3.

(3) In embodiment 1, description is provided on the voltage conversion circuit 3, which includes a non-insulation type voltage conversion circuit, such as a step-down chopper circuit. Alternatively, the voltage conversion circuit 3 may include an insulation type voltage conversion circuit, as described in the following modification.

FIG. 28 is a circuit diagram illustrating a DC power supply circuit 401 pertaining to this modification. Note that in the following, a component having the same structure as in embodiment 1 is labeled with the same reference sign as in embodiment 1, and description on such components is omitted from the following where appropriate.

As illustrated in FIG. 28, the DC power supply circuit 401 includes a voltage conversion circuit 403. The voltage conversion circuit 403 is a flyback converter and includes a switching element Q1, a transformer Tr401 having a primary coil L411 and a secondary coil L412, diodes D1, D2, and D403, capacitors C2 and C404, and a resistor R7. In the transformer Tr401, the primary coil L411 and the secondary coil T412 have opposite polarities. A source of the switching element Q1 is connected to a low-potential output terminal of a rectifier circuit 2 via the resistor R7, a gate of the switching element Q1 is connected to a drive circuit U1 via a resistor R11, and a drain of the switching element Q1 is connected to a first terminal of the primary coil L411. An anode of the diode D1 is connected to a node between the primary coil L411 and the switching element Q1, and a cathode of the diode D1 is connected to the capacitor C2. An anode of the diode D403 is connected to a first terminal of the secondary coil L412 of the transformer Tr401, and a cathode of the diode D403 is connected to a first terminal of the capacitor C404. A second terminal of the capacitor C404 is connected to a second terminal of the secondary coil L412 of the transformer Tr401. The voltage conversion circuit 403 outputs a voltage across the terminals of the capacitor C404 to a load 11 connected in parallel to the capacitor C404.

This modification ensures safety when high power is supplied to the load 11.

(4) In embodiment 2, description is provided on the DC power supply circuit 2001, which includes the diode D2003, the cathode of which is connected to the high-potential output terminal of the rectifier circuit 2. Alternatively, the DC power supply circuit 2001 may be modified as described in the following.

FIG. 29 is a circuit diagram illustrating a DC power supply circuit 1101 pertaining to this modification. Note that in the following, a component having the same structure as in embodiment 2 is labeled with the same reference sign as in embodiment 2, and description on such components is omitted from the following where appropriate.

The DC power supply circuit 1101 includes a voltage conversion circuit 1103. The voltage conversion circuit 1103 includes a diode D1103, an anode of which is connected to a low-potential output terminal of a rectifier circuit 2, and a cathode of which is connected to a first terminal of an inductor L2002. In the DC power supply circuit 1101, when a switching element Q1 is turned ON, electric charge accumulated in a capacitor C2 is discharged via an inductor L2.

(5) In embodiment 4, description is provided on the DC power supply circuit 201, which includes the diode D202, the cathode of which is connected to the high-potential output terminal of the rectifier circuit 2. Alternatively, the DC power supply circuit 201 may be modified as described in the following.

FIG. 30 is a circuit diagram illustrating a DC power supply circuit 1201 pertaining to this modification. Note that in FIG. 30, a component having the same structure as in FIG. 29 is labeled with the same reference sign as in FIG. 29, and description on such components is omitted from the following where appropriate.

The DC power supply circuit 1201 includes a voltage conversion circuit 1203. The voltage conversion circuit 1203 includes a diode D1203, an anode of which is connected to a low-potential output terminal of a rectifier circuit 2, and a cathode of which is connected to a cathode of a diode D2201. In the DC power supply circuit 1201, when a switching element Q1 is turned ON, electric charge accumulated in a capacitor C2 is discharged via a load 11, an inductor L2202, and the switching element Q1.

(6) In embodiments 2 and 4, description is provided on a DC power supply circuit (2001, 2201) including a voltage conversion circuit (2003, 2203) in which a cathode of the diode D2002 is connected to the capacitor C2 via the inductor L2003. Alternatively, the DC power supply circuits 2001 and 2201 may be modified as described in the following, such that a capacitor for surge suppression is connected between the cathode of the diode D2002 and the inductor L2003.

FIGS. 31 and 32 each include a circuit diagram illustrating a DC power supply circuit (2301, 2401) pertaining to this modification. Note that in the following, a component having the same structure as in embodiment 2 (DC power supply circuit 2001) or embodiment 4 (DC power supply circuit 2201) is labeled with the same reference sign as in embodiment 2 or embodiment 4, and description on such components is omitted from the following where appropriate.

The DC power supply circuit (2301, 2401) includes a power conversion circuit (2303, 2403). The power conversion circuit (2303, 2403) includes a capacitor Ca connected between a cathode of a diode D2002 and a low-potential output terminal of a rectifier circuit 2. The capacitor Ca functions as a so-called snubber capacitor with respect to an inductor 2003. That is, the capacitor Ca suppresses a rapid increase (i.e. a surge) in a voltage across terminals of an inductor L2003, which would, without the capacitor C2a occur when a switching element Q1 is switched from OFF to ON. Such a modification reduces the voltage resistance required of the capacitor C2. Thus, the size of the capacitor C2 is reduced, which further leads in reduction of circuit size. Note that electric charge in the capacitor C2 needs to be discharged each time ON/OFF switching of the switching element Q1 is performed. With regards to this point, in the modification described above, the electric charge accumulated in the capacitor Ca is drawn out and transferred to the capacitor C2 when magnetic energy accumulated in the inductor L2003 is discharged. Thus, the electric charge in the capacitor Ca does not result in power loss, which improves circuit efficiency.

(7) In embodiment 2, description is provided on the DC power supply circuit 2001, in which the capacitors C43 and C47 are charged in the OFF period, and charge accumulated in the capacitor C47 is discharged to the capacitor C43 in the ON period. However, the DC power supply circuit 2001 is not limited in this way. For example, the DC power supply circuit 2001 may be modified as described in the following, so as to include a transformer in place of the inductor L2, and such that current flows from a secondary coil of this transformer to the fixed voltage circuit 4, i.e., such that the fixed voltage circuit 4 is charged by current flowing from the secondary coil.

FIG. 33 is a circuit diagram illustrating a DC power supply circuit 2601 pertaining to this modification. Note that in the following, a component having the same structure as in embodiment 2 is labeled with the same reference sign as in embodiment 2, and description on such components is omitted from the following where appropriate.

The DC power supply circuit 2601 includes a voltage conversion circuit 2603. The voltage conversion circuit 2603 includes a transformer Tr2602. The transformer Tr2602 includes a primary coil L2611 and a secondary coil T2612. The primary coil L2611 functions in a similar way as does the inductor L2002 in embodiment 2. In the transformer Tr2602, the primary coil L2611 and the secondary coil L2612 have the same polarity. The DC power supply circuit 2601 also includes a fixed voltage circuit 2604. In the fixed voltage circuit 2604, a capacitor C647 is connected between a low-potential output terminal of a rectifier circuit 2 and a node between the secondary coil T2612 of the transformer Tr2602 and a resistor R46. The capacitor C647 functions as a so-called snubber capacitor with respect to the secondary coil T2612. In this modification, current is supplied from the secondary coil T2612 to the fixed voltage circuit 2604 when a switching element Q1 turns OFF, i.e., when magnetic energy is discharged from the primary coil L2611 of the transformer Tr2602. More specifically, a capacitor C43 is charged by current flowing out from the secondary coil T2612, flowing through the resistor R46 and a diode D45, and flowing into the capacitor C43. Note that the capacitor C647 need not be included.

In the DC power supply circuit 2601 illustrated in FIG. 33, the primary coil L2611 and the secondary coil T2612 of the transformer Tr2602 have the same polarity. Alternatively, the primary coil L2611 and the secondary coil T2612 may have opposite polarities. In such a case, current is supplied from the secondary coil T2612 to the fixed voltage circuit 2604 when the switching element Q1 turns ON, i.e., when magnetic energy is being accumulated in the primary coil L2611.

As such, in the DC power supply circuit 2601 illustrated in FIG. 33, current is supplied from the secondary coil L2612 to the fixed voltage circuit 2604 when magnetic energy is discharged by the primary coil L2611 or when magnetic energy is accumulated in the primary coil L2611. Alternatively, a modification as described in the following may be made, where current is supplied from the secondary coil L2612 to the fixed voltage circuit 2604 when magnetic energy is discharged by the primary coil L2611 and when magnetic energy is accumulated in the primary coil L2611.

FIG. 34 is a circuit diagram illustrating a DC power supply circuit 2701 pertaining to this modification. Note that in FIG. 34, a component having the same structure as in FIG. 33 is labeled with the same reference sign as in FIG. 33, and description on such components is omitted from the following where appropriate.

The DC power supply circuit 2701 differs from the DC power supply circuit 2601 illustrated in FIG. 33 for including a voltage conversion circuit 2703, which includes a diode bridge DB. Input terminals of the diode bridge DB is connected between terminals of a secondary coil T2712 of a transformer Tr2702. Further, a high-potential output terminal of the diode bridge DB is connected to a fixed voltage circuit 2604, and a low-potential output terminal of the diode bridge DB is connected to a low-potential output terminal of a rectifier circuit 2. In the transformer Tr2702, a primary coil L2711 and the secondary coil T2712 may have opposite polarities.

In the DC power supply circuit 2701, current is supplied from the diode bridge DB to the fixed voltage circuit 2604 when a switching element Q1 is ON and when the switching element Q1 is OFF. Note that in the fixed voltage circuit 2604 in FIGS. 33 and 34, the diode D45 need not be included.

Further, the DC power supply circuit 2701 illustrated in FIG. 34 includes the transformer Tr2702 in place of the inductor L2002, and is configured such that current flows from the secondary coil 2712 of the transformer Tr2702 to the fixed voltage circuit 2704, i.e., such that the fixed voltage circuit 2704 is charged by current flowing from the secondary coil 2712. Alternatively, for example, the DC power supply circuit 2701 may be modified as described in the following, so as to include a transformer in place of the inductor L2003, and such that current flows from a secondary coil of this transformer to the fixed voltage circuit 2604, i.e., such that the fixed voltage circuit 2604 is charged by current flowing from the secondary coil.

FIG. 35 is a circuit diagram illustrating a DC power supply circuit 2801 pertaining to this modification. Note that in FIG. 35, a component having the same structure as in FIG. 34 is labeled with the same reference sign as in FIG. 34, and description on such components is omitted from the following where appropriate.

The DC power supply circuit 2801 includes a voltage conversion circuit 2803. The voltage conversion circuit 2803 includes a transformer Tr2803. The transformer Tr2803 includes a primary coil L2811 and a secondary coil T2812. In the transformer Tr2803, the primary coil L2811 and the secondary coil L2812 have the same polarity. In this modification, current is supplied from the secondary coil T2812 to a fixed voltage circuit 2604 when a switching element Q1 is OFF, i.e., when magnetic energy is discharged from the primary coil L2811 of the transformer Tr2803. Note that the primary coil L2811 and the secondary coil T2812 of the transformer Tr2803 may have opposite polarities.

Further, a modification as described in the following may be made, in terms of the supply of power from the voltage conversion circuit 2003. In the following modification, power is supplied from the voltage conversion circuit 2003 to a fixed voltage circuit when voltage at a node between the inductor L2002 and the diode D2001 is lower than or equal to a predetermined voltage in the OFF period.

FIG. 36 is a circuit diagram illustrating a DC power supply circuit 2901 pertaining to this modification. Note that in the following, a component having the same structure as in embodiment 2 is labeled with the same reference sign as in embodiment 2, and description on such components is omitted from the following where appropriate.

The DC power supply circuit 2901 includes a switching element Q902. The switching element Q902 is connected between a fixed voltage circuit 2904 and a node between an inductor L2002 and an anode of a diode D2001. The inductor L2002 and the diode D2001 are included in a voltage conversion circuit 2003. Further, the DC power supply circuit 2901 includes a drive circuit U2. The drive circuit U2 has a control terminal te4 that outputs a signal voltage and controls the switching element Q902.

The switching element Q902 is an N-channel MOSFET. A source of the switching element Q902 is connected to the fixed voltage circuit 2904, a gate of the switching element Q902 is connected to the control terminal te4 of the drive circuit U2 via a resistor R912, and a drain of the switching element Q902 is connected to the node between the inductor L2002 and the anode of the diode D2001. The fixed voltage circuit 2904 includes a resistor R46 that is connected directly to the source of the switching element Q902. As such, the fixed voltage circuit 2904 corresponds to the fixed voltage circuit 2604 illustrated in FIG. 33 without the capacitor C647.

In the DC power supply circuit 2901, the drive circuit U2 turns ON the switching element Q902 by providing the signal voltage of the control terminal te4 with a predetermined voltage higher than 0 V, when the voltage at the node between the inductor L2002 and the anode of the diode D2001 equals or drops below a predetermined voltage while the switching element Q1 is being maintained in the OFF state by a signal voltage having a predetermined voltage higher than 0 V being output from the output terminal te1. Note that the timing at which the switching element Q902 is turned ON is set in advance. Thus, power loss at the resistor R46 in the fixed voltage circuit 2904 is reduced, which improves circuit efficiency. Further, the fixed voltage circuit 2904 includes a reduced number of circuit elements, which reduces circuit size.

(8) In embodiment 2, description is provided on the DC power supply circuit 2001, which includes the voltage conversion circuit 2003 including a non-insulation type voltage conversion circuit, such as a step-down chopper circuit. Alternatively, the voltage conversion circuit 2003 may include an insulation type voltage conversion circuit, as described in the following modification.

FIG. 37 is a circuit diagram illustrating a DC power supply circuit 2501 pertaining to this modification. Note that in the following, a component having the same structure as in embodiment 2 is labeled with the same reference sign as in embodiment 2, and description on such components is omitted from the following where appropriate.

The DC power supply circuit 2501 includes a voltage conversion circuit 2503. The voltage conversion circuit 2503 is a flyback converter and includes a switching element Q1, a transformer Tr2502 having a primary coil L2511 and a secondary coil L2512, diodes D2002, D2003, and D2501, capacitors C2 and C504, and a resistor R7. In the transformer Tr2502, the primary coil L2511 and the secondary coil L2512 have opposite polarities. A source of the switching element Q1 is connected to a low-potential output terminal of a rectifier circuit 2 via the resistor R7, a gate of the switching element Q1 is connected to a drive circuit U1 via a resistor R11, and a drain of the switching element Q1 is connected to a first terminal of the primary coil L2511. An anode of the diode D2501 is connected to a first terminal of the secondary coil L2512 of the transformer Tr2502, and a cathode of the diode D2501 is connected to a first terminal of the capacitor C504. A second terminal of the capacitor C504 is connected to a second terminal of the secondary coil L2512 of the transformer Tr2502. As such, the capacitor C504 is connected in parallel to the load 11. The capacitor C504 has a function of smoothing a voltage applied to a load 11. This modification ensures safety when high power is supplied to the load 11.

(9) In the DC power supply circuit 1 pertaining to embodiment 1, a high-frequency current is generated at the voltage conversion circuit 3 as a result of the ON/OFF switching of the switching element Q1. This high-frequency current flows from the voltage conversion circuit 3 into the power supply AC via the rectifier circuit 2. This results in high-frequency noise and high-frequency ripple leaking to the outside from the DC power supply circuit 1.

To prevent such a problem, a noise filter 5 may be disposed between the DC power supply circuit 1 and the AC power supply, as illustrated in FIG. 38A. The noise filter 5 is composed of an inductor NF and capacitors C0 and C1. Alternatively, a noise filter 205 may be connected between the rectifier circuit 2 and the voltage conversion circuit 3 in the DC power supply circuit 1, as illustrated in FIG. 38B. The noise filter 205 is composed of an inductor NF and a capacitor C1. A first terminal of the inductor NF is connected to the high-potential output terminal of the rectifier circuit 2. The capacitor C1 is connected between a second terminal of the inductor NF and the low-potential output terminal of the rectifier circuit 2. Alternatively, in FIG. 38B, the capacitor C1 may be connected upstream than the inductor NF. However, it should be noted that the structure illustrated in FIG. 38B is more exemplary for reducing high-frequency ripple. Further, in FIG. 38B, two capacitors may be disposed, one to each side of the inductor NF. Further, in FIG. 38B, the inductor NF may be connected to the low-potential output terminal of the rectifier circuit 2.

(10) In embodiments 1 through 4, description is provided that the switching element Q1 is an N-channel type MOS transistor. Alternatively, the switching element Q1 may be a P-channel type MOS transistor. Alternatively, the switching element Q1 may be a bipolar transistor.

(11) In embodiments 2 and 4, description is provided on the inductor L2003 being provided as a current-limiting element. Alternatively, the current-limiting element need not be an inductor, and may be a resistor or the like. Alternatively, the current-limiting element need not be provided, in which case the cathode of the diode D2 is connected directly to the second terminal of the capacitor C2.

(12) In actual implementation, a power adjuster for adjusting power input to the DC power supply circuit 1 may be connected between the power supply AC and the DC power supply circuit 1. Such a power adjuster typically includes a triac, etc. Further, one problem with such a power adjuster is that when excessively great current is input from the power supply AC to the rectifier circuit 2 via the power adjuster, the triac, etc., included in the power adjuster may malfunction. Conventional technology resolves this problem by increasing the resistance value of the resistor R1 and thus reducing the peak value of the current flowing into the power adjustor. However, this results in much power being lost at the resistor R1 and decreased circuit efficiency.

In contrast to this, the DC power supply circuit 1 reduces the peak value of current input thereto. Thus, even when a power adjuster as described above, which includes a triac, etc., is used in combination with the DC power supply circuit 1, the DC power supply circuit 1 reduced the risk of the malfunctioning described above taking place.

REFERENCE SIGNS LIST 1, 201, 301, 401, 501, 601, 701, 1001, 1101, 1201, 2001, 2201, 2301, 2401, 2501, 2601, 2701, 2801, 2901 DC power supply circuit
2 rectifier circuit
3, 203, 303, 403, 503, 603, 2003 voltage conversion circuit
4, 504, 704 fixed voltage circuit
5, 205 noise filter
11 load
C1, C2, C4, C43, C47, C202, C204, C404, C547 capacitor
D0, D1, D2, D45, D200, D201, D202, D403, D2001, D2002, D2003 diode
L2, L202, L2002, L2003 inductor
Q1, Q201, Q202, Q502, Q602 switching element
R1, R7, R11, R41, R42, R46, R211, R212, R512, R613, R614 resistance
Tr401, Tr501 transformer
U1, U2, U3 drive circuit
ZD44 zener diode
L411, L511 primary coil
L412, L512 secondary coil

The invention claimed is:
1. A direct current (DC) power supply circuit comprising;
a rectifier circuit rectifying alternating current (AC) supplied thereto from an AC power supply; and
a voltage conversion circuit connected across output terminals of the rectifier circuit, converting a voltage from the rectifier circuit, and outputting a converted voltage to a load,
the voltage conversion circuit comprising:
an inductor having terminals, a first one of which is connected, via the load, to a high-potential one of the output terminals of the rectifier circuit;
a switching element connected between a second one of the terminals of the inductor and a low-potential one of the output terminals of the rectifier circuit;
a capacitor having terminals, a first one of which is connected to the low-potential one of the output terminals of the rectifier circuit; and
a first unidirectional element connected between a second one of the terminals of the capacitor and the second one of the terminals of the inductor, wherein
when an instantaneous value of the voltage from the rectifier circuit is higher than or equal to a voltage across the terminals of the capacitor,
in an ON period of the switching element, current flows along a first current path from the high-potential one of the output terminals of the rectifier circuit, through the load, the inductor, and the switching element in the stated order, and into the low-potential one of the output terminals of the rectifier circuit, and
in an OFF period of the switching element, current flows along a second current path from the high-potential one of the output terminals of the rectifier circuit, through the load, the inductor, the first unidirectional element, and the capacitor in the stated order, and into the low-potential one of the output terminals of the rectifier circuit, wherein
the voltage conversion circuit further comprises:
a second unidirectional element connected between the second one of the terminals of the capacitor and the high-potential one of the output terminals of the rectifier circuit, wherein
when the instantaneous value of the voltage from the rectifier circuit is lower than the voltage across the terminals of the capacitor,
in the ON period of the switching element, current flows along a third current path from the second one of the terminals of the capacitor, through the second unidirectional element, the load, the inductor, and the switching element in the stated order, and into the first one of the terminals of the capacitor, and
in the OFF period of the switching element, current flows along a fourth current path from the second one of the terminals of the inductor, through the first unidirectional element, the second unidirectional element, and the load in the stated order, and into the first one of the terminals of the inductor.
2. The DC power supply circuit of claim 1, wherein
the first unidirectional element conducts current only in one direction from the second one of the terminals of the inductor to the second one of the terminals of the capacitor, and
the second unidirectional element conducts current only in one direction from the second one of the terminals of the capacitor to the high-potential one of the output terminals of the rectifier circuit.
3. The DC power supply circuit of claim 2, wherein
the first unidirectional element is a diode, an anode of which is connected to the second one of the terminals of the inductor and a cathode of which is connected to the second one of the terminals of the capacitor, and the second unidirectional element is a diode, an anode of which is connected to the second one of the terminals of the capacitor and a cathode of which is connected to the high-potential one of the output terminals of the rectifier circuit.

4. The DC power supply circuit of claim 1, wherein
the power conversion circuit further comprises:
   a second unidirectional element connected between the second one of the terminals of the capacitor and the high-potential one of the output terminals of the rectifier circuit; and
   a third unidirectional element connected between the second one of the terminals of the inductor and the high-potential one of the output terminals of the rectifier circuit, wherein
when the instantaneous value of the voltage from the rectifier circuit is lower than the voltage across the terminals of the capacitor,
   in the ON period of the switching element, current flows along a third current path from the second one of the terminals of the capacitor, through the second unidirectional element, the load, the inductor, and the switching element in the stated order, and into the first one of the terminals of the capacitor, and
   in the OFF period of the switching element, current flows along a fourth current path from the second one of the terminals of the inductor, through the third unidirectional element and the load in the stated order, and into the first one of the terminals of the inductor.

5. The DC power supply circuit of claim 4, wherein
the third unidirectional element is a diode, an anode of which is connected to the second one of the terminals of the inductor and a cathode of which is connected to the high-potential one of the output terminals of the rectifier circuit.

6. The DC power supply circuit of claim 4, wherein
the power conversion circuit further comprises:
   an element that limits current, the current-limiting element connected between the second one of the terminals of the capacitor and the first unidirectional element.

7. The DC power supply circuit of claim 6, wherein
the current-limiting element is an inductor.

8. The DC power supply circuit of claim 1, wherein
a length of each cycle of ON and OFF switching of the switching element and an on-duty ratio of the switching element are set based upon a rate at which the voltage across the terminals of the capacitor increases.

9. A direct current (DC) power supply circuit comprising;
a rectifier circuit rectifying alternating current (AC) supplied thereto from an AC power supply; and
a voltage conversion circuit connected across output terminals of the rectifier circuit, converting a voltage from the rectifier circuit, and outputting a converted voltage to a load,
the voltage conversion circuit comprising:
   an inductor having terminals, a first one of which is connected to a high-potential one of the output terminals of the rectifier circuit;
   a switching element connected between a second one of the terminals of the inductor and a low-potential one of the output terminals of the rectifier circuit;
   a capacitor having terminals, a first one of which is connected to the low-potential one of the output terminals of the rectifier circuit and a second one of which is connected to a first terminal of the load; and
   a first unidirectional element connected between the second one of the terminals of the inductor and a second terminal of the load, wherein
when an instantaneous value of the voltage from the rectifier circuit is higher than or equal to a voltage across the terminals of the capacitor,
   in an ON period of the switching element, current flows along a first current path from the high-potential one of the output terminals of the rectifier circuit, through the inductor and the switching element in the stated order, and into the low-potential one of the output terminals of the rectifier circuit, and
   in an OFF period of the switching element, current flows along a second current path from the high-potential one of the output terminals of the rectifier circuit, through the inductor, the first unidirectional element, the load, and the capacitor in the stated order, and into the low-potential one of the output terminals of the rectifier circuit, wherein
the voltage conversion circuit further comprises:
   a second unidirectional element connected between the second one of the terminals of the capacitor and the high-potential one of the output terminals of the rectifier circuit, wherein
when the instantaneous value of the voltage from the rectifier circuit is lower than the voltage across the terminals of the capacitor,
   in the ON period of the switching element, current flows along a third current path from the second one of the terminals of the capacitor, through the second unidirectional element, the inductor, and the switching element in the stated order, and into the first one of the terminals of the capacitor, and
   in the OFF period of the switching element, current flows along a fourth current path from the second one of the terminals of the inductor, through the first unidirectional element, the load, and the second unidirectional element in the stated order, and into the first one of the terminals of the inductor.

10. The DC power supply circuit of claim 9, wherein
the first unidirectional element conducts current only in one direction from the second one of the terminals of the inductor to the second terminal of the load, and
the second unidirectional element conducts current only in one direction from the second one of the terminals of the capacitor to the high-potential one of the output terminals of the rectifier circuit.

11. The DC power supply circuit of claim 10, wherein
the first unidirectional element is a diode, an anode of which is connected to the second one of the terminals of the inductor and a cathode of which is connected to the second terminal of the load, and
the second unidirectional element is a diode, an anode of which is connected to the F one of the terminals of the capacitor and a cathode of which is connected to the high-potential one of the output terminals of the rectifier circuit.

* * * * *